US008561897B2

(12) United States Patent
Kunzig et al.

(10) Patent No.: US 8,561,897 B2
(45) Date of Patent: Oct. 22, 2013

(54) LOAD TRACKING UTILIZING LOAD IDENTIFYING INDICIA AND SPATIAL DISCRIMINATION

(75) Inventors: Robert S. Kunzig, Aston, PA (US); Robert M. Taylor, Newark, DE (US); Leonard J. Maxwell, North East, MD (US)

(73) Assignee: Sky-Trax, Inc., New Castle, DE (US)

( * ) Notice: Subject to any disclaimer, the term of this patent is extended or adjusted under 35 U.S.C. 154(b) by 50 days.

(21) Appl. No.: 13/298,713

(22) Filed: Nov. 17, 2011

(65) Prior Publication Data

US 2012/0126000 A1    May 24, 2012

Related U.S. Application Data

(60) Provisional application No. 61/458,163, filed on Nov. 18, 2010.

(51) Int. Cl.
*G06F 19/00* (2011.01)

(52) U.S. Cl.
USPC ........................................................ 235/385

(58) Field of Classification Search
USPC ........................................................ 235/385
See application file for complete search history.

(56) References Cited

U.S. PATENT DOCUMENTS

| | | | |
|---|---|---|---|
| 5,604,715 A | 2/1997 | Aman et al. | |
| 5,812,395 A | 9/1998 | Masciangelo et al. | |
| 6,411,210 B1 | 6/2002 | Sower et al. | |
| 6,801,245 B2 | 10/2004 | Shniberg et al. | |
| 6,902,113 B2 | 6/2005 | Sali et al. | |
| 6,922,208 B2 | 7/2005 | Shniberg et al. | |
| 6,952,488 B2 | 10/2005 | Kelly et al. | |
| 7,194,330 B2 | 3/2007 | Carson | |
| 7,370,803 B2 | 5/2008 | Mueller et al. | |
| 7,372,451 B2 | 5/2008 | Dempski | |
| 7,845,560 B2 | 12/2010 | Emanuel et al. | |
| 2003/0208297 A1 | 11/2003 | Stawikowski et al. | |
| 2004/0139806 A1 | 7/2004 | Christmas | |
| 2004/0183751 A1 | 9/2004 | Dempski | |
| 2005/0256608 A1 | 11/2005 | King et al. | |
| 2005/0269412 A1 | 12/2005 | Chiu et al. | |
| 2006/0210115 A1 | 9/2006 | Nemet | |
| 2007/0027585 A1 | 2/2007 | Wulff | |
| 2007/0282482 A1 | 12/2007 | Beucher et al. | |

*Primary Examiner* — Jamara Franklin

(74) *Attorney, Agent, or Firm* — Pepper Hamilton LLP

(57) ABSTRACT

Methods and apparatus for determining the location of one or more unit loads in a coordinate space in a facility, comprising an integrated system that identifies a load by reading indicia on the load, determines the position of the indicia in the coordinate space, and stores the indicia position and load identity in a Label Map. A mobile subsystem on each conveying vehicle identifies the location and orientation of that vehicle using a position/orientation sensor, determines the identity of the load, establishes a Target Cube to discriminate the desired load from nearby loads, confirms acquisition of the load, and communicates the information to a fixed-base subsystem. Load identity and the location and orientation of the vehicle when a load is deposited are used to create a Load Map that contains the identity, position and orientation of all identified loads in the coordinate space.

19 Claims, 60 Drawing Sheets

LOAD TRACKING UTILIZING LOAD IDENTIFYING INDICIA AND SPATIAL DISCRIMINATION

PRIORITY CLAIM

This application claims the benefit of U.S. Provisional Patent Application Ser. No. 61/458,163, filed 18 Nov. 2010.

TECHNOLOGY FIELD

A method and apparatus for determining the location of one or more unit loads of freight in a coordinate space in a facility by reading identifying indicia to identify items, spatially discriminating the items from nearby ones, determining the position and orientation of items by determining the position and orientation of the conveying vehicles such as forklift trucks, and the position of the indicia relative to the conveying vehicle. The identity, location, and orientation of items are stored in a database in a computer memory that can be accessed by all conveying vehicles in the facility; thereby eliminating the necessity of rereading the identifying indicia each time an item is to be located for conveyance. Items may therefore be identified, located and tracked in "real" space of the facility and/or in "virtual" space of computer memory.

BACKGROUND

Tracking the identity and location of physical assets, such as raw materials, semi-finished products and finished products, as they move through the supply chain is operationally imperative in many businesses. "Assets" may include a very wide range of objects conveyed by utility vehicles, including, but not limited to palletized materials such as groups of cartons, single items such as household appliances, or unitized bulk products such as chemical totes. As used in the present invention, a load or "unit load" is a single unit of assets, such as freight or an assembly of goods on a transport structure (e.g., pallet, tote, rack, etc.) that facilitates handling, moving, storing and stacking the materials as a single entity. Unit loads typically combine individual items into a single unit that can be moved easily with an industrial utility vehicle such as a pallet jack or forklift truck.

In material handling facilities such as factories, warehouses, and distribution centers, asset tracking is the primary task of a wide variety of systems, including inventory control systems, product tracking systems, and warehouse management systems, collectively termed "host systems". The ability to automatically determine and record the identity, position, elevation, and rotational orientation of assets and/or unit loads within a defined coordinate space, without human interaction, is a practical problem that has seen many imperfect solutions.

A variety of technologies have been applied to solve the problem of identifying an asset or unit load. For example, barcode labels, hang tags, ink jet spray markings, and radio frequency tags have been attached to assets and/or unit loads to allow machine readability or manual identification by a human operator. The most common method used today utilizes barcode indicia (typically printed on a label attached to an asset), which are read by hand-held devices, commonly known as barcode scanners or label readers. Data from the hand held device is typically forwarded to a host system such as those mentioned above. As used herein, the term "label reader" refers to any device that reads barcode indicia.

Determining asset or unit load location has been an equally challenging problem, especially in facilities where goods move quickly from point to point, or where human interaction is relied upon to determine the asset's or unit load's location or storage position. Barcode labels have found utility by being attached to storage locations. For example, a warehouse may have rack storage positions, where each position is marked with a barcode label. The operator scans the rack label barcode when an asset or a load is deposited or removed, and that data, along with the asset or unit load identity data, is uploaded to the host.

As with load identification, load location has been determined manually or by machine with a variety of technologies. RFID tags, barcode labels and human readable labels constitute the vast majority of location marking methods, especially for facilities utilizing rack storage. Racks provide physical separation of storage items as well as convenient placement for identifying labels.

In the case of bulk storage, where items are stored in open floor areas, items may be placed in any orientation with little physical separation. Floor markings—typically painted stripes—are the conventional method of indicating storage locations (e.g., see FIG. 18) and separating one location from another. Human readable markings and/or bar code symbols may identify each location in order to allow human reading and/or machine reading, and these may be floor-mounted or suspended above storage locations.

Tracking the movement of assets in a storage facility presents a number of additional problems. Most warehouse and distribution centers employ drivers operating pallet jacks or forklift trucks, and in most of these operations the driver is responsible for collecting inventory data as assets are moved to and from storage locations. Generally drivers use a hand-held barcode scanner to scan a barcode label on the load and to scan a separate barcode label affixed to the floor, hung from above, or attached to a rack face. The act of manually collecting the load tracking data creates several problems including, for example:

1) Driver and vehicle productivity are reduced. The label-reading task takes time away from the driver's primary task of moving the materials.
2) Data errors can occur. The driver may scan the wrong label, or forget to scan. These data errors can result in lost inventory, inefficient operations, and operational disruptions.
3) Driver safety is threatened. Forklift drivers work in a dangerous environment. The scanning operation frequently requires the driver to lean outside the protective driver cage or to dismount and remount the vehicle. The driver is exposed to potential injury when dismounted or leaning outside the protective cage.

In addition to the difficulties introduced by the manual data collection task, an overriding concern is that item identification tags, labels, or other markings can be degraded during shipping and storage, and may become unusable. For example, paper labels with machine-readable barcode identifiers can be torn or defaced, rendering the barcode unreadable. Printing can become wet and smeared, text can be misinterpreted, and labels can be torn off, rendering an item unidentifiable.

Numerous outdoor asset tracking methods and systems have been developed to track outdoor assets such as railroad cars, ships, overland trucks, and freight containers. Most tracking systems utilize the Global Positioning System (GPS) for position determination. GPS is available world-wide and requires no licensing or usage fees. The GPS system is based on radio signals, transmitted from earth orbiting satellites, which can be received at most outdoor locations. For indoor navigation, however, GPS signals can be attenuated, reflected, blocked, or absorbed by building structure or contents, rendering GPS unreliable for indoor use.

Radio technologies have been used to determine the position of objects indoors. While overcoming the radio wave limitations of GPS, other shortcomings have been introduced. For example, object orientation is difficult to determine using radio waves. A number of radio-based systems have been developed using spread spectrum RF technology, signal intensity triangulation, and Radio Frequency Identification (RFID) transponders, but all such systems are subject to radio wave propagation issues and lack orientation sensing. Typical of such RF technology is U.S. Pat. No. 7,957,833, issued to Beucher et al.

For example, U.S. Pat. No. 7,511,662 claims a system and method for providing location determination in a configured environment in which Global Navigation Satellite System Signals may not be available. Local beacon systems generate spread spectrum code division multiple access signals that are received by spectral compression units. That system has utility in applications in which GPS signals are unavailable or limited, for example, in warehouse inventory management, in search and rescue operations and in asset tracking in indoor environments. An important shortcoming of the technology is that object orientation cannot be determined if an object is stationary.

Ultrasonic methods can work well in unobstructed indoor areas, although sound waves are subject to reflections and attenuation problems much like radio waves. For example, U.S. Pat. No. 7,764,574 claims a positioning system that includes ultrasonic satellites and a mobile receiver that receives ultrasonic signals from the satellites to recognize its current position. Similar to the GPS system in architecture, it lacks accurate orientation determination.

Optical methods have been used to track objects indoors with considerable success. For example, determining the location of moveable assets by first determining the location of the conveying vehicles may be accomplished by employing vehicle position determining systems. Such systems are available from a variety of commercial vendors including Sick AG of Waldkirch, Germany, and Kollmorgen Electro-Optical of Northampton, Mass. Laser positioning equipment may be attached to conveying vehicles to provide accurate vehicle position and heading information. These systems employ lasers that scan targets to calculate vehicle position and orientation (heading). System accuracy is suitable for tracking assets such as forklift trucks or guiding automated vehicles indoors. Using this type of system in a bulk storage facility where goods may be stacked on the floor has presented a limitation for laser scanning systems, which rely on the targets to be placed horizontally about the building in order to be visible to the sensor. Items stacked on the floor that rise above the laser's horizontal scan line can obstruct the laser beam, resulting in navigation system failure.

Rotational orientation determination, which is not present in many position determination methods, becomes especially important in applications such as vehicle tracking, vehicle guidance, and asset tracking. Considering materials handling applications, for example, assets may be stored in chosen orientations, with carton labels aligned in a particular direction or pallet openings aligned to facilitate lift truck access from a known direction. Since items in bulk storage may be placed in any orientation, it is important that orientation can be determined in addition to location. One method of determining asset location and orientation is to determine the position and orientation of the conveying vehicle as it acquires or deposits assets. Physical proximity between the asset and the vehicle is assured by the vehicle's mechanical equipment; for example, as a forklift truck picks up a palletized unit load of assets with a load handling mechanism.

Since goods may be stored in three dimensional spaces with items stacked upon one another, or stored on racks at elevations above the floor, a position and orientation determination system designed to track assets indoors must provide position information in three dimensions and orientation. The close proximity of many items also creates the problem of discriminating from them only those items intended for the current load. The combination of position determination, elevation determination and angular orientation determination and the ability to discriminate an item from nearby items is therefore desired.

A position and rotation determination method and apparatus is taught in U.S. patent application Ser. No. 11/292,463, now U.S. Pat. No. 7,845,560, titled Method and Apparatus for Determining Position and Rotational Orientation of an Object, which is incorporated herein by reference in its entirety. An improved position and rotation determination method is taught in U.S. patent application Ser. No. 12/807,325, titled Method and Apparatus for Managing and Controlling Manned and Automated Utility Vehicles, which is incorporated herein by reference in its entirety. The methods of these patent applications are useful for determining the position and orientation of a conveying vehicle in carrying out the present invention. Other navigation methods as embodied in model NAV 200 available from Sick AG of Reute, Germany, and model NDC8 available from Kollmorgen of Radford, Va. may also be used for determining the position and orientation of a conveying vehicle.

U.S. patent application Ser. No. 12/319,825, titled Optical Position Marker Apparatus, Mahan, et al., filed Jan. 13, 2009, describes an apparatus for marking predetermined known overhead positional locations within a coordinate space, for viewing by an image acquisition system which determines position and orientation, which is incorporated herein by reference in its entirety.

U.S. patent application Ser. No. 12/321,836, titled Apparatus and Method for Asset Tracking, describes an apparatus and method for tracking the location of one or more assets, comprising an integrated system that identifies an asset, determines the time the asset is acquired by a conveying vehicle, determines the position, elevation and orientation of the asset at the moment it is acquired, determines the time the asset is deposited by the conveying vehicle, and determines the position, elevation and orientation of the asset at the time the asset is deposited, each position, elevation and orientation being relative to a reference plane. U.S. patent application Ser. No. 12/321,836 is incorporated herein by reference in its entirety.

The prior art does not address the issue of identifying a specific asset, or unit load to be acquired by a conveying vehicle, as the vehicle approaches a group of similar loads in close proximity to each other. The prior art also does not address the issue of identifying a load if its identifying indicia is missing, unreadable or not in view when the conveying vehicle approaches the load.

The present invention addresses many of the above problems. A novel method is disclosed of identifying and discriminating assets by searching a "virtual space" created from databases. An asset needs be identified only one time as it moves into, through, and out of a facility such as a warehouse. Each time the asset is moved the asset can be positively identified by any conveying vehicle, from any angle of approach, anywhere within the three-dimensional coordinate space, without "real space" identification. After an asset is first identified and located, the identifying markings such as tags, labels, printing, etc. are no longer needed for that item to be accurately tracked.

SUMMARY

In a first aspect, embodiments of the present invention disclose methods and systems for identifying and locating items within a facility and create a database comprising a Label Map; in a second aspect, embodiments of the present invention create a virtual space in computer memory termed a Targeting Lane to discriminate adjacent items; in a third aspect, embodiments of the present invention track the identity, location, and movement of multiple assets; and in a fourth aspect, embodiments of the present invention track the identity, location and movement of assets that are inadvertently displaced from their known storage location.

According to one aspect, embodiments of the present invention build a database termed a "Label Map" of the three-dimensional locations and identities of identifying labels, and use the labels' identity and the position and orientation of a conveying vehicle to build a database termed a "Load Map" of asset identities and locations. In a first aspect, the present invention presents a method for identifying and locating items with one or more optical label readers, each label reader being mounted on a corresponding conveying vehicle at a known position and orientation relative to a center and a directional axis of the vehicle, each conveying vehicle having an optical image acquisition system mounted thereon for sensing position and rotational orientation within a facility having an array of position markers, each asset having a machine-readable encoded indicia of a predetermined size thereon.

In one embodiment, the method comprises the steps of:
a) repeatedly determining the position of the center of the vehicle and the rotational orientation of the directional axis of the vehicle;
b) acquiring images with the one or more label readers as each conveying vehicle moves about the facility;
c) processing each image to determine if that image contains a label having readable indicia;
d) if the indicia is not readable, repeating steps b) and c);
e) if the indicia is readable:
  1) decoding the indicia to identify the asset;
  2) determining a center of the indicia on the label; and
  3) determining a location of the label center relative to the label reader based upon the position and the size of the indicia within the image;
f) determining the position of the label within the facility using the location of the indicia relative to the label reader, the position and rotational orientation of the label reader relative to the center of the vehicle and the directional axis of the vehicle and the position of the center of the vehicle and directional axis of the vehicle within the facility; and
g) storing the identity and the position of each readable label within the facility in a database, called a Label Map, in a memory in a computer.

The Label Map or Load Map enables a mobile subsystem onboard the conveying vehicle to interrogate computer memory (i.e., "look" into virtual space) and discriminate among multiple assets, only those that should be included within the Load On Board and identify assets even when an identifying label is not detectable by the label reader sensor. The Load Map facilitates an asset being identified and transported without the need for a label reader sensor or the presence of a readable identifying label.

In a second aspect the present invention creates a virtual space termed a Targeting Lane, existing only in computer memory, which is defined in coordinates that lie in front of the conveying vehicle's load handling mechanism. The Targeting Lane is used to discriminate between closely stacked or spaced assets, enabling the conveying vehicle to identify a potential, i.e., "target", load, when multiple labels are within the field of view of the label reader sensor, or when multiple assets are present within the Targeting Lane. In one embodiment, the Targeting Lane is used in a method of transporting an asset in a facility from a first location to a second location, comprises the steps of:
a) creating a Global Label Map database;
b) identifying the asset to be transported and transmitting that identity to a conveying vehicle;
c) determining the position of the asset from a copy of the Global Label Map in the memory of the mobile computer;
d) defining a Targeting Lane in front of the load handling (lift) mechanism of the conveying vehicle and determining if any labels are in the Targeting Lane;
e) if no labels are in the Targeting Lane, repeating steps c) and d);
f) if any labels are in the Targeting Lane,
  1) determining the closest label in Targeting Lane;
  2) projecting a Target Cube depth from the closest label position;
g) checking label positions in the Label Map to determine if any labels are within the Target Cube;
h) If any labels are in the Target Cube, determining if the load detecting device has detected a "Load ON" event;
i) if a "Load ON" event has not occurred, repeating steps d-g;
j) if a "Load ON" event has occurred, then determining label(s) and their associated item(s) to be part of a "Load On Board" or "Current Load";
k) acquiring the asset(s);
l) transporting the asset(s) to a second position and orientation;
m) depositing the asset(s) at the second location;
n) determining the position and the orientation of the asset(s) within the facility when the load detecting device detects the item has been deposited ("Load Off") by using the size of the load, the location of the load relative to the conveying vehicle and the position of the center of the vehicle and orientation of the directional axis of the vehicle;
o) storing the identity, the position and the orientation of the deposited asset(s) in the Local Load Map in the memory in the mobile computer.
p) transmitting the identity, the position and the orientation of the deposited asset(s) to the system controller over the wireless network; and
q) storing the identity, the position and the orientation of the deposited asset(s) in the Global Load Map.

In a third aspect, the present invention tracks multiple assets being conveyed on board a single conveying vehicle by spatially discriminating the asset labels and determining their position relative to the vehicle.

In a fourth aspect, the present invention tracks the movement of assets that are displaced from their stored position when the conveying vehicle pushes the stored asset while depositing another asset in the stored asset's original position.

In one embodiment, the method of tracking the identity and location and rotational orientation of a second load displaced during the deposition of a first load being transported by a conveying vehicle, comprises the steps of:
a) identifying a desired storage location for a first load being transported;

b) determining that a second load occupies the desired storage location;

c) contacting the second load with the first load and determining the location and direction of travel of the conveying vehicle at contact;

d) pushing the second load to a displaced location when the first load is being deposited in the desired storage location;

e) upon deposition of the first load, when a Load Off event occurs, updating the locations and rotational orientations of the second load and the first load in the Local Label Map and Local Load Map, the distance of displacement of the second load being determined by the size of the first load and the direction of the displacement being determined by the direction of travel of the conveying vehicle at contact.

One apparatus for carrying out the methods comprises an integrated system comprising a fixed-base subsystem, called a controller, and one or more mobile subsystems. The controller comprises a computer having a computational unit, a data storage unit, a communications network interface, an operator interface, a wireless local area network interface and a base station wireless local area network communication unit, connected to the computer, for communicating with one or more mobile communication units.

The mobile subsystems, each mounted onboard a conveying vehicle, each comprise a mobile computer device having a computational unit and a data storage unit; a sensor network interface for communicating with a plurality of onboard devices, a wireless local area network interface, a vehicle driver interface, and a plurality of onboard devices. The plurality of onboard devices includes a position/orientation sensor unit to determine the location in two dimensions, and the rotational orientation of the conveying vehicle in a facility coordinate system; a label reader sensor device for detecting and identifying a label having a machine-readable symbol on a load and decoding the machine-readable symbol; a load detection device, indicating the presence or absence of a load on a lifting mechanism of the conveying vehicle; a lift height detection device for determining the elevation of the lifting mechanism on the conveying vehicle relative to the reference plane; and a wireless local area network communication unit for communicating with the base station wireless communication unit.

Additional types of conveying vehicles are accommodated by the present invention. For example, scissor trucks, turret trucks, order picker trucks are accommodated by the addition of sensors on the conveying vehicle that measure the position and rotational orientation of the forks relative to the position and rotational orientation of the conveying vehicle. The scissor truck would have a scissor extension sensor to measure the distance of the fork assembly from the conveying vehicle. The turret truck would have a lateral displacement sensor to measure the lateral displacement of the fork assembly and a fork rotation sensor to measure the rotational position of the fork assembly.

In operation, an exemplary load tracking system operates as follows. As the conveying vehicles travel throughout a facility, the label reader sensors of the mobile subsystems continuously acquire images of load labels and the position (or location) sensors simultaneously track the position and rotational orientation of each conveying vehicle. The identity of each load label is decoded from the label image and the position of each label is calculated from the image data (label size and position of the label within each image) and the known position of the vehicle at the time the label is decoded. The mobile subsystem on each vehicle thus builds a database of labels it has seen. This database is termed a Local Label Map.

Using known size characteristics of loads based on the average (or nominal) size load for a given facility, and/or the known positions of the labels on each load based on the standardized placement of labels, the position (or location) of the center of each load and the rotational orientation of each load is accumulated in a database known as a Local Load Map. When a conveying vehicle handles a load and deposits it at a destination location the Load Map is updated to reflect the current location and orientation of the load.

Each mobile subsystem transmits data from the Local Label Map and the Local Load Map to the controller (fixed-base subsystem). By accumulating the Label Map and the Load Map information from each mobile subsystem the controller builds a Global Label Map of label identities, and, and a Global Load Map of all load identities, positions (locations), and orientations. This Global Load Map can then be shared with all mobile subsystems for subsequent location and acquisition of individual loads.

When a conveying vehicle is dispatched to a particular load, the conveying vehicle approaches the load and a "Targeting Lane" is created by the mobile computer device. This Targeting Lane is defined in memory as though it were being projected in front of the conveying vehicle's load handling mechanism. It is defined as a rectangular cuboid, having eight (8) corners where each corner is a point in space, and six (6) surfaces (planes), where each surface and corner point are calculated repeatedly as the conveying vehicle moves. When one or more labels have been identified by the mobile subsystem a "Target Cube" is created (defined in memory) using the position of the label to define the face of the cube nearest the conveying vehicle. The size of the Target Cube is determined by the expected (average or nominal) size of the load. The Target Cube discriminates labels outside of the Target Cube so that they are not considered part of the load to be acquired. At the time the load is acquired by the conveying vehicle, the load detection device generates a "Load ON" signal. The position and orientation of the load is calculated based upon the position and orientation of the conveying vehicle and the position and orientation of the load handling mechanism. The elevation of the load is determined by the lift height detection device. The position, elevation and orientation of the load at the moment it is acquired may be stored in the Local Load Map. When the load is deposited by the conveying vehicle, the load detection device generates a "Load OFF" signal. The position, elevation and orientation of the load are determined and the information is stored in the Local Load Map. When the load has been deposited, the mobile subsystem transmits the Local Load Map information about the load to the fixed-base subsystem which in turn updates the Global Load Map.

As the conveying vehicle approaches potential loads, the desired load is detected and identified by the mobile subsystem on the conveying vehicle by projecting the appropriate Targeting Lane into the Local Label Map or the Local Load Map and including only those loads that are within the Target Cube. The load is then acquired by the conveying vehicle, the load detection device confirming the presence of the load on the conveying vehicle. The lift height detection device determines the elevation of the load relative to the reference plane at the origin location. The conveying vehicle delivers the load to a destination location, the position/orientation sensor unit determines the location and the rotational orientation of the conveying vehicle, and the lift height detection device determines the elevation of the load relative to the reference plane at the destination location. The mobile communication unit communicates to the fixed-base subsystem the identity of the load, the time of acquisition and delivery, and the location, elevation and rotational orientation of the load at the destination location.

In a preferred embodiment, the system determines the instantaneous location of each load using the systems and methods disclosed in one or more of U.S. Pat. No. 7,845,560; U.S. patent application Ser. No. 12/319,825; U.S. patent application Ser. No. 12/321,836; and U.S. patent application Ser. No. 12/807,325, the details of which are incorporated herein by reference in their entirety. An array of uniquely encoded position markers distributed throughout the operational space in such a manner that at least one marker is within view of an image acquisition system mounted on a conveying vehicle. Images of the at least one marker are acquired and decoded, and the position and rotational orientation of the conveying vehicle are calculated. Sensors on the conveying vehicle enable the system to determine the precise location, including elevation relative to a reference plane, of the load (such as an object on a pallet) being transported by the conveying vehicle.

Communication between the fixed-base host computer and the mobile subsystems mounted on the conveying vehicles may use any wireless communication protocol authorized for use in a particular country of use.

The system described above removes operator involvement from the data collection task and improves operational efficiency as well as operator safety as loads are moved through a facility.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

As used herein a "load" may comprise one or more assets. A typical "unit load" may comprise a stack of assets on a pallet to facilitate handling with a conveying vehicle, such as a forklift truck, automated guided vehicle or pallet jack. A unit load may also be a single asset such as an appliance, chemical container, bin, bucket, or tote. In all cases, a unit load is identified and transported as a single asset. As used herein, an asset includes, but is not limited to, material, goods, products, objects, items, etc.

Since a wide variety of conveying vehicles are used to transport unit loads, the example will describe an operation utilizing a common counterbalanced forklift truck and a palletized unit load.

In the United States, pallets are made in a wide variety of styles, configurations, and materials. While no universally accepted standards for pallet dimensions exist, many industries utilize just a few different sizes, with the dominant size being 48 inches in depth (the X dimension) by 40 inches in width (the Y dimension). In Europe, the EURO pallet, also called a CEN pallet, measures 800 millimeters wide by 1200 millimeters deep. The International Organization for Standardization (ISO) sanctions just six pallet dimensions, including the common 48-by-40 inch American pallet depicted in the example.

Other types of conveying vehicles, such as a so-called "Reach Truck" 6R (FIGS. 2A, 2B), having fork an extension scissors, or a "Turret Truck" 6T (FIGS. 4A-4E), which provides translation and rotation of the forks in addition to extension and lift, or an "order picker" truck (FIG. 2C) are accommodated.

Figure 1:
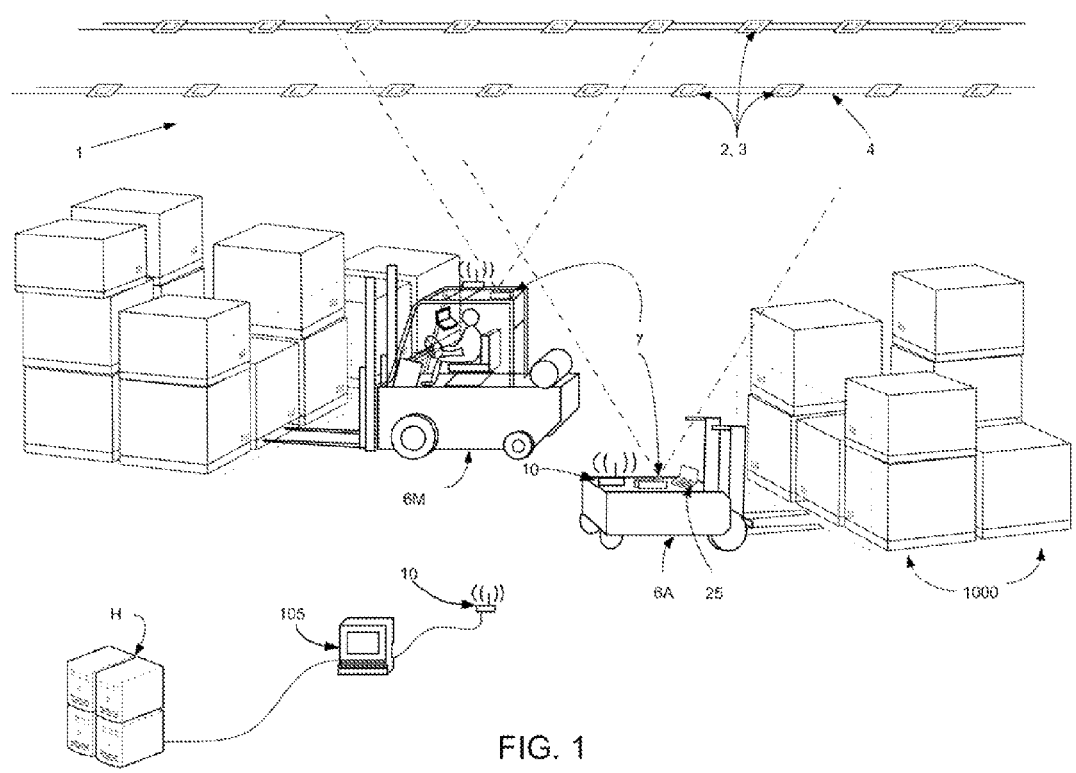
FIG. 1 shows a stylized pictorial three-dimensional view of a materials handling facility.
Figure 2:
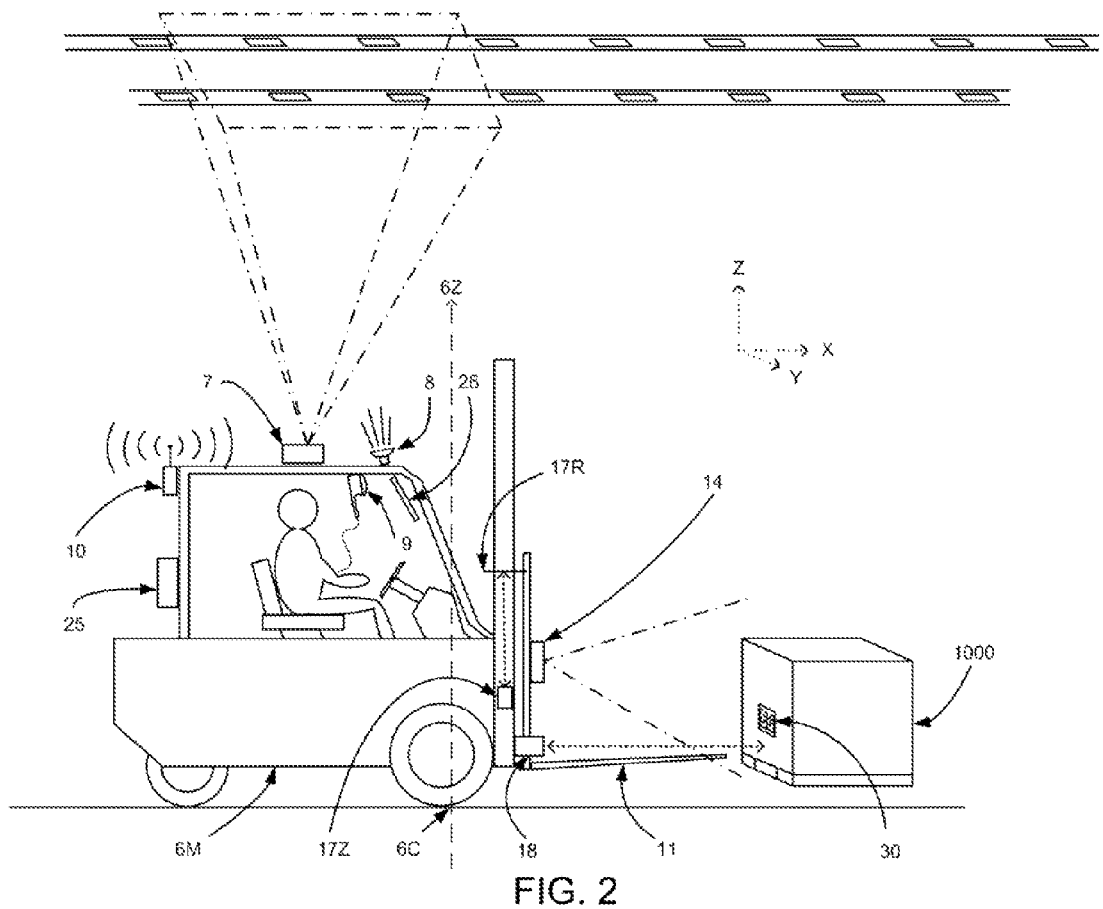
FIG. 2 shows a detailed view of a conveying vehicle, e.g., a counterbalanced forklift truck and a load.

FIG. 1 shows a stylized pictorial three-dimensional view of a materials handling facility and FIG. 2 shows a more detailed view of a manned vehicle. These figures identify key elements of the apparatus of the present invention: a coordinate reference 1, position/orientation determination subsystem comprising a plurality of position markers 2,3 on a support arrangement 4 and a machine vision camera 7, a manned conveying vehicle 6M and an automated conveying vehicle 6A (collectively, conveying vehicles 6), a data processing device (mobile computer) 25, driver interface 26, wireless data communications links 10, illumination source 8, each mounted on a vehicle 6, an optional hand-held barcode scanner 9, a computer unit 105, which also serves as a system controller, and a plurality of unit loads 1000. In FIG. 2 a manned vehicle 6M, having a lift mechanism 11, a label reader 14 (that serves as a load identification sensor), a lift height sensor 17Z, having a reflective target 17R and a load detection sensor, i.e., a load detection device, 18 may be seen. Also shown in FIG. 1 is a plurality of unit loads 1000 each having a unit load label 30 (FIG. 2) having two-dimensional barcode indicia thereon.

In some embodiments, an indoor navigation system, such as that disclosed in U.S. Pat. No. 7,845,560 and U.S. patent application Ser. No. 12/807,325 or a SICK NAV 200 or a Kollmorgen NDC8, is used to continuously determine position and orientation of the vehicle several times per second. In the preferred embodiment, which utilizes the teachings of U.S. Pat. No. 7,845,560 and U.S. patent application Ser. No. 12/807,325, an upward facing image acquisition camera of the position/orientation sensor 7 is mounted on the conveying vehicle 6, acquiring images of at least one position marker 2 or 3, which are placed over the operating area within the camera's view. Each image is processed to determine the identity of each position marker 2, 3 within view. The location of a position marker within the acquired image is then used to determine the position (typically X and Y coordinates) and rotational orientation of the conveying vehicle 6 as discussed in U.S. Pat. No. 7,845,560. Each position marker 2, 3 (seen in FIGS. 1, 2) bears a unique barcode symbol (respectively similar to FIGS. 9B and 9D). The rotational orientation of each position marker relative to the conveying vehicle is used to determine the rotational orientation of the conveying vehicle relative to the facility coordinate system.

In this preferred embodiment, conventional machine vision technology, such as a commercial machine vision system is utilized. The machine vision system has image processing capabilities, such as marker presence or absence detection, dimensional measurement, and label shape identification. Typical machine vision systems are comprised of a video camera, a computing device, and a set of software routines stored in a storage unit of the computing device. Machine vision equipment is commercially available and suitable for most environments. In order to develop a machine vision application, the user chooses certain subroutines, combines them into a sequence or procedure, and stores the procedure in the memory or storage device of the machine vision computing device. Suitable for use is a Model 5100 or Model 5400 machine vision system from Cognex, Inc. of Natick, Mass. with associated In-Sight Explorer™ software that offers a wide array of feature extraction, mathematical, geometric, label identification, and barcode symbol decoding subroutines. Output data produced by the position/orientation sensor 7 at the conclusion of each procedure are transferred to the mobile computer unit 25 through the wired or wireless methods.

The identification of the position marker 2, 3, the relative position of the marker within the field of view, the angular orientation, and the marker dimensions are processed by the mobile computer 25.

The decoded identification serves as a key to access marker position data, which is obtained from a lookup table in the mobile computer 25. The marker's actual position is calculated from the marker's position within the field of view; that is, its distance in pixels from the center of the field of view, and at what azimuth, but using actual positional and orientation values. The results are transformed from pixels into real dimensions such as feet or meters. The results can be saved and/or conveyed to other devices, such as the fixed base host computer 105, for storage, presentation, or other purpose. The cycle repeats once a full determination has been made.

Figure 3:
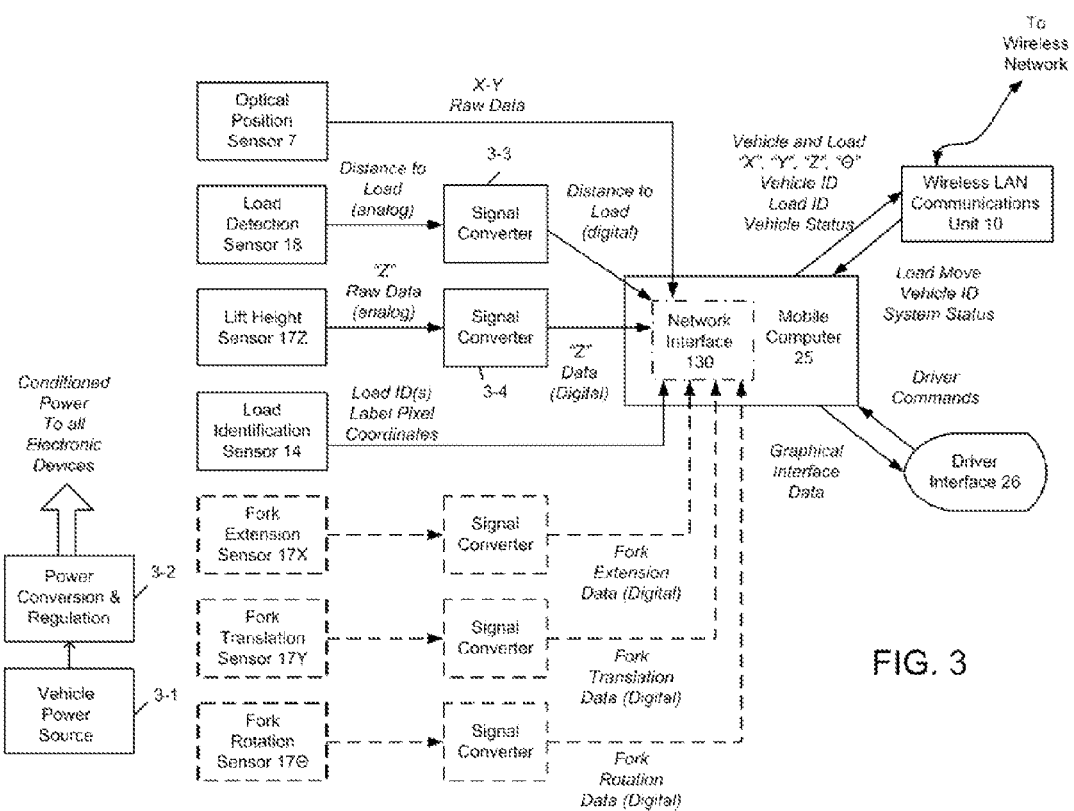
FIG. 3 shows a block diagram showing exemplary interconnection of components on the conveying vehicle.

FIG. 3 shows a system block diagram, showing exemplary interconnection of the components and the flow of data. The components on the vehicle include a vehicle power source 3-1, a power conversion and regulator device 3-2 that supplies conditioned power to the other components, the position/orientation sensor 7, the wireless local area network communications device 10, the reader 14 (load identification sensor 14), the lift height detection device 17Z, the fork extension sensor 17X, the fork translation sensor 17Y and the fork rotation sensor 17 θ and associated analog to digital signal converter 3-3, the load detection device 18 and associated analog to digital signal converter 3-4, mobile computer 25 having an internal network interface 130, and the driver interface 26.

The mobile computer 25 serves as a hub for the components mounted on the conveying vehicle. The components on the vehicle may communicate with the mobile computer through cables or by way of a wireless link implemented in accordance with any wireless local area network standard available in a particular country.

The load detection device 18 provides a signal indicating when the conveying vehicle lift apparatus has contacted the item being acquired. One preferred load detection device 18 provides an analog signal indicating the distance between the conveying vehicle lift apparatus and the asset being acquired. As shown in FIG. 2, a laser time-of-flight sensor, comprising a solid-state laser source and self-contained receiver, is mounted in a physically protected position on the lift mechanism backrest. The device operates on the principle that light propagates at a known rate. A beam emanating from a source exits the source and propagates toward the material being acquired, where it is reflected back, typically from the pallet or object (e.g., asset 1000) resting on the pallet, toward the source. The time of the beam's reception, is measured very precisely and an analog current or voltage is created in a linear fashion, corresponding to the duration of the beam's two-way flight. This analog signal is transmitted to an analog to digital signal converter (FIG. 3, box 3-3) and the digital representation is transmitted to the mobile computer unit 25. Laser time-of-flight sensors are available commercially from Sick Inc. of Minneapolis, Minn., IDEC Corporation of Sunnyvale, Calif., and IFMEfector of Exton, Pa. Alternatively a lift contact switch, an ultrasonic proximity sensor or other device may be used to serve as the load detection device 18.

A lift height detection device 17Z is used for determining the elevation of the lifting mechanism 11 on the conveying vehicle 6 relative to the warehouse floor. A laser time-of-flight sensor, an ultrasonic sensor, a string potentiometer, or a pressure sensitive device to measure difference in hydraulic pressure on the mast, may be used as the lift height detection device. As shown in FIG. 2, a preferred laser time-of-flight sensor, comprising a solid-state laser source 17Z and a retro-reflector 17R, is mounted on a forklift mast, operated on the principle that light propagates at a known rate. As above, a beam emanating from a source exits the source and propagates toward a retro-reflective target, where it is reflected back toward the source. The time of the beam's reception, is measured very precisely and a current or voltage is created in a linear fashion, corresponding to the time of flight. This analog signal is transmitted to an analog to digital signal converter (FIG. 3, Box 3-4) that transmits a digital representation of the analog value to the mobile computer unit 25. The aforementioned commercially available laser time-of-flight sensors may be used. Alternatively, a string potentiometer, a linear encoder, or other device may be used to serve as the lift height detection device 17Z.

Figure 4:
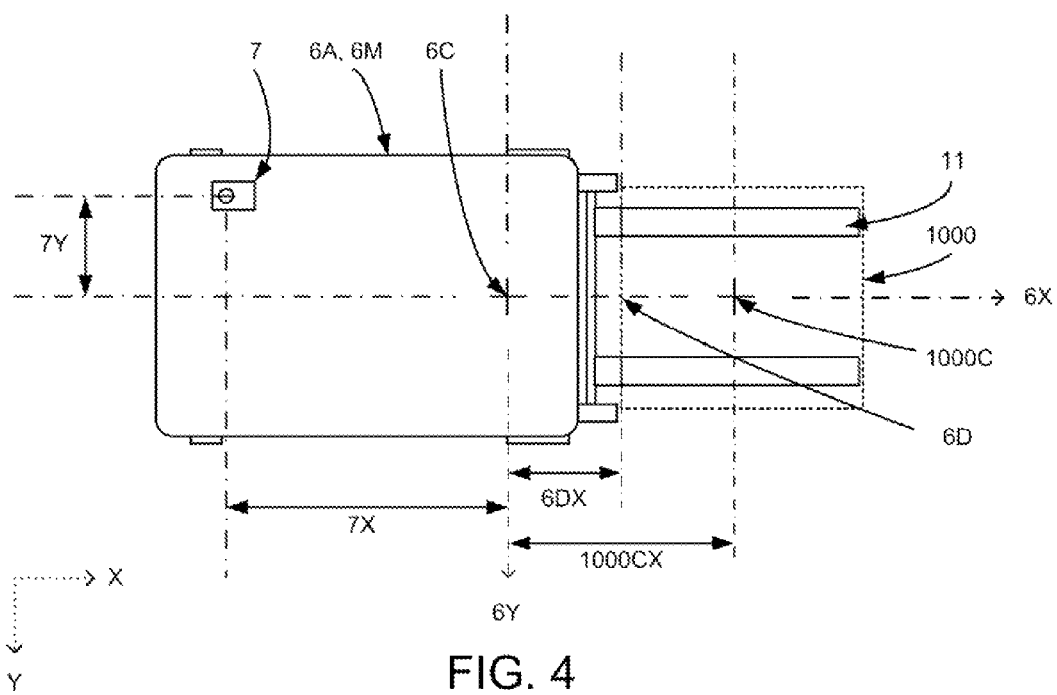
FIG. 4 is a plan view to show X and Y offsets of a position/orientation sensor camera from the center of the conveying vehicle.

FIG. 4 is a plan view of the conveying vehicle 6 showing vehicle centerlines 6X and 6Y, a vehicle center point 6C, a load datum point 6D on centerline 6X at the load backrest of the lifting device 11, and a load center point 1000C positioned at the center of the forks 11. Also shown is a position/orientation sensor 7 offset from the center 6C of the conveying vehicle in the X direction by distance 7X and in the Y direction by distance 7Y. In this figure, the conveying vehicle shown is a counterbalanced forklift truck.

Figure 5:
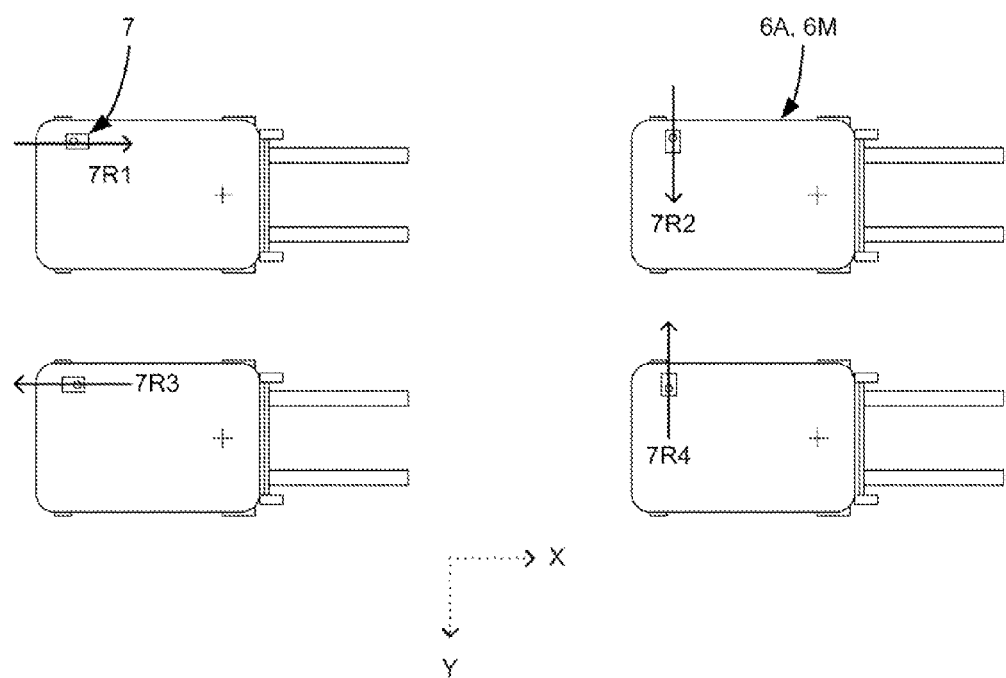
FIG. 5 is a plan view showing four possible orientations of a position/orientation sensor camera on the conveying vehicle.
Figure 6:
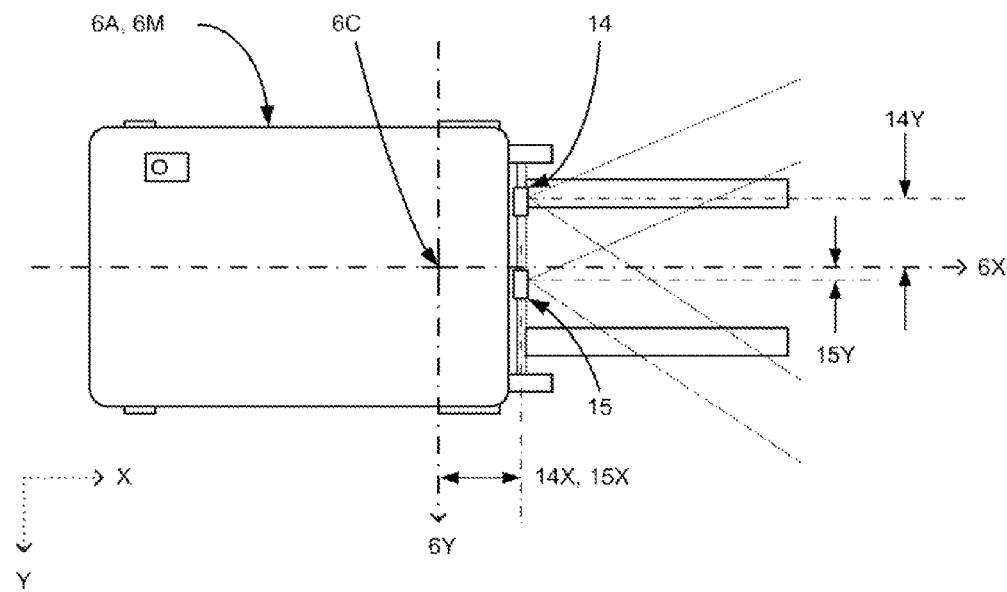
FIG. 6 is a plan view of two Label Readers showing horizontal X and Y offsets from the center of the conveying vehicle.

There are three key points on each vehicle; the vehicle center 6C, the load center 1000C, and the load datum, 6D. Dimensions between the vehicle center 6C and the other points are typically measured and/or calculated in convenient units such as inches or centimeters. The rotation angle of the position/orientation sensor 7 relative to the X-axis of the conveying vehicle 6 is shown in FIG. 5.

The load datum 6D is a point which defines the static offset of the load handling mechanism (forks, clamps, slipsheet, etc.) relative to the center 6C of the vehicle. This point marks the closest position to the vehicle center 6C, and to the floor, that a load can be held when acquired. The dynamic location of the Load Datum 6D is determined constantly by applying the sensor measurements 17X, 17Y, 17Z, 17θ which define the mechanical motion of the load handling mechanism relative to the vehicle center 6C (such as shown in FIGS. 2, 3, 4C, 4D, 4E).

The third point, load center 1000C, marks the approximate center of a typical unit load after acquisition. The prevailing use of standard size pallets causes the load handling mechanism center and load center to be closely matched.

The close proximity of the center of a particular load to the center of the forks 1000C is made possible by knowing type and size of unit loads transported, the type of conveying vehicle, the vehicle physical parameters, the load handling mechanism design, and so on. Unit loads commonly found in warehouses and distribution centers are supported by wooden pallets, plastic totes, or other ubiquitous carriers that have standardized dimensions. For example, about two billion pallets are in use in the U.S. and a large percentage of them are wood pallets measuring forty inches by forty eight inches. A load on board a standard pallet, when fully acquired by a conveying vehicle, will have its center 1000C within just a few inches of the fork center.

Figure 2A:
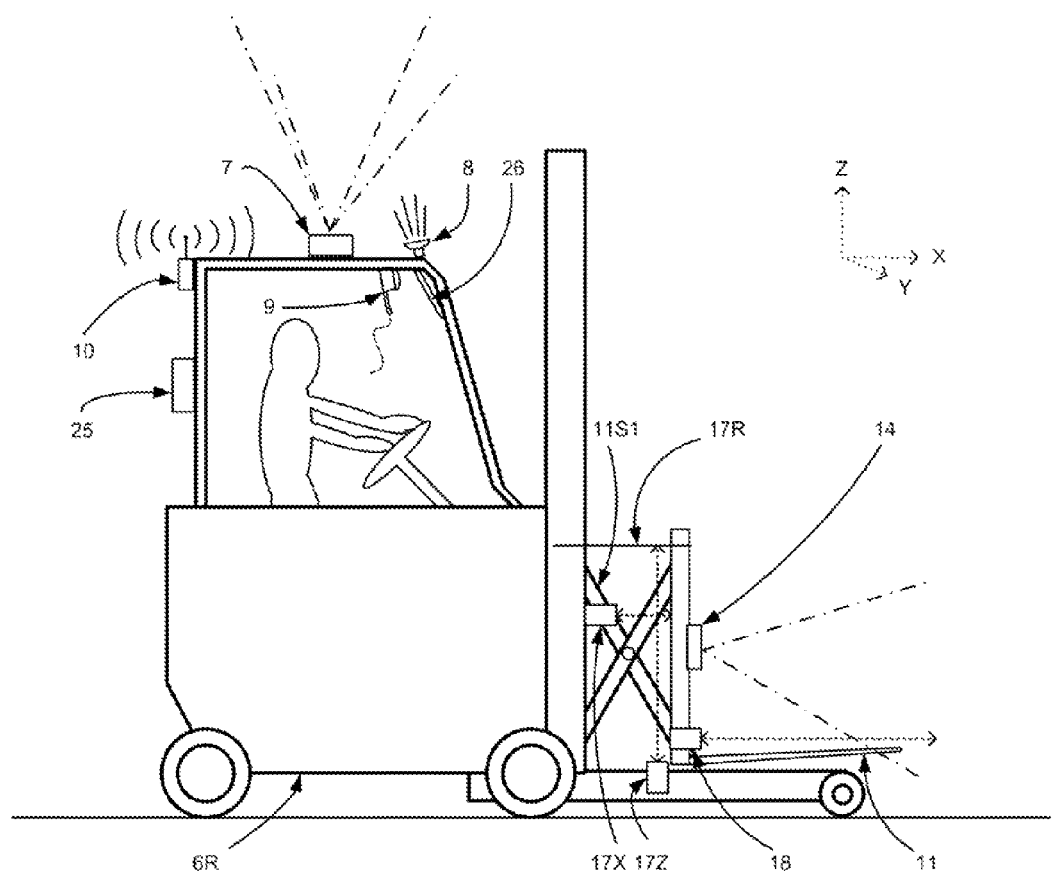
FIG. 2A shows an exemplary "Reach Truck" having fork extension scissors, with the scissors in the withdrawn, i.e., retracted, position.
Figure 2B:
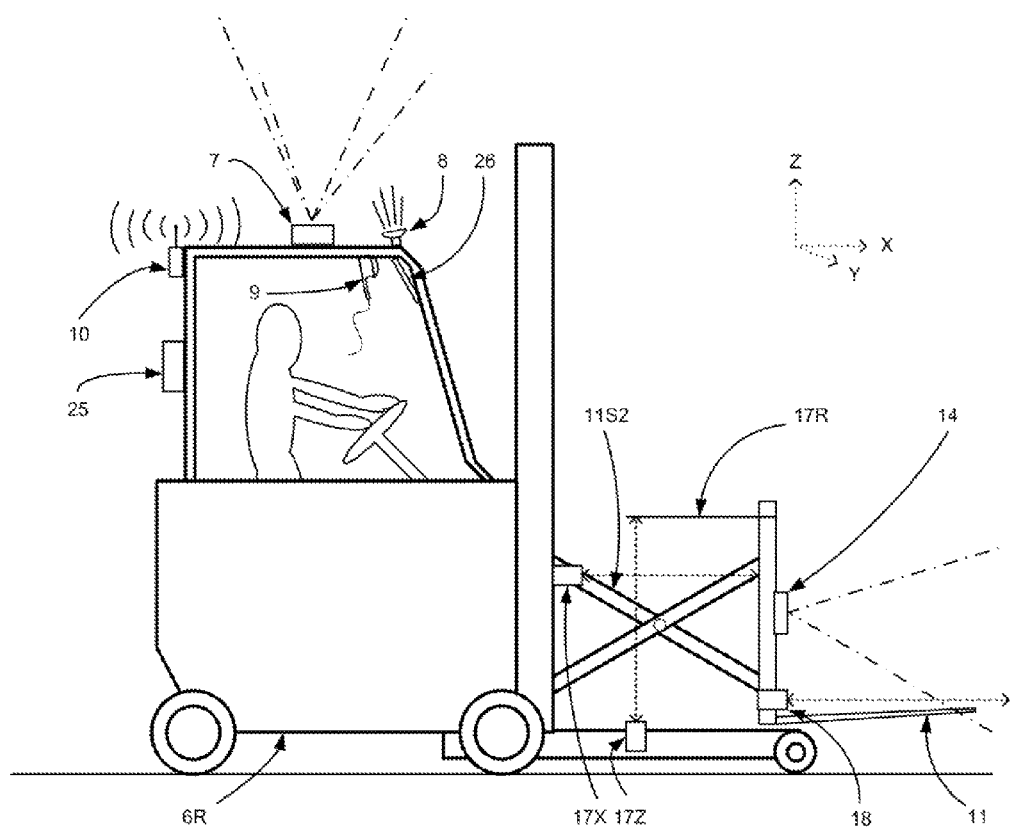
FIG. 2B shows a Reach Truck with the scissors in the extended position.
Figure 2C:
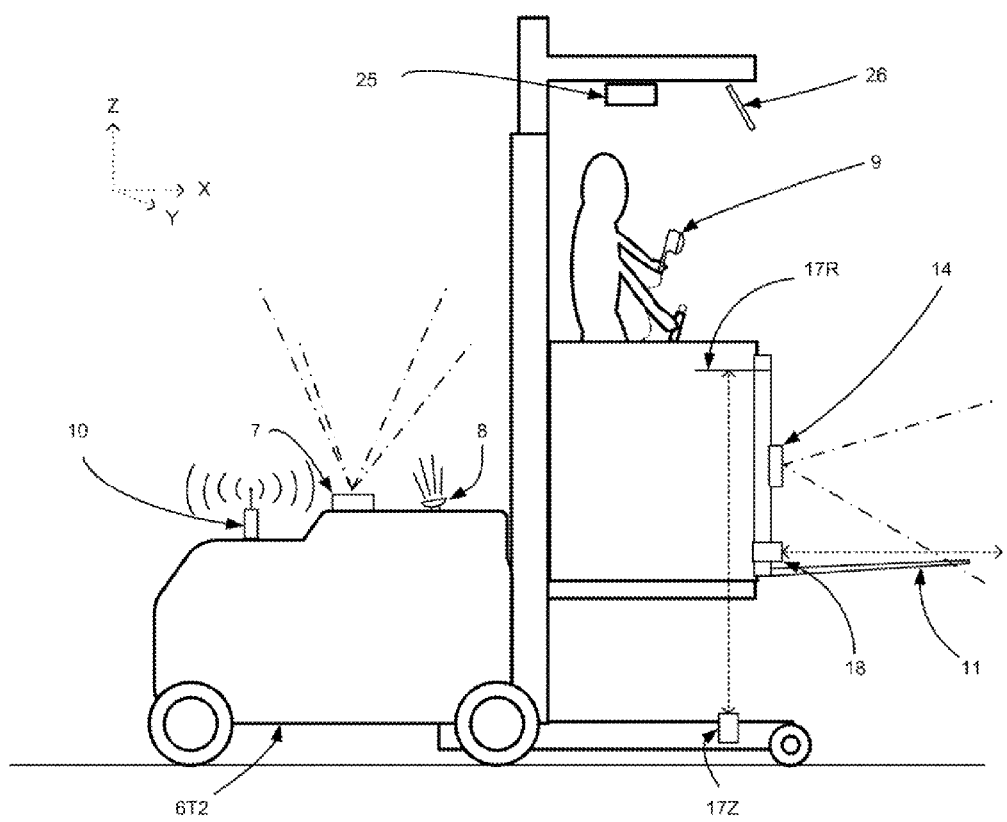
FIG. 2C shows an exemplary "man-up order picker" conveying vehicle with the operator lifted above the floor.
Figure 4A:
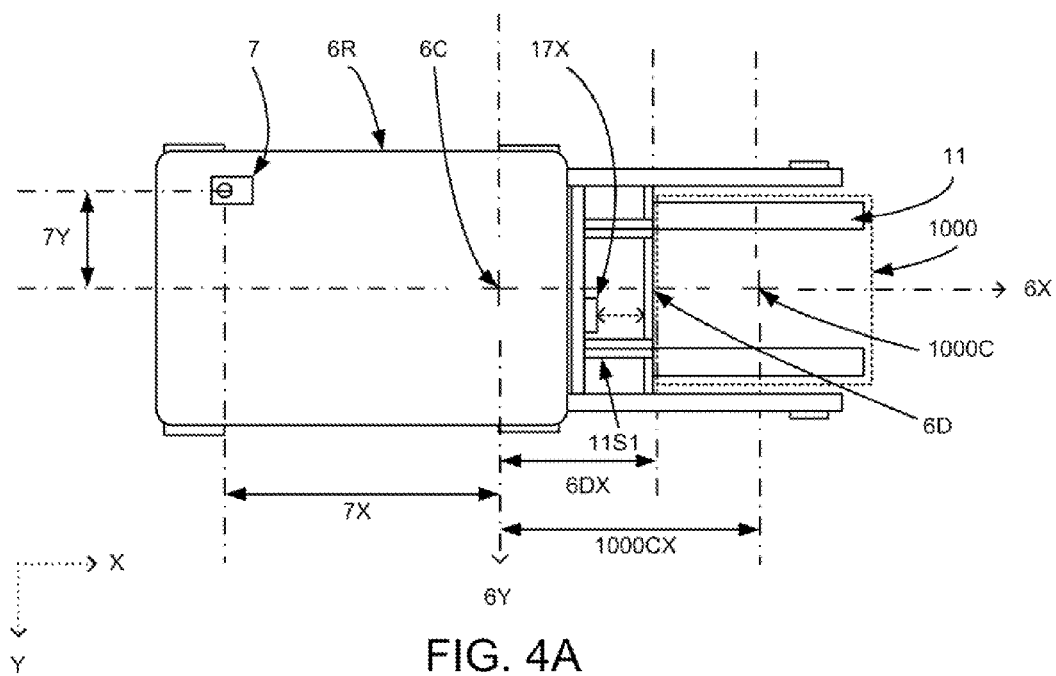
FIG. 4A is a plan view, corresponding to FIG. 2A, that shows X and Y offsets of a position/orientation sensor from the center of a reach truck conveying vehicle with the load handling mechanism withdrawn.

FIGS. 2A through 2C and 4A through 4E depict alternative conveying vehicles and illustrate the location of key points and sensors on each vehicle. FIGS. 2A and 4A show a reach truck 6R with scissor extension 11S1 withdrawn, so that the load handling mechanism is close to the vehicle body. A fork extension sensor 17X is mounted on the vehicle body and measures the distance between the vehicle and load backrest. This sensor is chosen to be similar to the load detection sensor 18 and lift height sensor 17Z, measuring the fork extension distance with time-of-flight optics. Datum point 6D (FIG. 4A) is therefore also close to the vehicle body.

Figure 4B:
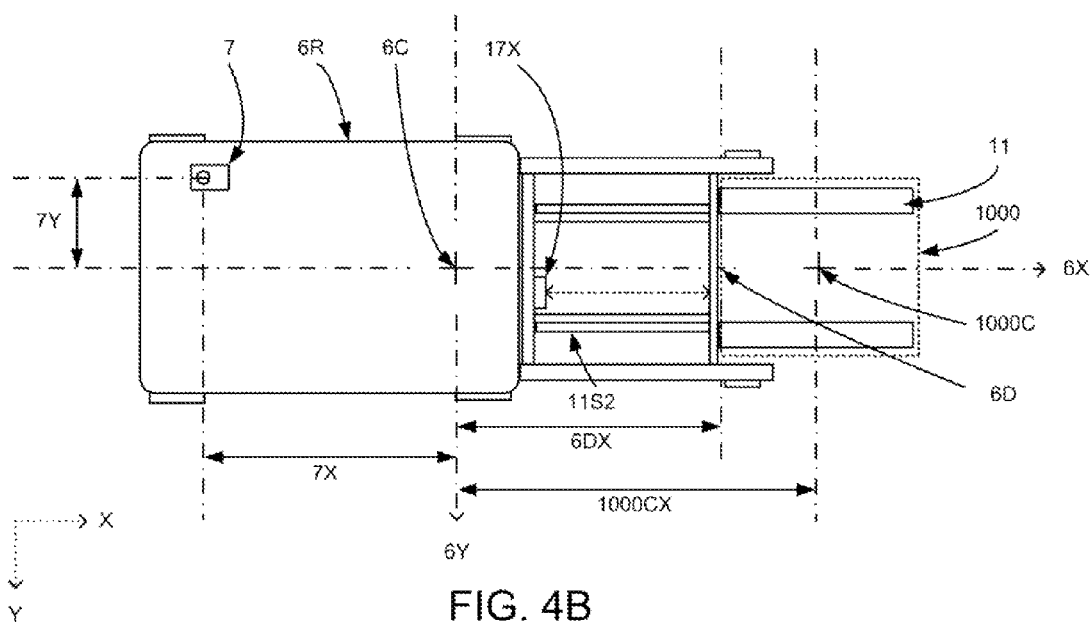
FIG. 4B is a plan view, corresponding to FIG. 2B, that shows X and Y offsets of a position/orientation sensor from the center of a reach truck conveying vehicle with the load handling mechanism extended.

FIGS. 2B and 4B depict the same vehicle with scissor extension fully extended in position 11S2, thereby moving points 6D, 1000C forward and away from the vehicle body. Consequently, dimensions 6DX and 1000CX are greater than when the scissors were withdrawn, and the load detection sensor 18 is moved forward along with the load handling mechanism.

Figure 4C:
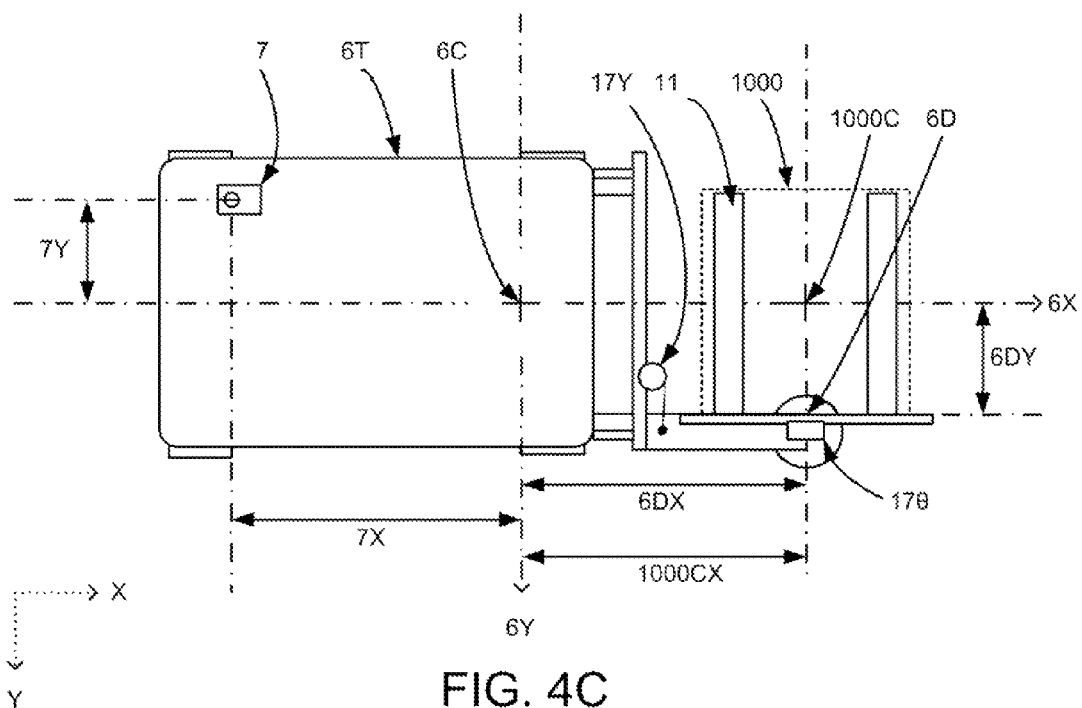
FIG. 4C is a plan view to show X and Y offsets of a position/orientation sensor from the center of a "turret truck" conveying vehicle with the load handling mechanism centered and rotated left.
Figure 4D:
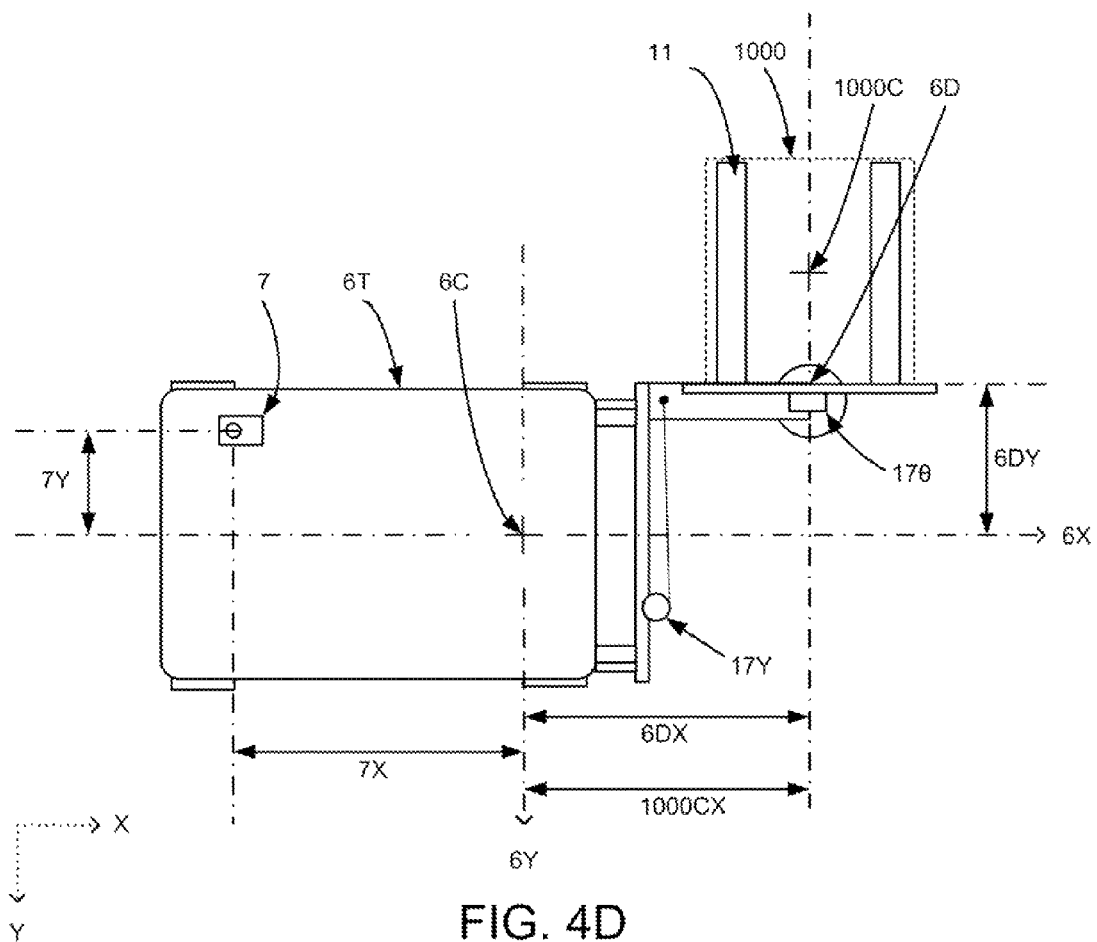
FIG. 4D is a plan view to show X and Y offsets of a position/orientation sensor from the center of a "turret truck" conveying vehicle with the load handling mechanism translated left and rotated left.
Figure 4E:
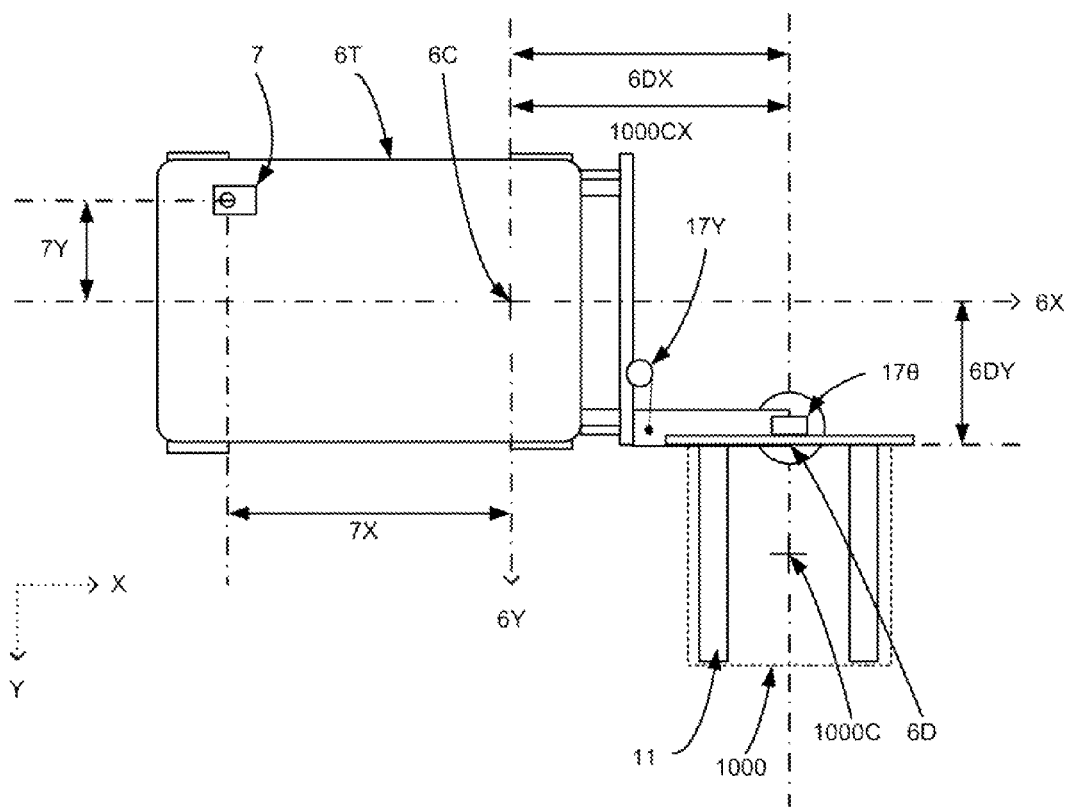
FIG. 4E is a plan view to show X and Y offsets of a position/orientation sensor from the center of a "turret truck" conveying vehicle with the load handling mechanism translated right and rotated right.

FIGS. 4C, 4D, and 4E depict a "turret truck", which provides fork rotation (orientation) and fork translation (Y axis) as well as lift (Z axis). FIG. 4C illustrates a fork translation sensor (string potentiometer) 17Y affixed to the truck body, with string attached to the load handling mechanism. Fork rotation sensor 17θ ("Seventeen Theta") is affixed to the turret (circular apparatus at Point 6D) to measure fork rotational orientation. Points 6D and 1000C, shown in each figure, move relative to the truck body and center point 6C as the load handling mechanism is shifted from side to side and rotated.

Figure 7:
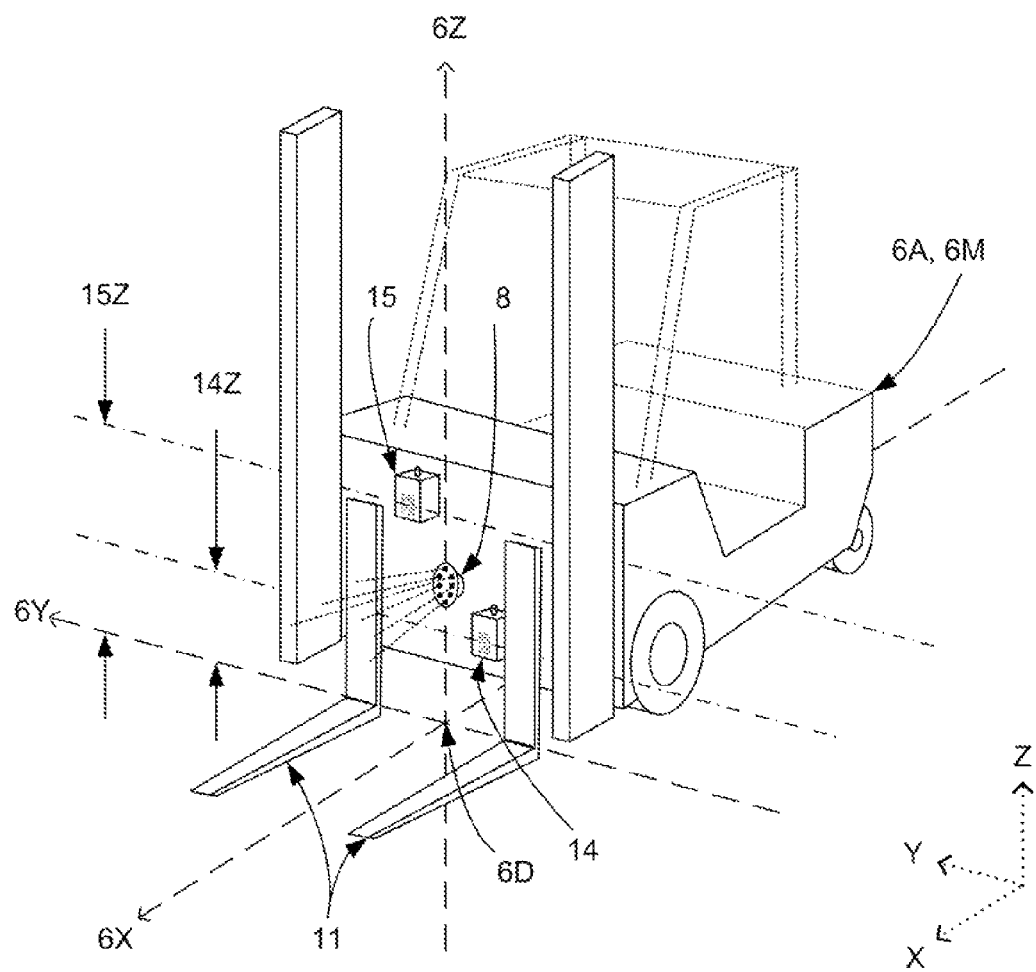
FIG. 7 is a perspective view of a conveying vehicle showing vertical Z offsets of two Label Readers relative to the Load Datum Point.

As best seen in FIGS. 2 and 7, one or more label readers 14, 15 are mounted on a conveying vehicle 6 to view a unit load 1000, i.e., an asset, as it is acquired or deposited by the conveying vehicle 6. An optional light source 8 provides illumination of the asset labels to optimize the label readers' ability to operate in environments with dark and bright areas. The light source may be of conventional types including visible incandescent, infrared, LED, or other standard commercial types. The sensors automatically find, decode the identity and locate unit loads that come within the field of view by recognizing a barcode label affixed to each load. Coded label 30 can be recognized and decoded for one- and two-dimensional barcodes (such as shown in FIGS. 9A through 9E and FIG. 10) in any orientation. The sensors 14, 15 may employ a commercial machine vision system such as the Cognex Model 5400. Output data are produced by an image analysis procedure detailed in FIG. 35 and may be stored in the machine vision system or transferred to the mobile computer unit 25.

The label reader sensor 14 preferably runs automatically and continuously, typically acquiring and analyzing images several times per second. When a recognizable barcode indicia 30D, 30L (FIGS. 9A, 9C) is found, the sensor decodes the barcode, calculates its location in pixels within the field of view, and the location in pixels of certain key points on the barcode. The sensor searches the entire image and performs the calculations for all barcodes found within the image. Data for all recognized barcodes is output via a standard computer communication protocol and interface such as Ethernet, RS-232, or USB to mobile computer unit 25.

In some embodiments, the label reader sensor 14 and the position/orientation sensor 7 include the following components: 1) a digital image acquisition system, e.g., a digital camera including a lens and optional filter, and image storage system; 2) a digital image processing system, e.g., a computer processing unit having a storage unit for analyzing digital images and extracting information from the image; 3) an optional lighting system 8 to illuminate the scene to be imaged. The lighting system may be controlled for timing and intensity by the sensors; 4) stored instructions in the storage unit cause the processing unit to analyze a digital image to recognize a barcoded label, to calculate its location and its size; 5) stored instructions control overall operation of the sensors and cause it to output the information in a standard computer system interface protocol; 6) stored instructions to set up and configure the sensor for use in a particular environment and for a particular use; 7) an enclosure suitable for installing the sensor in mobile industrial environments; and 8) an input/output interface for communicating with the mobile computer unit 25.

Each label reader 14, 15 (FIG. 6) is mounted in a generally forward facing position, in the direction of the vehicle's load handling mechanism, e.g., to the vehicle front in FIGS. 4, 4A, 4B and 6; to the vehicle's left in FIG. 4D, and to the vehicle's right in FIG. 4E, to view loads as they are approached. Depending on the size of the label reader sensor, the type of load handling mechanism, and other vehicle-specific variables, label readers may be mounted permanently to the vehicle frame, or they may be mounted to moving apparatus (carriage equipment) such as the load backrest or forks (FIG. 7). In the latter case the label coordinates are continuously determined in the coordinates of the load handling mechanism (FIG. 8) and then translated to vehicle coordinates depending on the dynamic location of the load handling mechanism. Distance in the X dimension between the vehicle center point 6C and label readers 14 and 15 are shown as dimensions 14X and 15X in FIG. 6. Transverse offsets from the vehicle centerline 6X along the vehicle Y axis for each label reader are shown as 14Y and 15Y in FIG. 6.

Figure 8:
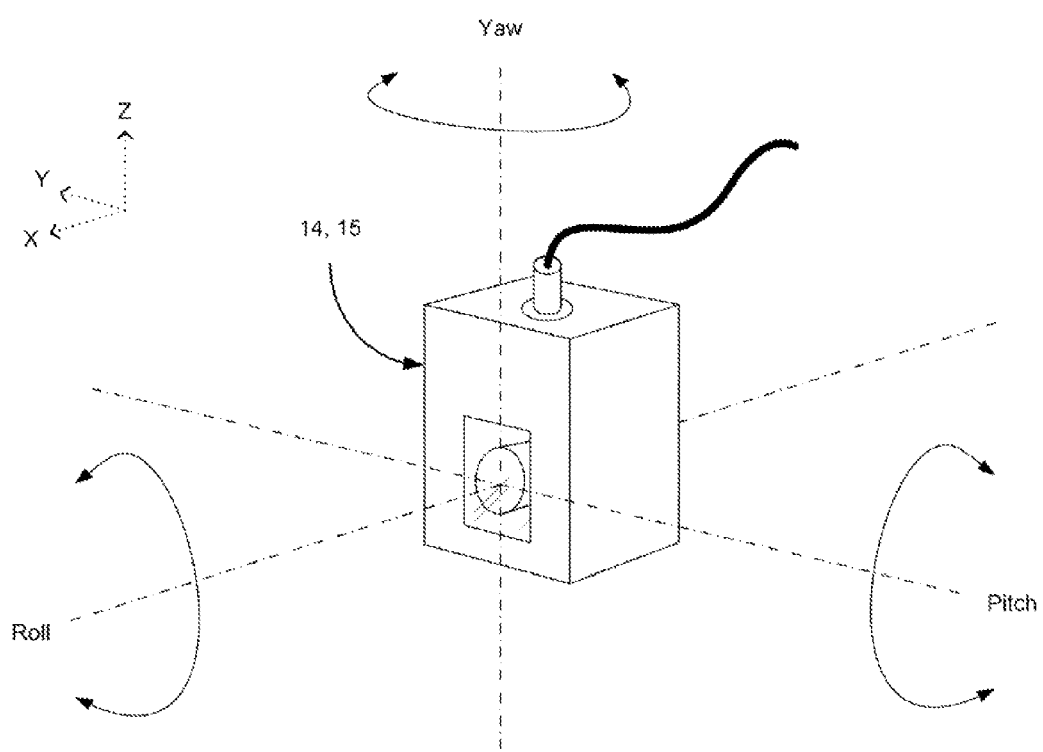
FIG. 8 depicts the coordinate axes of the vehicle and the pitch, roll and yaw axes of a Label Reader sensor.

In most cases, the label reader(s) will ride on the load handling mechanism so that they move vertically with the forks. FIG. 7 is a perspective view of a conveying vehicle showing vertical Z offsets 14Z, 15Z of two Label Readers 14 and 15. As illustrated, the Z offset(s) may be measured from the bottom of the lift mechanism 11. The total Z position is then the sum of the height of the lift mechanism as measured by lift height sensor 17Z (FIG. 2) and respective offset 14Z or 15Z. Further, each label reader sensor may be aimed in a direction most suitable for detecting labels, and three axes of rotation are possible: yaw, roll, and pitch. FIG. 8 illustrates the rotation axes relative to the conveying vehicle 6.

Machine-readable labels are used for marking fixed assets and non-fixed assets. They are used in conjunction with the present invention to identify the object to which they are attached, and to provide indicia that can be readily detected, decoded, and spatially located. Labels are usually tamper-evident, permanent or frangible and usually contain a barcode for electronic identification using a machine vision reader or laser-based barcode scanner. A typical label that can be used with the present invention serves the dual purpose of providing a target that can be detected by a label reader sensor, and providing machine-readable symbols (barcodes) which encode data identifying the asset.

Labels may be constructed of adhesive backed, pressure sensitive label stock such as paper or polyester, available from many suppliers. Printing is typically done by direct thermal or thermal transfer methods. In some cases, indicia are printed directly on the item, such as a drum or carton using conventional printing methods such as ink jet spray marking, or offset printing. Although labels may be of any size, the industry standard four-inch by six-inch label format is chosen for many applications.

Figure 9A:
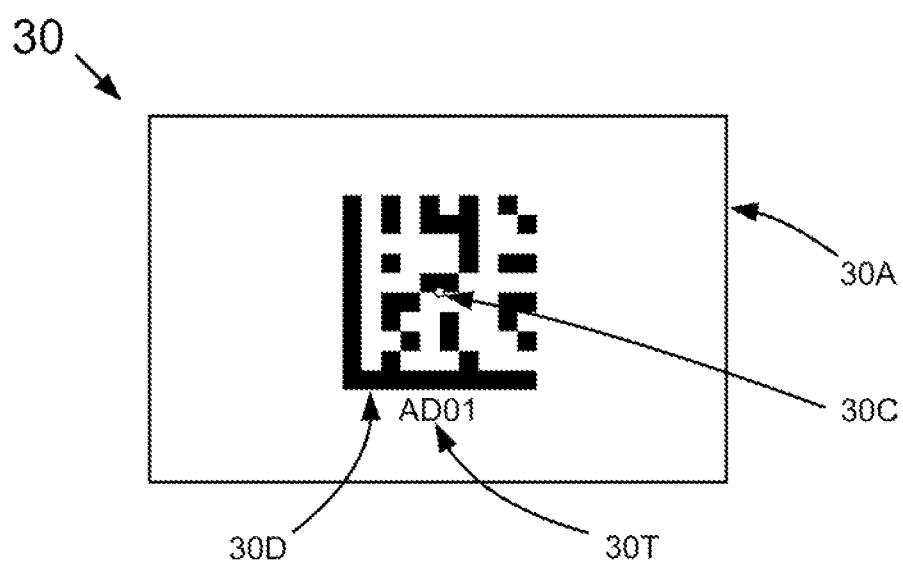
FIG. 9A depicts a typical item label with a two-dimensional barcode.

FIG. 9A shows a typical unit load label 30 with two-dimensional matrix barcode 30D, barcode center point 30C, and human readable text 30T imprinted or affixed to a label substrate 30A. The substrate may be of paper, polyester, or other common medium, or the printing may be applied directly to the unit load item.

Figure 9B:
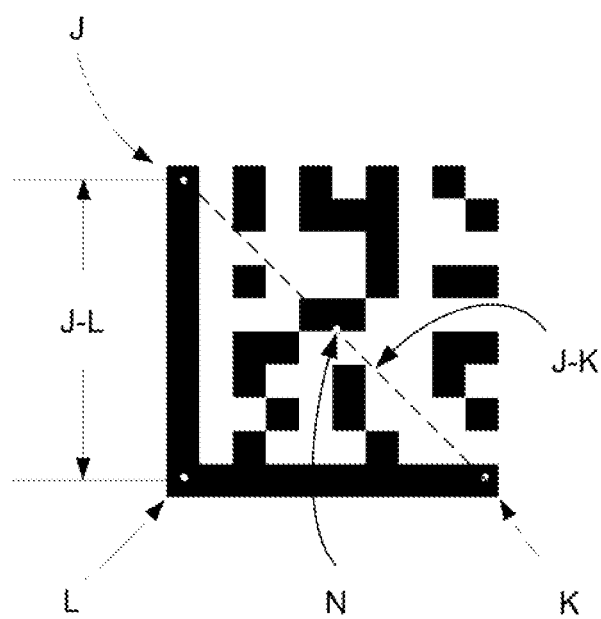
FIG. 9B depicts a two-dimensional barcode useful for a load identification label.
Figure 16:
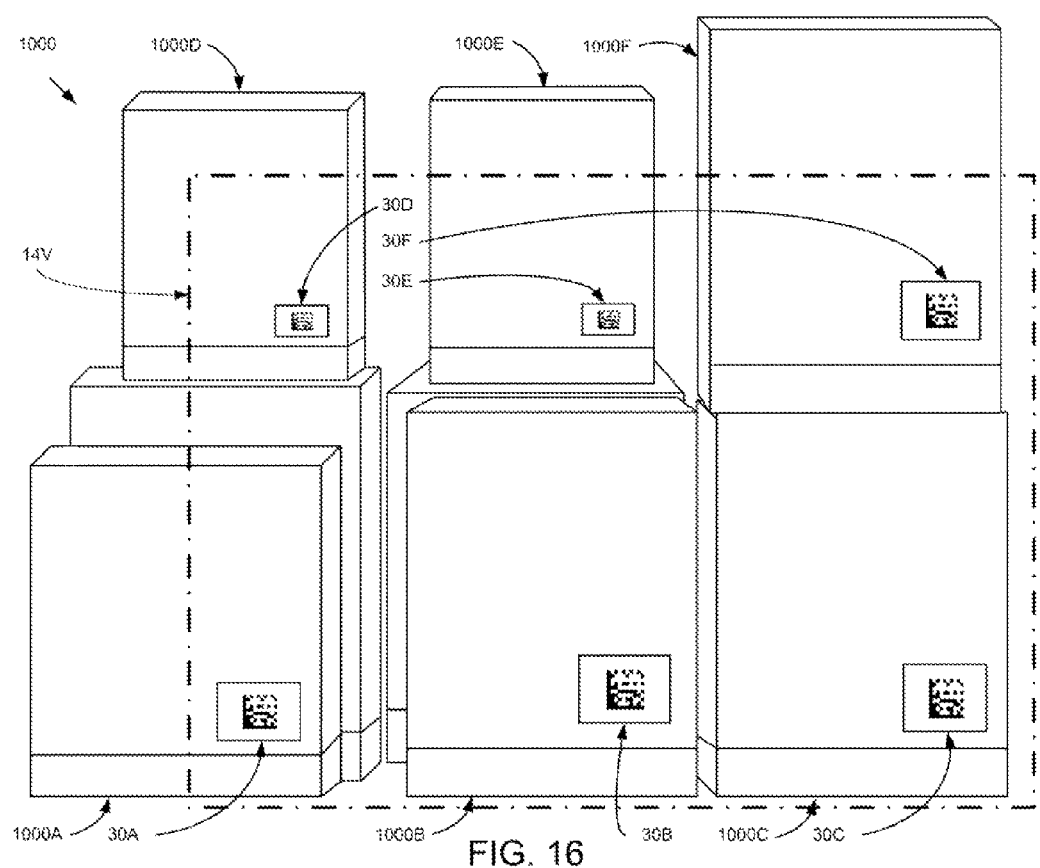
FIG. 16 shows the image acquired by the label reader.

FIG. 9B shows a detail of two-dimensional barcode symbol, as it may be printed on an asset label. Machine vision software determines the three key points of each barcode symbol upon the symbol's detection. Points J, K, and L are located at the corners of the Datamatrix symbol's finder bars. The symbol center point N is determined to be at the midpoint of line segment J-K. Line segment J-L is used to determine the size of the symbol in the label reader's field of view 14V (FIG. 16).

Figure 9C:
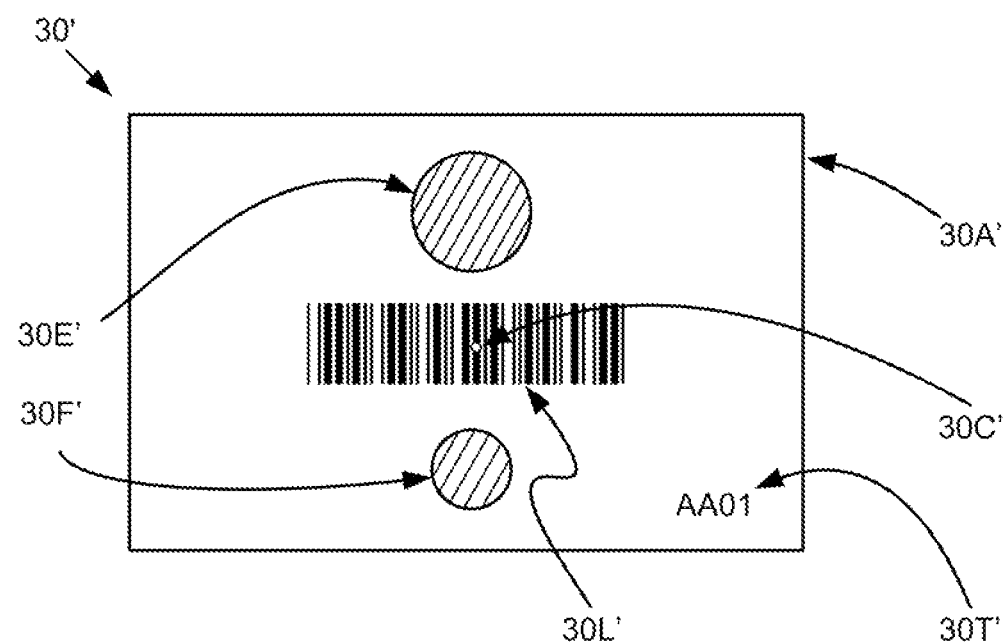
FIG. 9C depicts an item label or load label having a one-dimensional barcode.

FIG. 9C shows a variant of the label 30' that utilizes a linear barcode 30L' as the indicia. Substrate 30A' supports label 30L' that contains geometric symbols 30E' and 30F'. Human readable text 30T' is included for convenience.

Figure 9D:
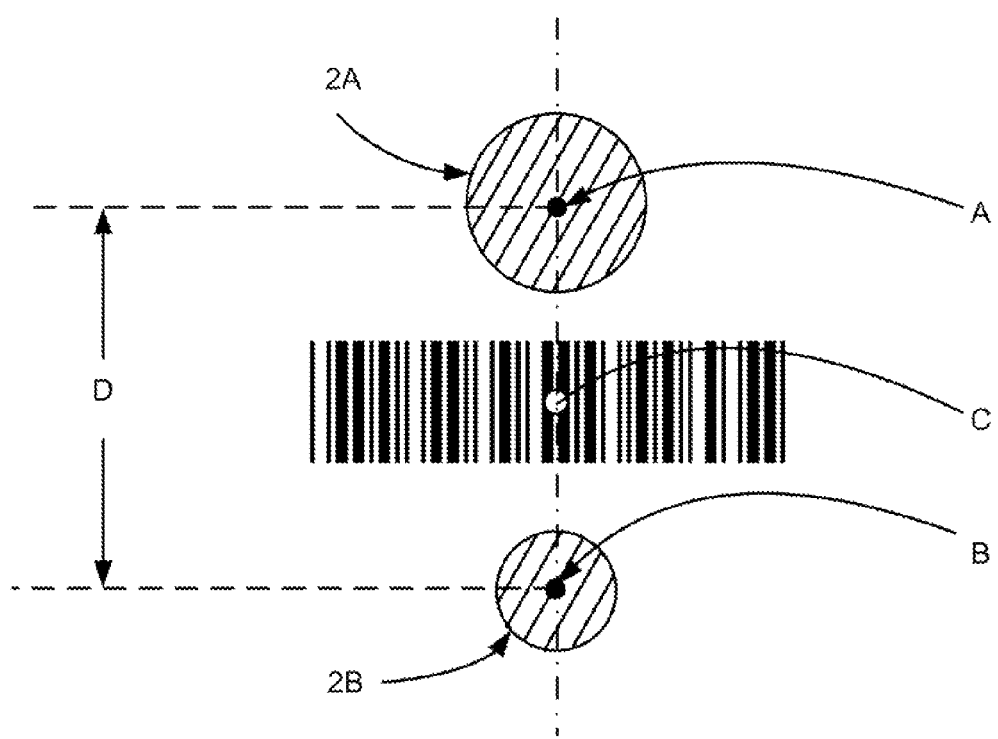
FIG. 9D depicts a one-dimensional barcode useful for a load identification label.

FIG. 9D details the linear barcode version of a position marker or an asset label. Geometric shape 2A has center point A; geometric shape 2B has center point B. The mid-point between A and B indicates the center of the marker (or label), which coincides with the center of the linear barcode symbol, point C.

Figure 9E:
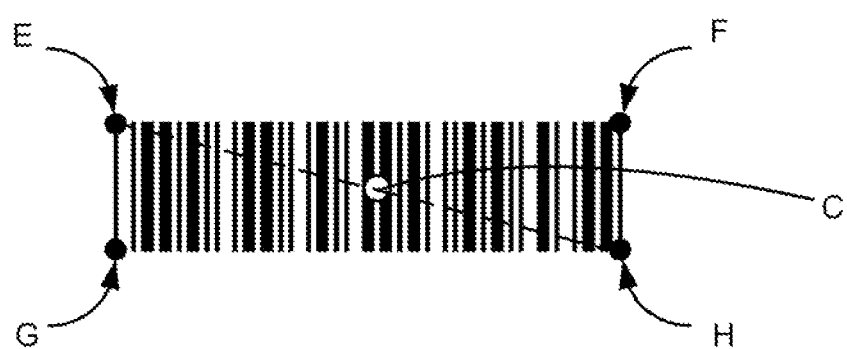
FIG. 9E depicts an alternative one-dimensional barcode useful for a load identification label.

FIG. 9E depicts an alternative one-dimensional barcode useful for a load identification label. Points E, F, G, and H identifying the four corners of the bar code symbol are used to calculate the symbol center C.

Figure 10:
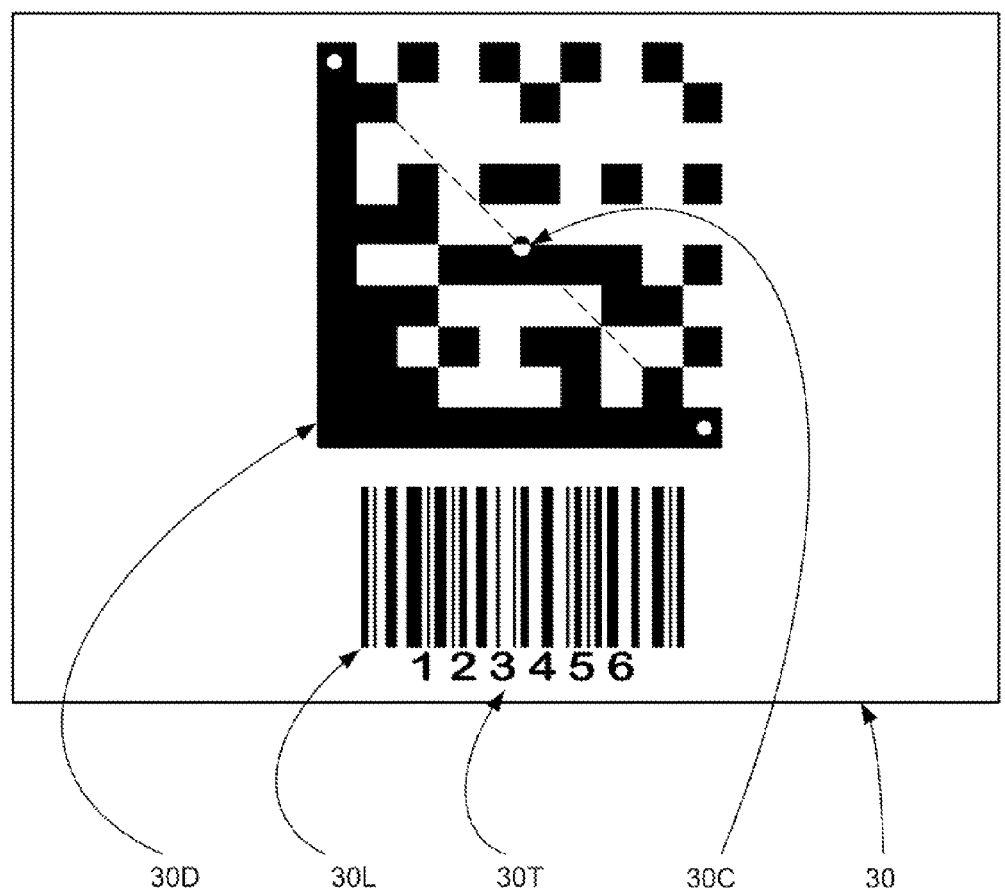
FIG. 10 is a depiction of a typical label used for load identification.

FIG. 10 shows a typical asset label 30 incorporating both a two-dimensional and a one-dimensional barcode. A paper or polyester substrate material is imprinted with two-dimensional barcode symbol 30D. In this case, the Datamatrix symbology is chosen for the barcode symbol. Barcode center 30C is indicated at the middle of the symbol (shown also in FIG. 9B). Linear barcode 30L is included to facilitate manual scanning with a hand-held barcode scanner 9 (FIG. 2), and human readable text 30T is included for the convenience of operations personnel, should either barcode become unreadable.

Embodiments of the present invention may utilize commercially available indoor vehicle navigation methods and apparatus, including, but not limited to those described in U.S. Pat. No. 7,845,560 and U.S. patent application Ser. No. 12/807,325, to determine the position and orientation of an object—in this case, a conveying vehicle—in a three dimensional coordinate space. Embodiments of the present invention may also use improved position and orientation determination methods, including, but not limited to those described in U.S. patent application Ser. No. 12/321,836, which teaches how loads may be identified by a label reader 14, which decodes a barcode 30D, 30L imprinted on the load label 30.

The label reader sensor 14, which is typically placed in the load backrest (11 in FIG. 2) area of a conveying vehicle 6, views in a direction toward the load where unit load labels 30 are likely to be seen. As it detects a label and tests the label for readability (FIG. 35), geometric measurements are made to determine the center 30C of the label indicia relative to the field of view. Using the center position 30C of the label 30 in the field of view and the apparent size of the label in the image a transformation is made from the label reader's coordinate system (pixels) to the vehicle coordinate system. As described, for example, in U.S. Pat. No. 7,845,560 and U.S. patent application Ser. No. 12/807,325, the position and orientation of the vehicle 6 are also known at that moment in time, allowing a second transformation to take place, which then produces the three dimensional position of the indicia's center in the facility's coordinate system, i.e., "actual" or "real" space.

Figure 30:
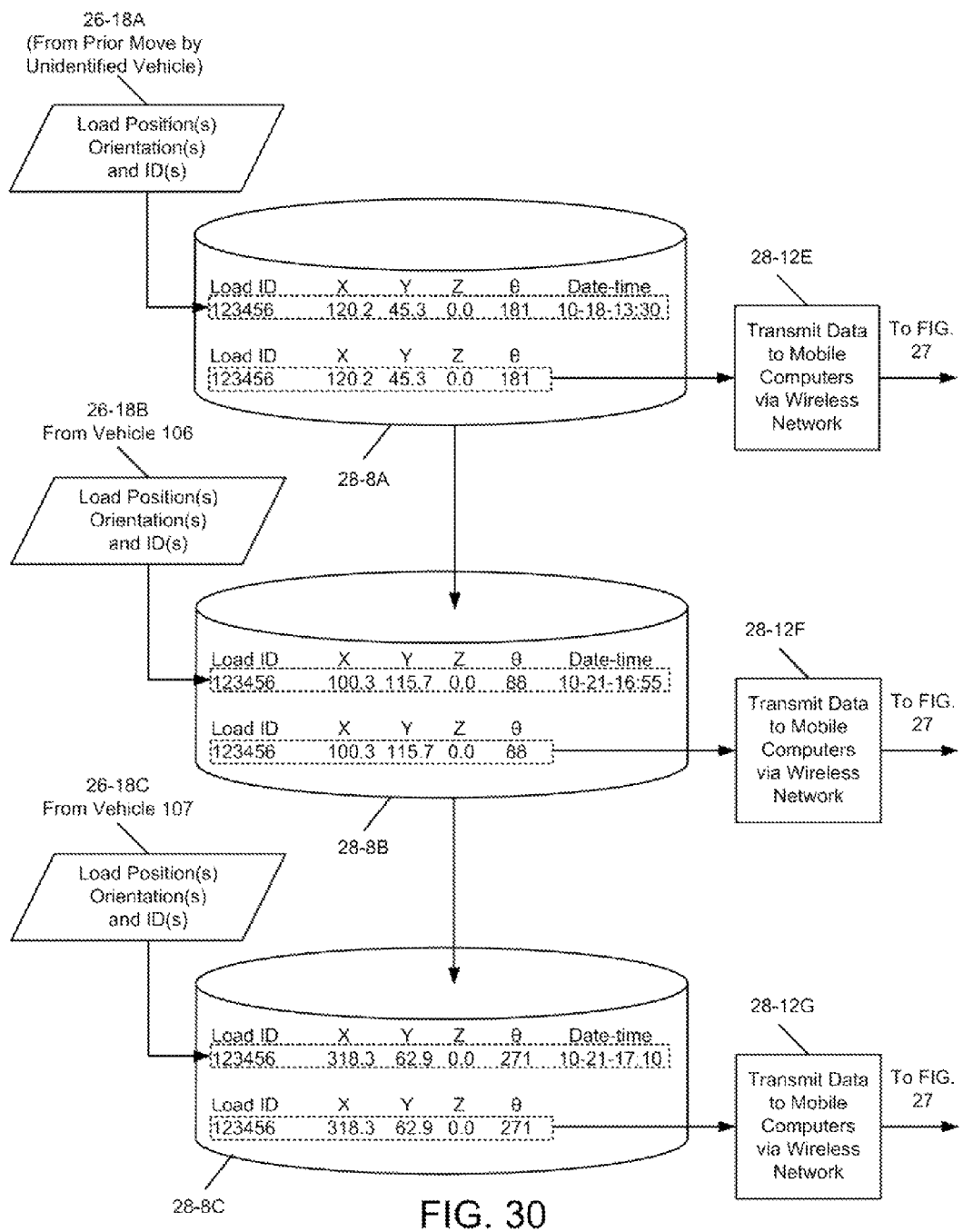
FIG. 30 shows the load ID, position and orientation data stored in an exemplary Global Load Map database in the mobile computer at three times: when a load was previously deposited at a bulk storage location; when the load has been deposited in an aisle by the fourth vehicle; and when the load has been acquired by a fifth vehicle and moved to and deposited at a destination position.

According to one aspect of the invention, a Label Map database is created comprising the accumulation of data derived from labels read by the label reader(s) 14, 15. Referring to FIG. 30, label reader(s) 14, 15 on board each conveying vehicle 6 continually read unit load labels 30 as the vehicles drive within the coordinate space of a facility. As labels 30 are read, the three-dimensional location (center of indicia 30C) and load identity of each label 30 are transformed into facility coordinate space and stored in the Local Label Map database in the memory of the mobile computer 25.

The Local Label Map database is stored locally in the memory of the computer 25 on board each vehicle 6 and/or it may be transmitted wirelessly by communications links 10 from each roving vehicle 6 to the controller 105 and maintained in the controller memory. For an individual vehicle, the "Local Label Map" database will contain the identity and position of only those unit load labels 30 that were seen (detected and decoded) during the travels of this particular vehicle or were previously downloaded to the mobile computer from the Global Label Map. In some embodiments, a Global Label Map is maintained in controller 105, including the accumulation of all unit load label identities and coordinates determined by all vehicles in the fleet.

Upon the label reader's detection of a unit load label and subsequent calculation of the label's location in the coordinate space, label data is merged and averaged with any other data for that label already present in the Label Map database. Averaging improves the accuracy and reliability of Label Map data.

According to another aspect of the invention, a virtual space in the shape of a rectangular cuboid, termed a Targeting Lane 600, the size of which is defined in configuration parameters within the mobile system, is projected in front of the load handling mechanism or the lifting mechanism of the vehicle 6 from the load datum point 6D into the virtual space of the Label Map. The position and orientation of the vehicle are used to define the datum point from which the projection is made. Preferably, this Targeting Lane 600 is slightly larger than the height, width, and depth of the typical unit load 1000 for that facility.

As unit load labels 30 are detected, decoded and located by the label reader(s) 14, 15, they are stored in the Local Label Map. According to another aspect of the invention, each label record in the Label Map that has a coordinate position encompassed by the Targeting Lane is selected as a potential target load. As the vehicle 6 approaches a collection of unit loads (seen in FIG. 11) a Targeting Lane is defined by mobile computer 25. Unit load labels 30 stored in the Label Map that lie within the projected Targeting Lane 600 are considered as potential loads when a vehicle 6 approaches a unit load 1000 (or stack of multiple loads) to convey it.

Figure 17:
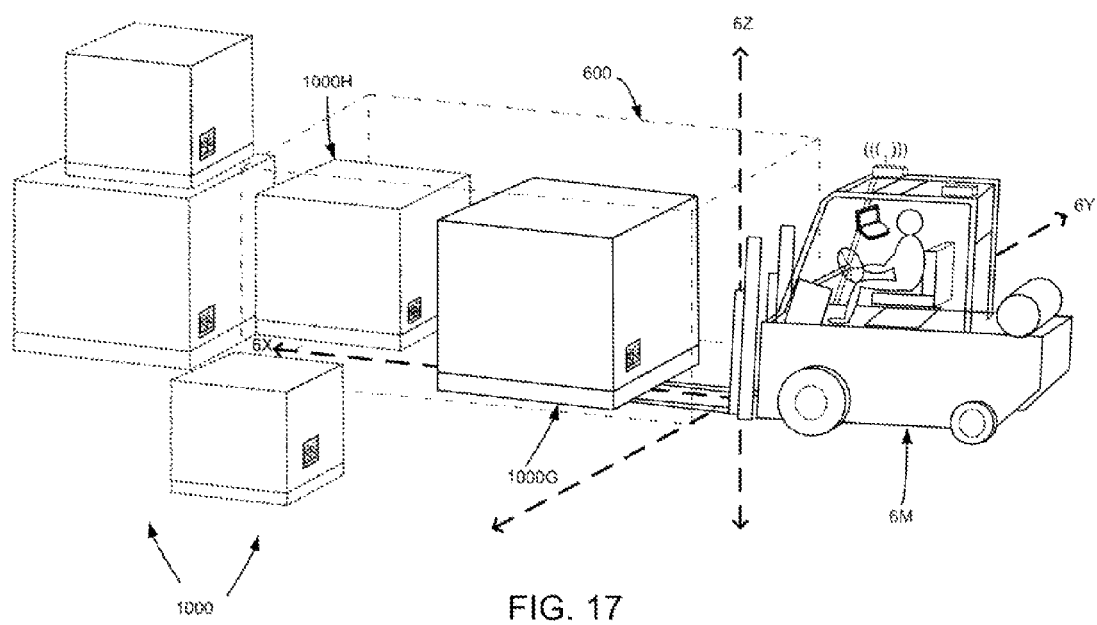
FIG. 17 shows the interaction of the Targeting Lane with a plurality of loads.
Figure 17A:
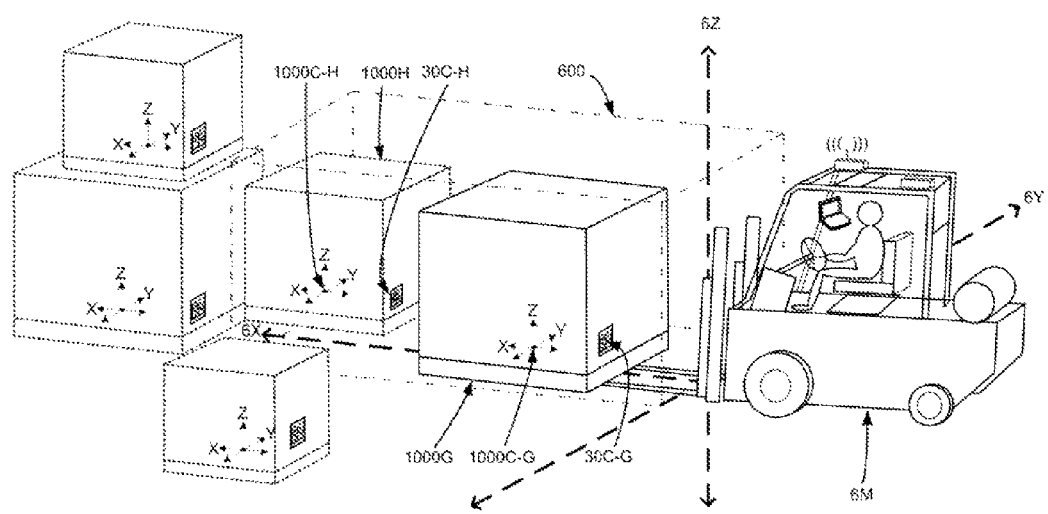
FIG. 17A shows the Targeting Lane as a conveying vehicle approaches and shows the label positions and positions and orientations of two loads within the Targeting Lane and the label positions and positions and orientations of other loads in the vicinity of the Targeting Lane.
Figure 17B:
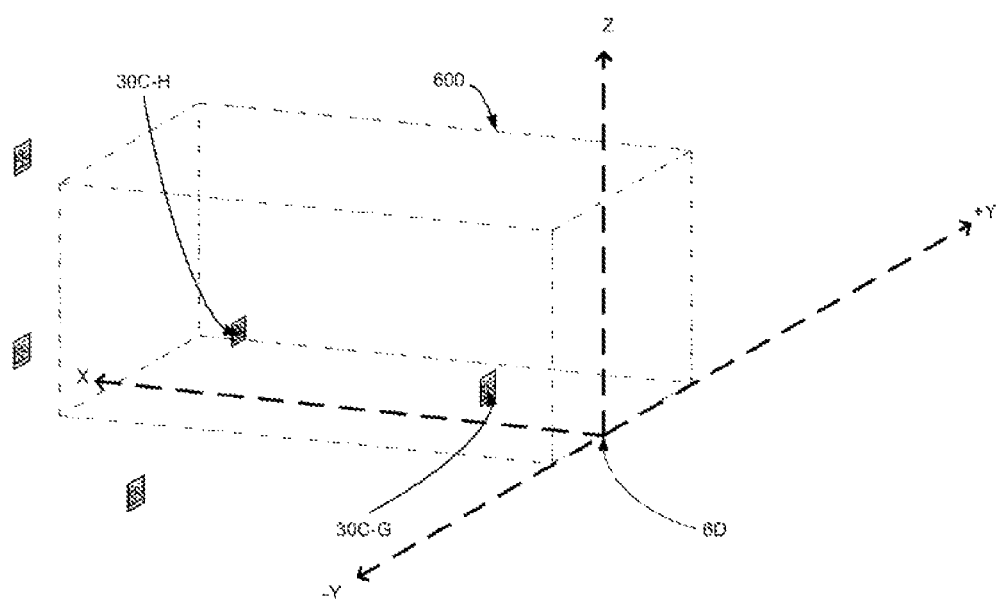
FIG. 17B shows the Targeting Lane and the positions of two labels within the Targeting Lane and the positions of other labels in the vicinity of the Targeting Lane.
Figure 17C:
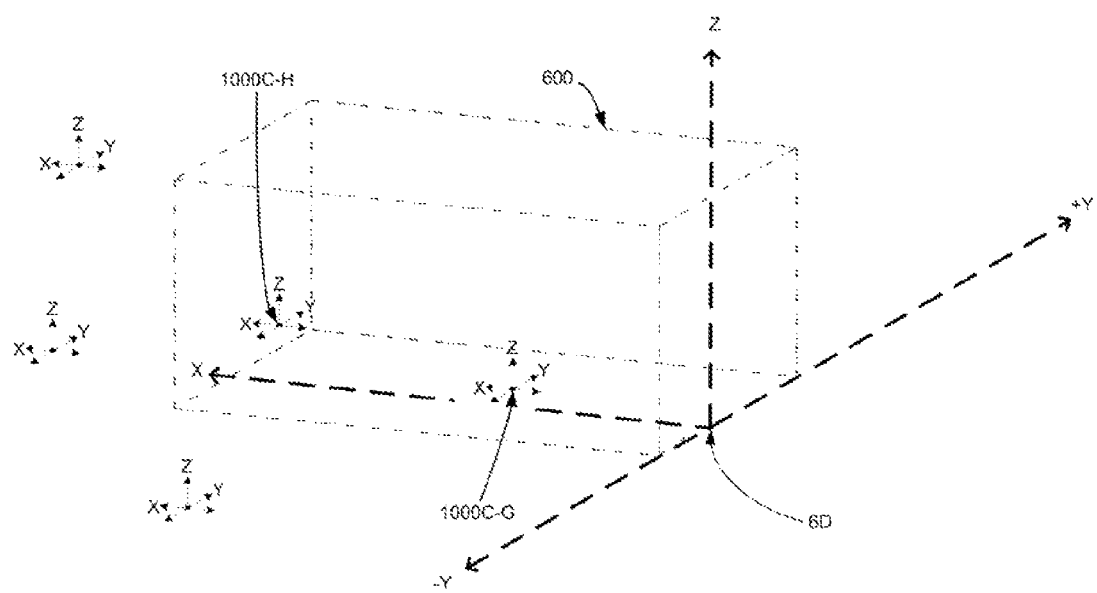
FIG. 17C shows the Targeting Lane and the positions and orientations of two loads within the Targeting Lane and the positions and orientations of other loads in the vicinity of the Targeting Lane.
Figure 17D:
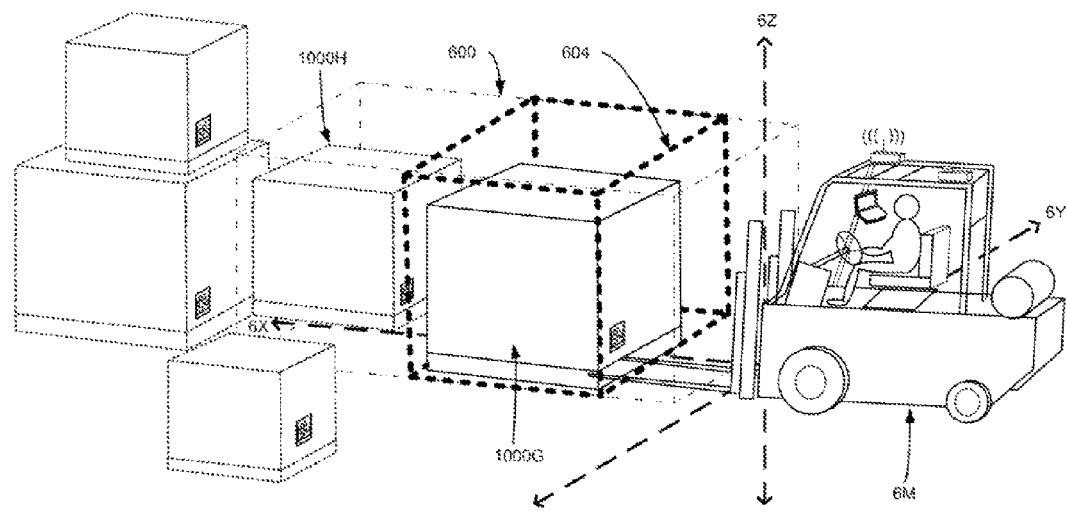
FIG. 17D shows the conveying vehicle approaching the load within a Target Cube.

As shown in FIG. 17D, a Target Cube 604 is used to discriminate labels of interest from others that might lie within the Targeting Lane. The discrimination occurs in lateral (side-to-side, i.e., along axis 6Y), vertical (i.e., along axis 6Z), and depth (i.e., along axis 6X) dimensions. The front face of the Target Cube 604 is defined by the label closest to the vehicle datum point 6D found within the Label Map that falls within the Targeting Lane 600.

Figure 11:
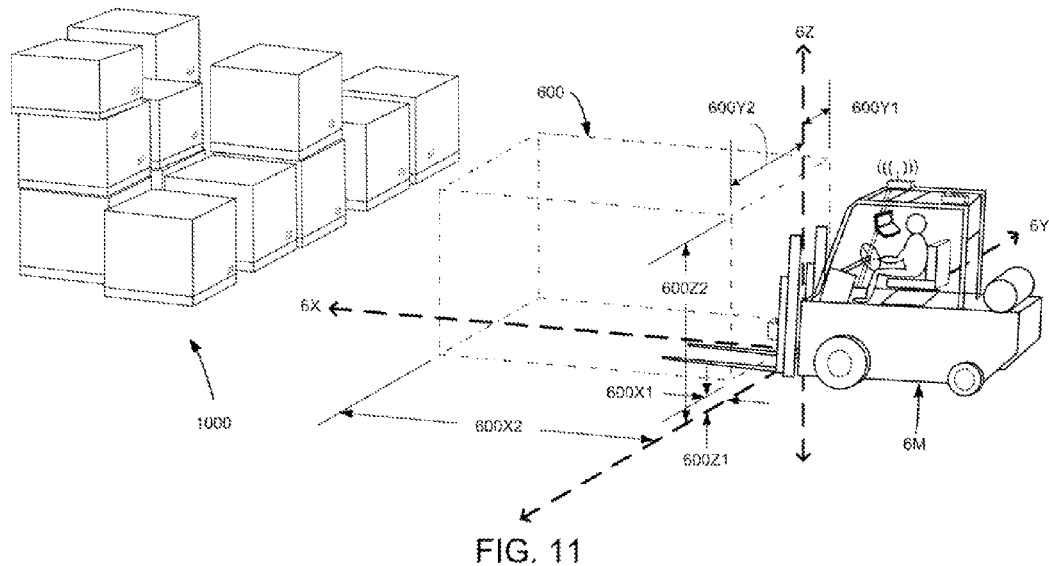
FIG. 11 shows a manned conveying vehicle approaching a stack of unit loads and Targeting Lane projected from the front of the conveying vehicle and shows details of the Targeting Lane.

FIGS. 11 through 24 illustrate a system utilizing a single label reader. FIGS. 11, 12, 13, and 14 show a sequence of views. FIG. 11 shows the parameters that are used to define the Targeting Lane 600. The face nearest the conveying vehicle is defined by distance Targeting Lane 600X1 from the Y axis through the lifting device datum 6D (see FIG. 7). The face farthest from the conveying vehicle is defined by distance Targeting Lane 600X2. Lateral sides of the lane are defined by distances Targeting Lane 600Y1, Targeting Lane 600Y2, from the X axis of the vehicle. The bottom of the Targeting Lane 600 is defined by distance 600Z1 and the top of the Targeting Lane 600 is defined by distance 600Z2. Thus, the Targeting Lane is a rectangular cube having six (6) planar faces and eight (8) corner points, each corner point being defined in three dimensions in facility coordinates. All corner points are determined by the horizontal position (X, Y) of the conveying vehicle 6 and the elevation (Z) and rotational orientation (Θ) (e.g. 17θ in FIG. 4C) of the load handling mechanism 11. Thus, the targeting Lane 600 has an X-dimension of 600X2–600X1, a Y-dimension of 600Y2+600Y1, and a Z-dimension of 600Z2–600Z1.

Figure 12:
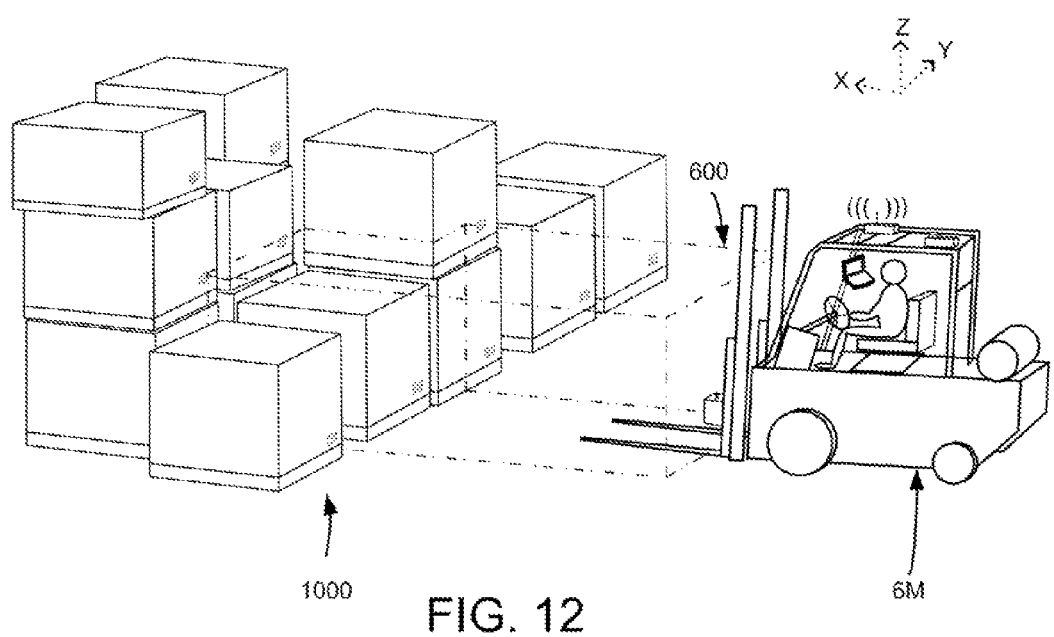
FIG. 12 shows a manned conveying vehicle approaching a stack of unit loads where some of the unit loads lie within the Targeting Lane.

FIG. 12 shows a manned conveying vehicle 6M approaching a stack of unit loads 1000 where some unit loads lie within the Targeting Lane 600. While all loads are too distant to be acquired by the vehicle, several labels and one load center are present in the Targeting Lane. The Targeting Lane 600 may be adjusted laterally to accommodate the positioning of the labels on the unit loads 1000. It should be appreciated that separate Targeting Lanes may be defined for discriminating the Label Map and for discriminating the Load Map.

Figure 13:
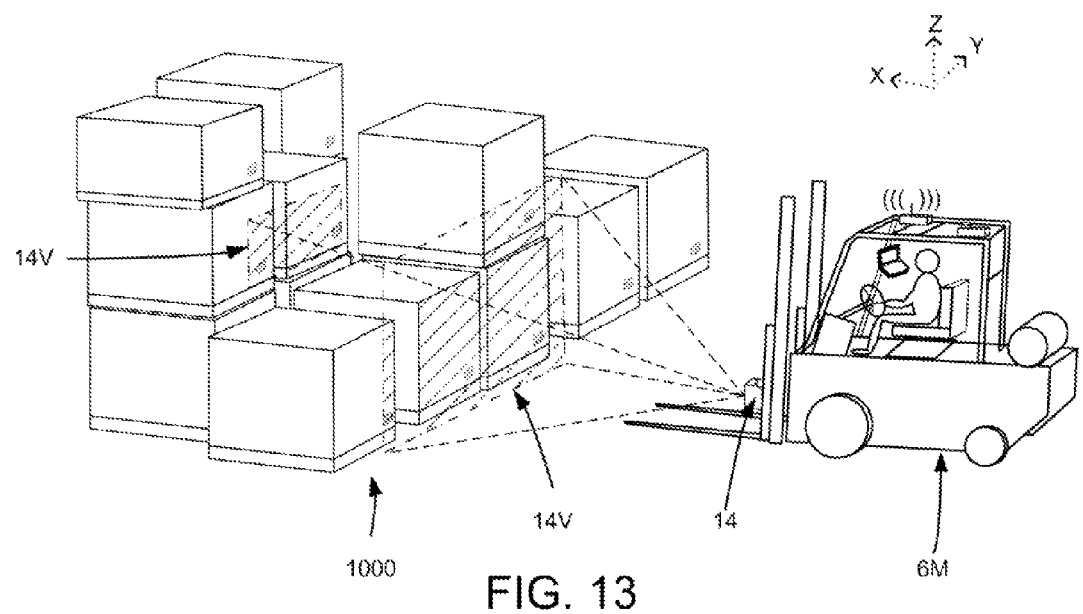
FIG. 13 shows the field of view of a Label Reader mounted on the conveying vehicle.

FIG. 13 shows the field of view 14V of a single Label Reader sensor 14, which is mounted on the conveying vehicle. The field of view encompasses several unit load labels (not clearly visible in the diagram) in the unit load stack.

Figure 14:
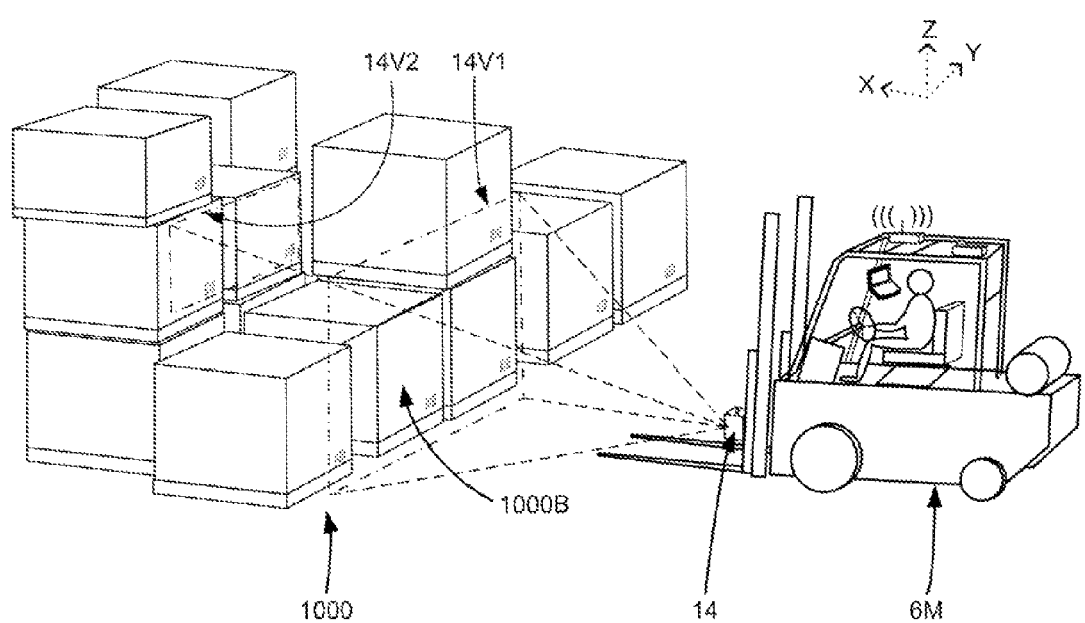
FIG. 14 shows the label reader field of view encompassing six labels of unit loads.

FIG. 14 shows the single label reader 14 field of view 14V encompassing six labels of unit loads 1000, with the labels visible in the diagram. Load 1000B is the item of interest as the vehicle approaches the stack. Label reader 14 has only a single view 14V. 14V1 indicates where the view 14V encompasses the nearest stack of loads. 14V2 indicates where the view 14V encompasses the farthest stack of loads.

Figure 15:
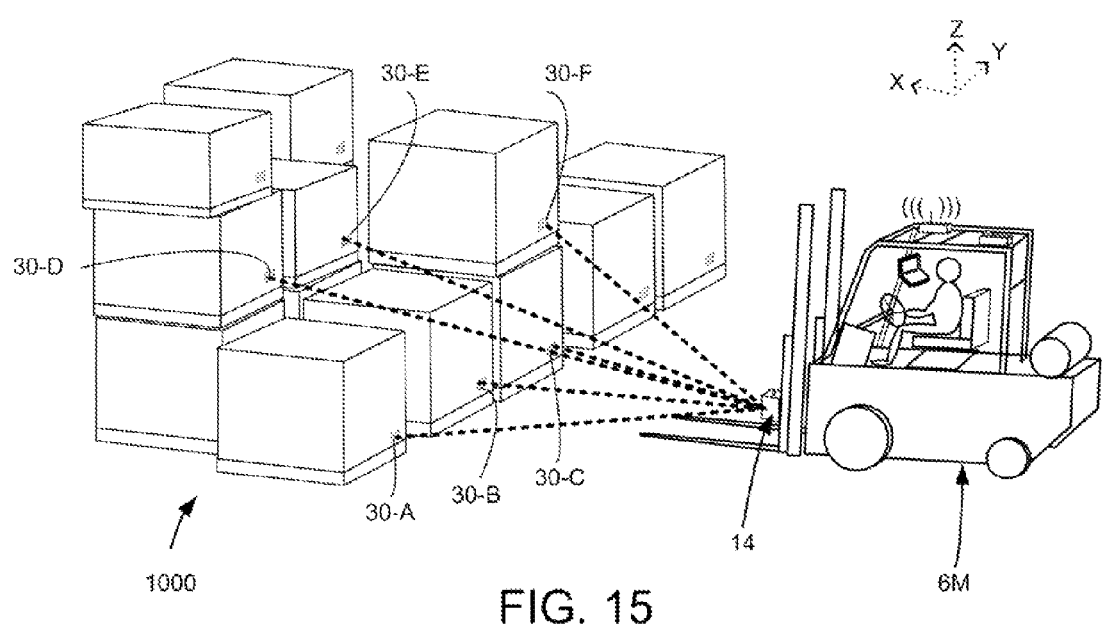
FIG. 15 shows vectors from the label reader to each of the six labels within the field of view of FIGS. 13 and 14.

FIG. 15 shows vectors from the label reader 14 to each of the labels 30A, 30B, 30C, 30D, 30E, 30F within the field of view. The direction of each vector is used to determine the position of each label relative to the label reader 14 and thus the position of each label relative to the conveying vehicle 6. Since the position of the conveying vehicle 6 is known, thus the position of each label is known within the facility coordinates.

FIG. 16 shows an image seen by the label reader 14 showing loads 1000A through 1000F identified by respective labels 30A, 30B, 30C, 30D, 30E, 30F at one instance in time. It should be noted that FIG. 16 shows that labels of different sizes can be accommodated. For example, a special identifying character may be incorporated to identify the label size.

FIG. 17 is a "real space" depiction of a conveying vehicle approaching a plurality of unit loads 1000. Targeting Lane 600 encompasses two loads 1000G, 1000H in the lane. In this instance, load 1000H is behind load 1000G. The Targeting Lane, which exists only in virtual space, is indicated by the dash-dot-dot line. Targeting Lane dimensions and proximity to the vehicle are defined in the mobile computer memory, based on system configuration parameters and the current position and orientation of the conveying vehicle. The Targeting Lane discriminates loads 1000G and 1000H, which lie within the lane, from other nearby loads.

FIGS. 17A through 17F show a sequence of events as a vehicle approaches and acquires a load. FIG. 17A depicts label center positions 30C-G for unit load 1000G, and 30C-H for load 1000H. These label positions were stored in the Local Label Map prior to the present moment, and were determined by the mobile computer to lie within the Targeting Lane 600. Load centers, which describe load positions and orientations 1000C-G and 1000C-H are shown as X, Y, and Z coordinates (illustrated by small dotted axes). These points were stored in the Local Load Map prior to the present moment, and are determined to lie within the Targeting Lane as defined in conjunction with the Load Map.

FIG. 17B shows Label Map virtual space (e.g., computer memory), wherein the two labels of interest 30C-G and 30C-H lie within the Targeting Lane 600. Label Map data for labels that lie outside the Targeting Lane are ignored.

FIG. 17C shows Load map virtual space with the centers 1000C-G and 1000C-H of two unit loads of interest lying within the Targeting Lane 600. All other data for load centers that lie outside the Targeting Lane are ignored.

FIG. 17D is a "real space" rendering of the conveying vehicle showing Target Cube 604 encompassing only unit load 1000G. The Target Cube 604 is created in virtual space by the mobile computer, which calculates the proximity of loads 1000G and 1000H to the vehicle; then accepts the closest load 1000G as the load to be acquired. This can be done in either or both the Label Map or the Load Map or a mathematical union of both Maps.

Figure 17E:
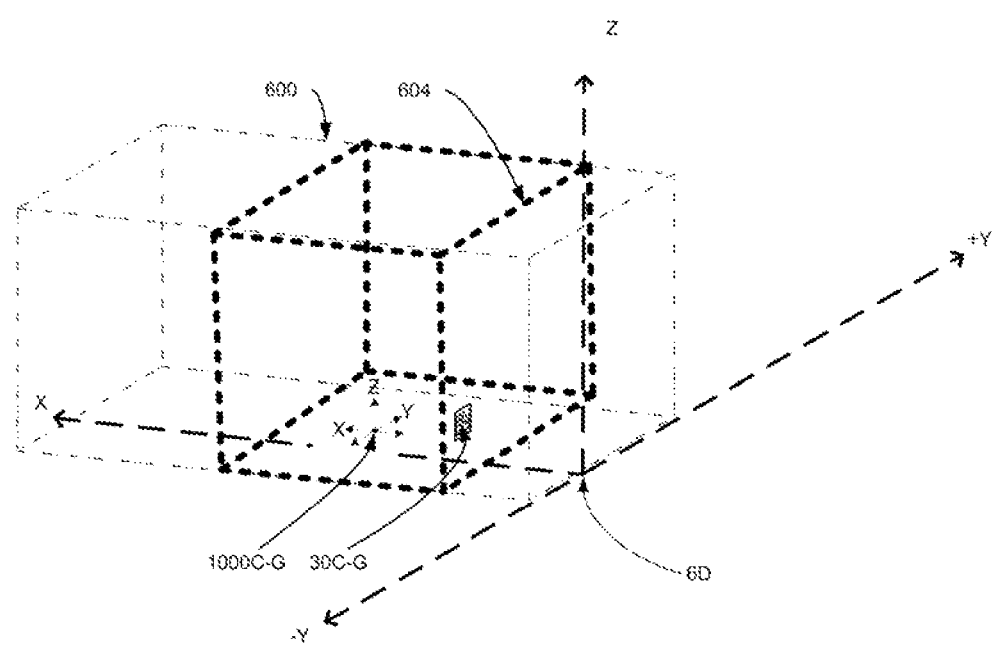
FIG. 17E shows the Targeting Lane, the boundaries of the Target Cube established around a load, the load center position and orientation and the label position.

FIG. 17E depicts Target Cube 604 in virtual space. It lies within the Targeting Lane 600, but restricts its X dimension (Targeting Lane depth) to encompass just load 1000G space. The X dimension restriction may be defined by the average size of loads in this particular facility and transported by this particular type of conveying vehicle.

Figure 17F:
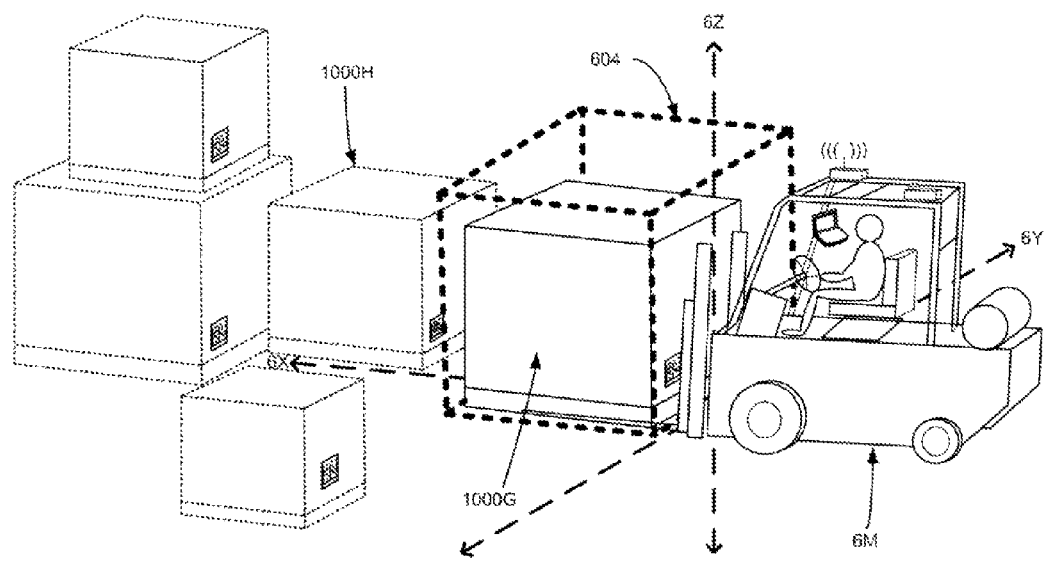
FIG. 17F shows the conveying vehicle acquiring the load.

FIG. 17F shows the Target Cube 604 encompassing load 1000G and discriminating out load 1000H as the conveying vehicle acquires load 1000G. The Local Load Map can be updated the moment the load detection sensor signals LOAD ON (load has been acquired). When the load is deposited at LOAD OFF the Load Map must be updated to indicate the new load location.

According to yet another aspect, the present invention tracks the movement of assets that are displaced from their stored position when the conveying vehicle pushes the stored asset while conveying another asset. In this special case, assets that are not being conveyed may also be tracked.

Figure 18A:
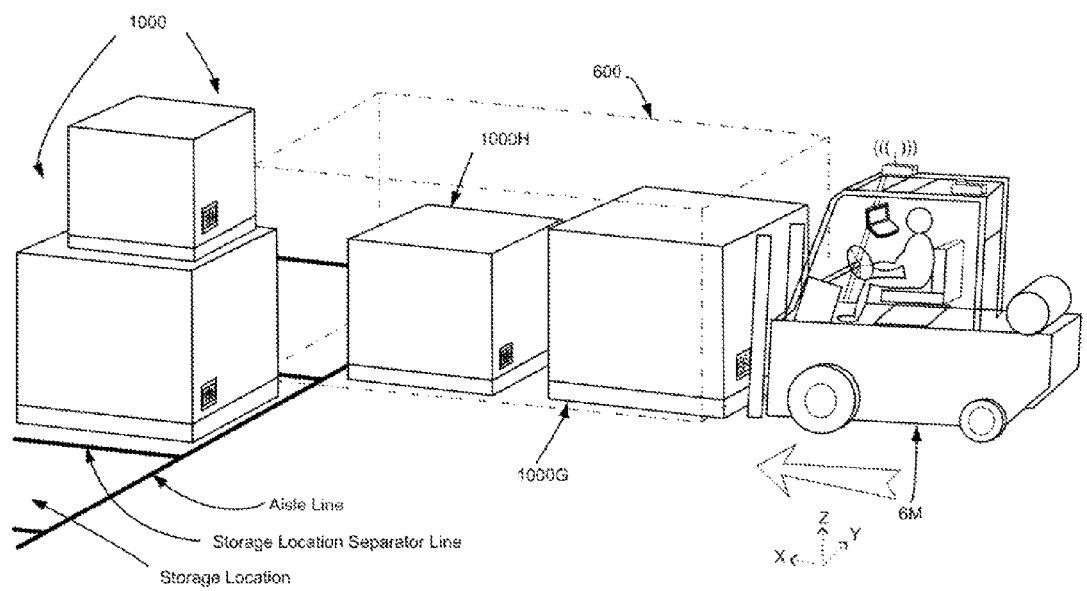
FIG. 18A shows the vehicle approaching the desired storage location that is blocked by a load in the aisle.
Figure 18B:
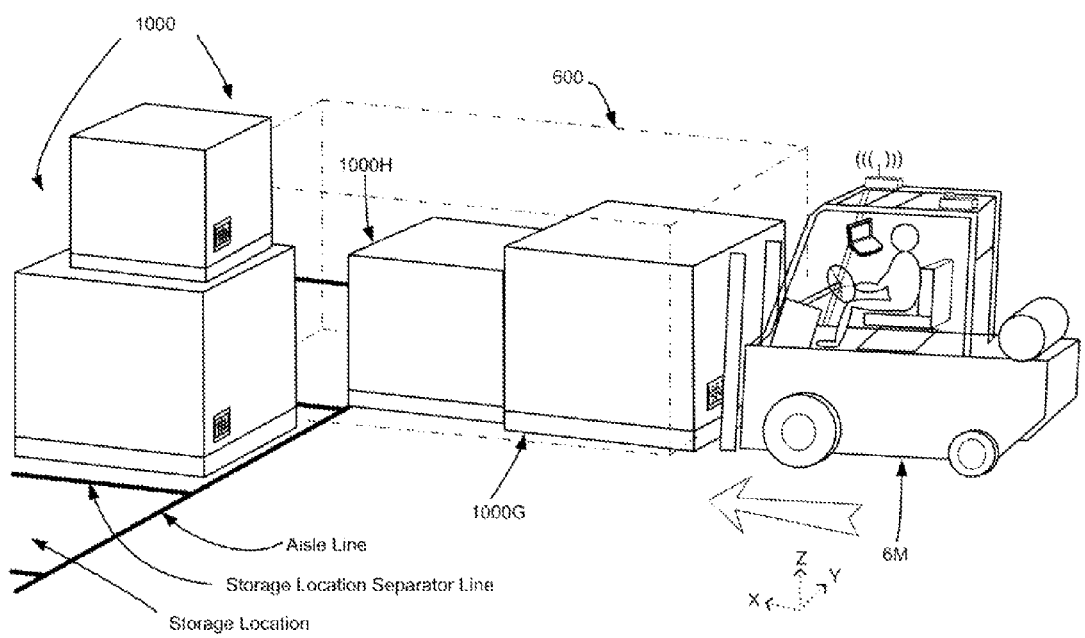
FIG. 18B shows the transported load making contact with the blocking load.
Figure 18C:
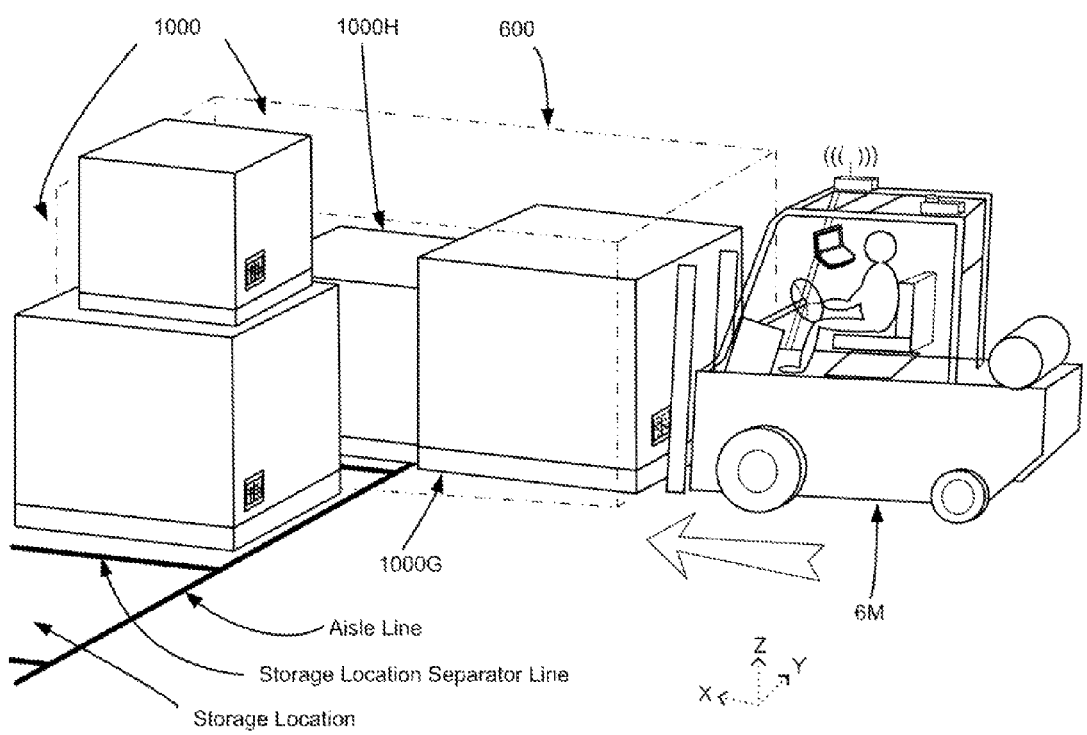
FIG. 18C shows the vehicle pushing the blocking load into the storage location.
Figure 18D:
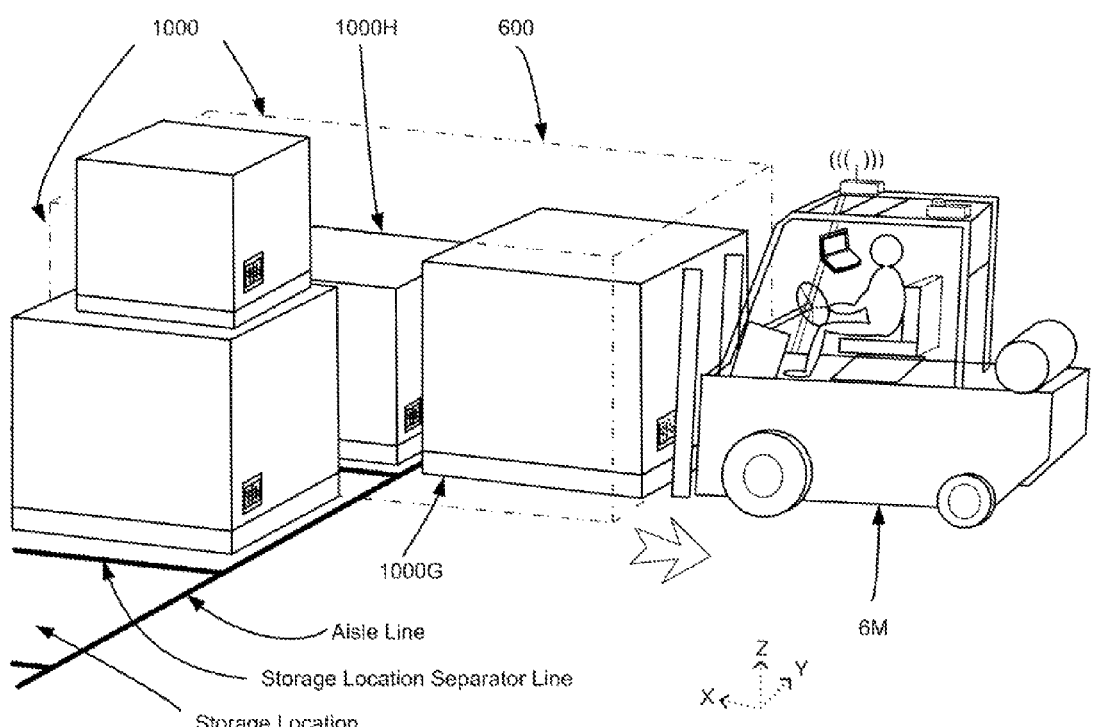
FIG. 18D shows the vehicle moving the transported load slightly away from the blocking load as the transported load is being deposited.
Figure 18E:
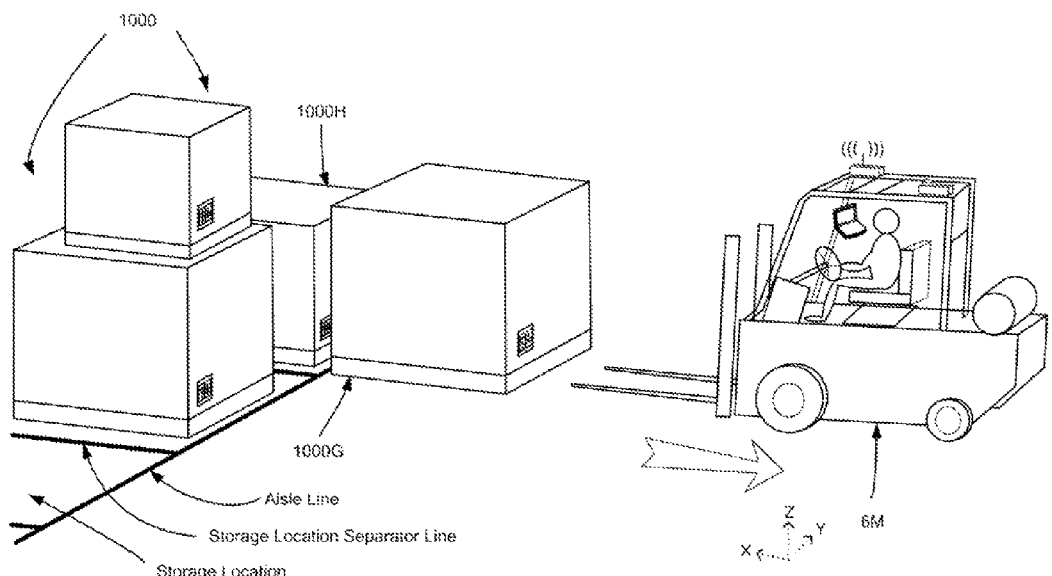
FIG. 18E shows the vehicle backing away from the deposited load.

In practice, empty storage locations may not always be accessible. For example, a load may be haphazardly deposited in an aisle or a temporary holding area for the convenience of the operator. FIGS. 18A through 18E show a sequence of events as a vehicle transporting a load approaches a desired storage location. FIG. 18A shows vehicle 6M approaching a desired storage location access to which is blocked by load 1000H, which had been deposited in the aisle. The Storage Locations are defined by Aisle Lines and Storage Location Separator Lines, shown as typically painted on the floor. The operator decides to push load 1000H into the available storage location and deposit load 1000G in the current location of 1000H. To report both transports correctly, the system recognizes that two objects cannot occupy the same space; therefore, load 1000G will contact load 1000H and both will move forward simultaneously. Since the system knows the approximate dimensions of load 1000G (based on pallet X and Y dimensions, i.e., the average or nominal load dimensions), the blocking load 1000H resting position will be displaced by approximately the X dimension of load 1000G. In FIG. 18B, the transported load 1000G makes contact with the blocking load 1000H. FIG. 18C shows the vehicle transporting 1000G while pushing blocking load 1000H into the desired storage location. FIG. 18D shows the vehicle moving the transported load 1000G slightly away from the blocking load 1000H as the transported load 1000G is being deposited. FIG. 18E shows the vehicle backing away from the deposited load 1000G. The Local Label Map and Local Load Map are updated for the locations and orientations of loads 1000H and 1000G upon deposition of load 1000G.

In practice, the pushed load can either be relocated within the Load Map or can be deleted from the Load Map so that it must be re-identified the next time it is acquired. In a similar manner, loads that have been moved by non-equipped vehicles can be deleted from the Load Map when a conveying vehicle detects that the load has been moved. In such instances the conveying vehicle must re-identify the load.

A similar case may occur in rack storage, where an item stored in the location nearest the aisle on a multi-depth rack may be displaced and tracked by the system when a conveyed item pushes the stored item to a deeper storage location.

Figure 19:
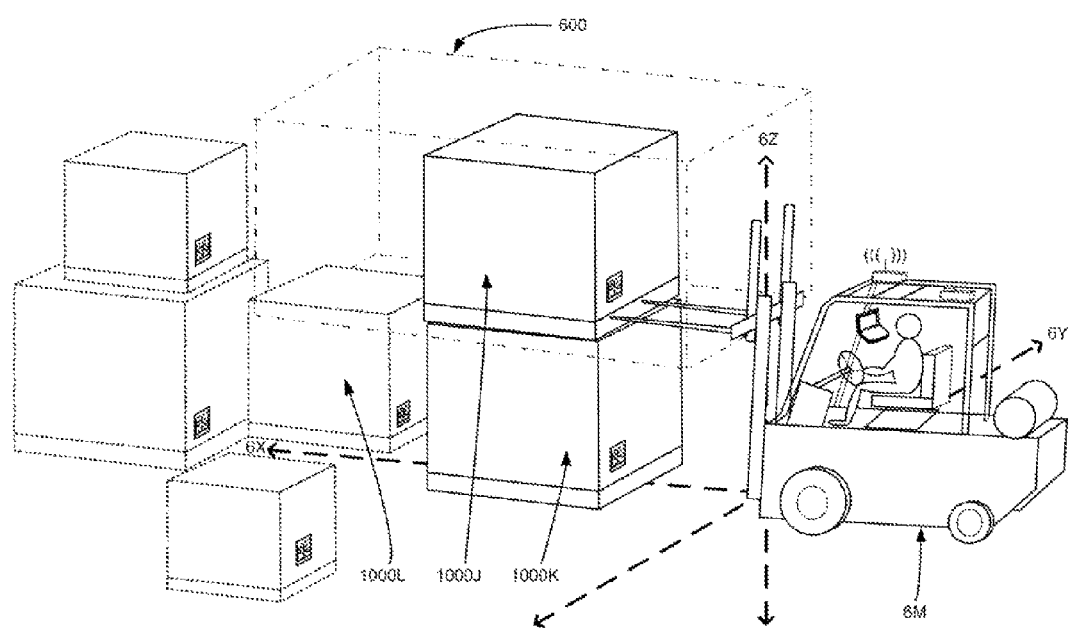
FIG. 19 shows the interaction of the Targeting Lane with a load stacked on top of another load.
Figure 20:
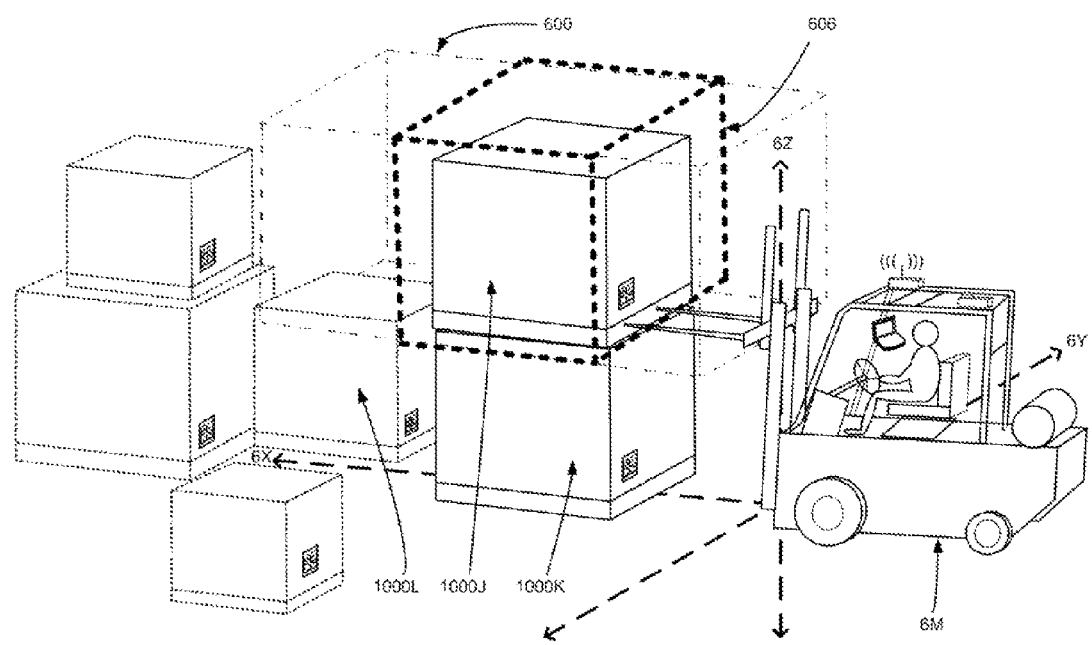
FIG. 20 shows the creation of a Target Cube after detection of the desired label on the top load.

FIG. 19 shows the interaction of the Targeting Lane 600 with a load 1000J stacked on top of another load 1000K. Since the target lane in this case is tied to the load datum point which has risen with the forks, the load 1000K is not included in the target lane and therefore not included as part of the target load. FIG. 20 shows the location of a Target Cube 606 after detection of the desired label on the top load 1000J.

Figure 21:
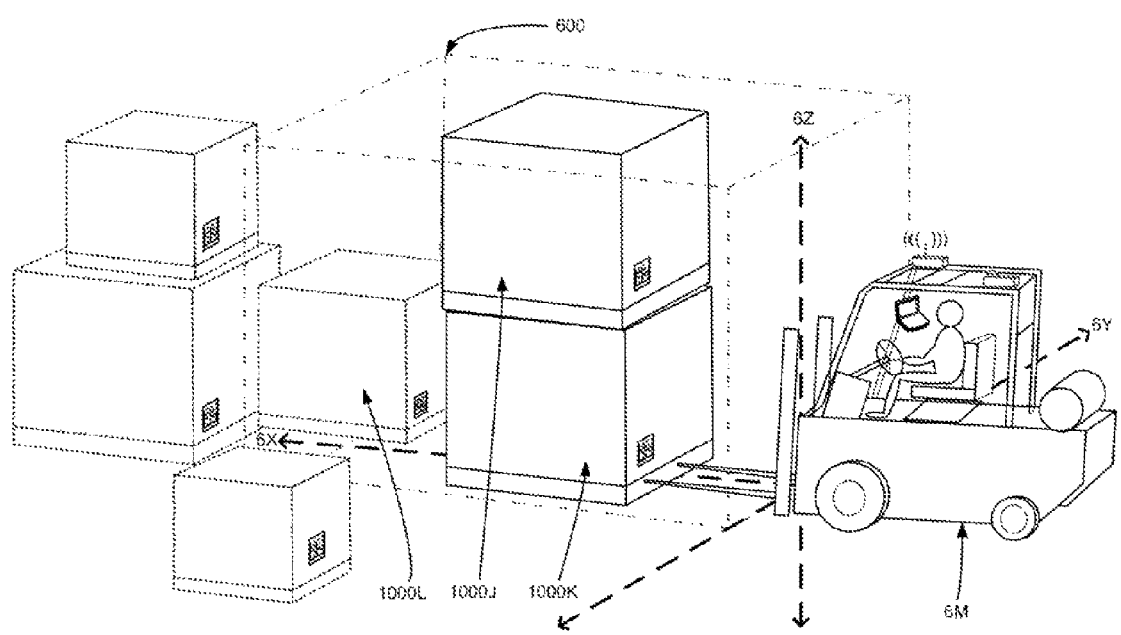
FIG. 21 shows the interaction of the Targeting Lane with multiple unit loads, stacked vertically.

FIG. 21 shows the interaction of the Targeting Lane 600 with multiple unit loads 1000J, 1000K, 1000L, where loads 1000J, 1000K are stacked vertically and load 1000L lies behind load 1000K. In this case, the conveying vehicle is instructed to transport two loads stacked vertically. The Targeting Lane 600 is defined with sufficient height (Z dimension) to allow two loads to be encompassed. Targeting Lane height (600Z2–600Z1), as described before in conjunction with FIG. 11, is measured from the load datum point 6D (obscured by vehicle 6M in this view, see FIGS. 17B, 17C, 17E) defined by the current position (real location) and rotational orientation of the vehicle 6M.

Figure 22:
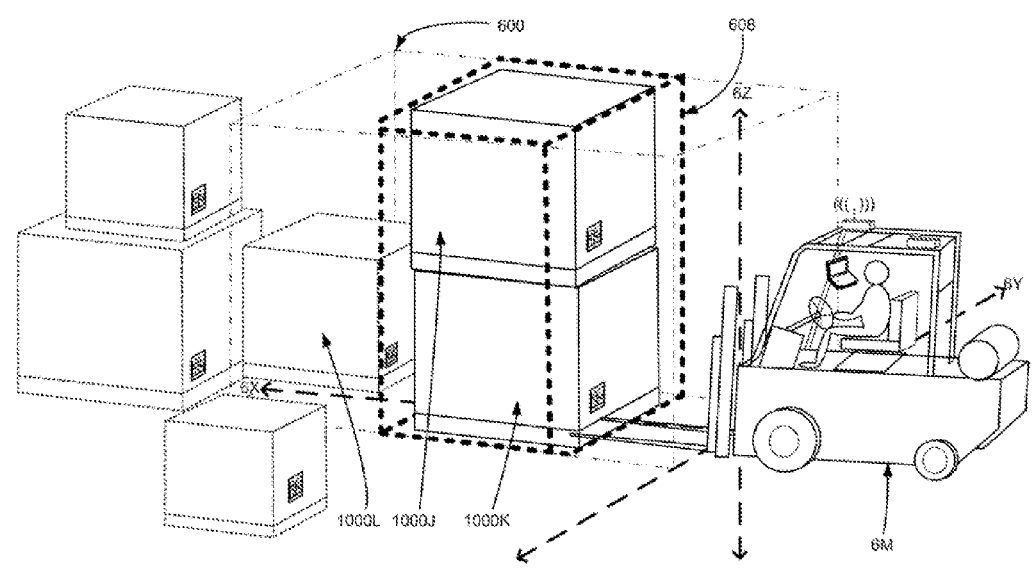
FIG. 22 shows the creation of a Target Cube surrounding two loads one stacked atop the other.

FIG. 22 shows the creation of a Target Cube 608 that includes both loads 1000J, 1000K one stacked atop the other. The Target Cube face is defined by the nearest label to the vehicle in the Label Map and extends just beyond loads 1000J and 1000K thus discriminating out load 1000L.

Figure 23:
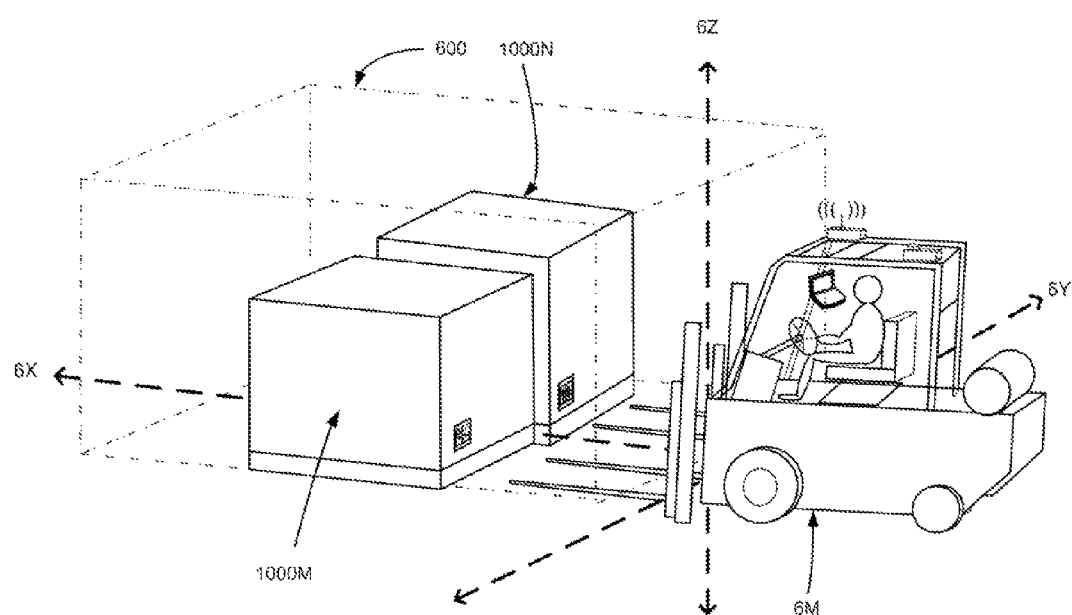
FIG. 23 shows a widened Targeting Lane to accommodate side-by-side loads.
Figure 24:
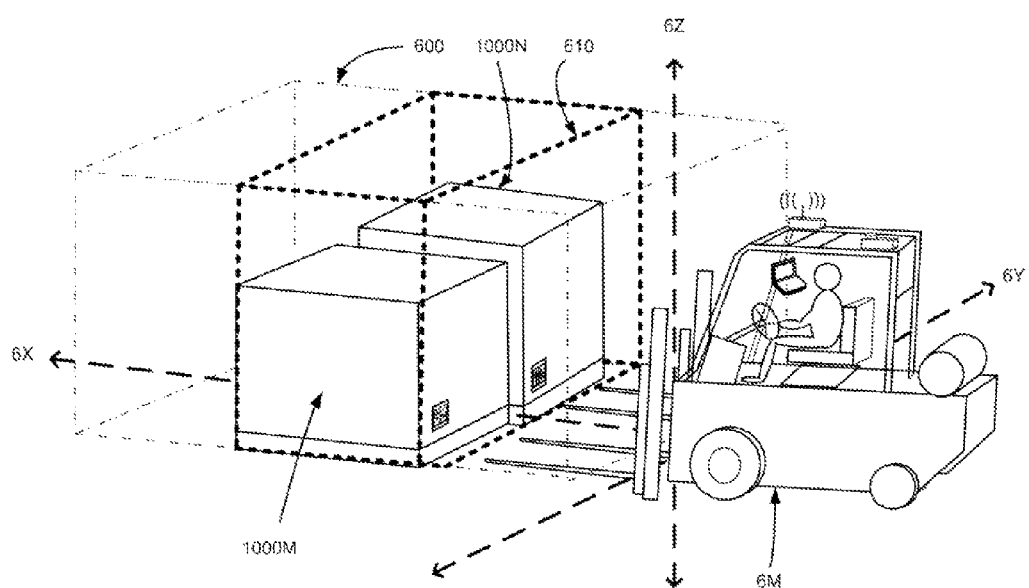
FIG. 24 shows the creation of a Target Cube surrounding two side-by-side loads.

FIG. 23 shows a widened Targeting Lane 600 to accommodate the simultaneous transport of side-by-side loads 1000M, 1000N. FIG. 24 shows the creation of a Target Cube 610 surrounding two side-by-side loads 1000M, 1000N that are to be simultaneously transported by a conveying vehicle 6. The Target Cube width (Y dimension) is defined to accommodate twice the average load width, and just one average height. In a similar manner, targeting could be defined in a manner to accommodate two-deep loads on the forks or other potential load geometries.

Figure 26:
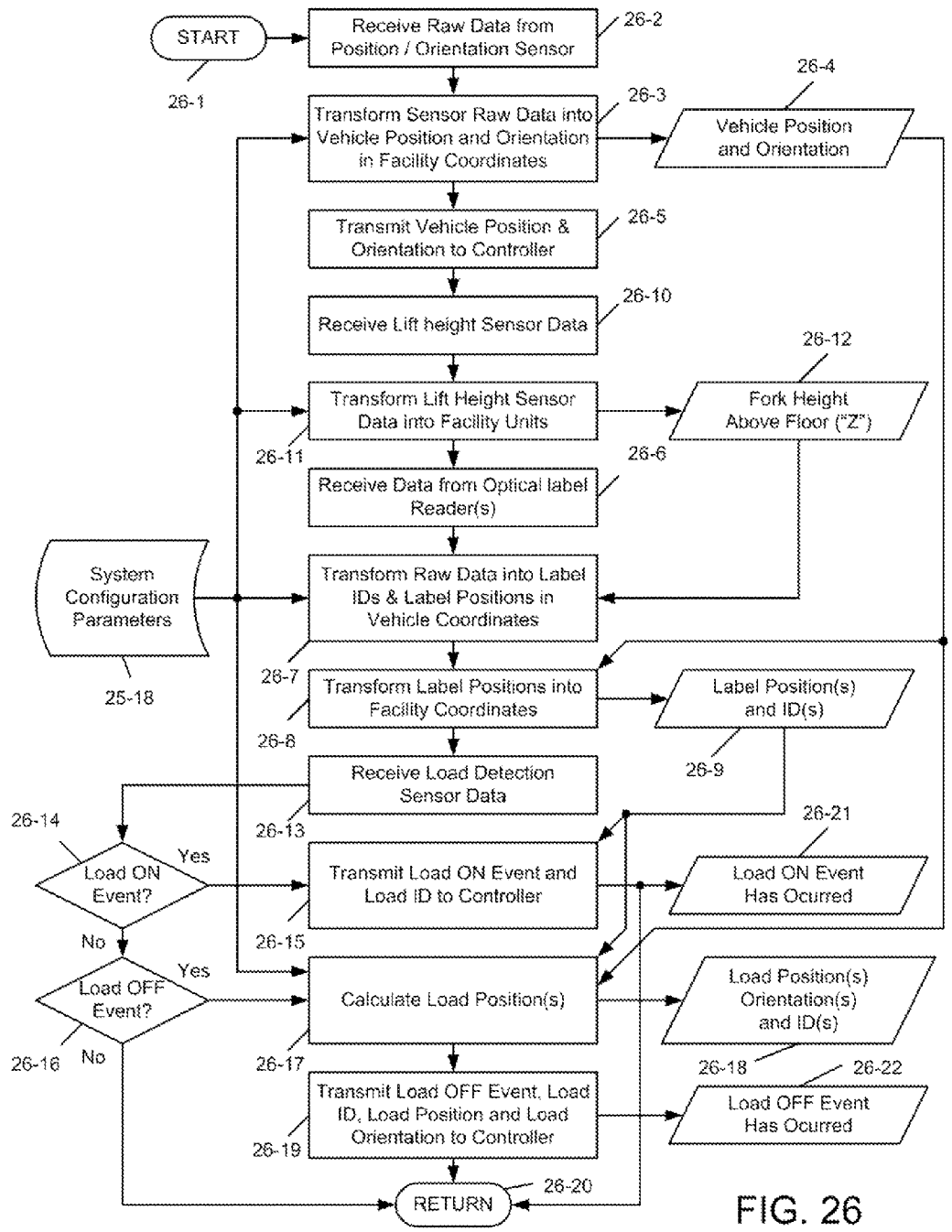
FIG. 26 is a flow diagram showing exemplary steps of determining the ID and position of a label for subsequent addition to a Label Map and the determination of the ID, position and orientation of a unit load for subsequent addition to a Load Map.

The three dimensional location of the center 1000C of a unit load may be determined at the moment that the load is acquired by the conveying vehicle 6. The flow chart in FIG. 26 shows this process. Configuration parameters are established for each vehicle such that the distance 1000CX from the center of the vehicle 6C to the center of the load 1000C carrying apparatus is a known constant (see FIG. 4). The vehicle 6 can only support and safely transport a load 1000 if the load is properly positioned on the load handling mechanism 11 (FIG. 2); therefore, the distance and direction between the load datum 6D and load center 1000C are nearly constant. The load location is calculated using geometry from the location and orientation of the load datum 6D relative to vehicle center 6C and the location and orientation of the vehicle 6 transformed into facility coordinates, and stored in the Load Map database in the mobile computer 25 or wirelessly transmitted by the communications unit 10 to the system controller 105.

In an alternative embodiment, the step of reading labels and creating the Label Map may be omitted. A Load Map is created by the vehicle operator first identifying an asset from the identifying indicia and storing the identity of the asset. The operator then approaches the identified item with a conveying vehicle until the load detecting device detects the item. The position and the orientation of the item within the facility are determined using the normal (average or nominal) size of the item, the position of the load detecting device on the lifting mechanism on the vehicle, the position of the center of the vehicle and the orientation of the directional axis of the vehicle, the position and the orientation of the item within the facility are determined. The position and directional orientation of the item within the facility is stored in a database, called a Local Load Map, in the memory in the computer. In this embodiment, the Targeting Lane would be used exclusively with the Load Map to target and discriminate potential loads.

Figure 25:
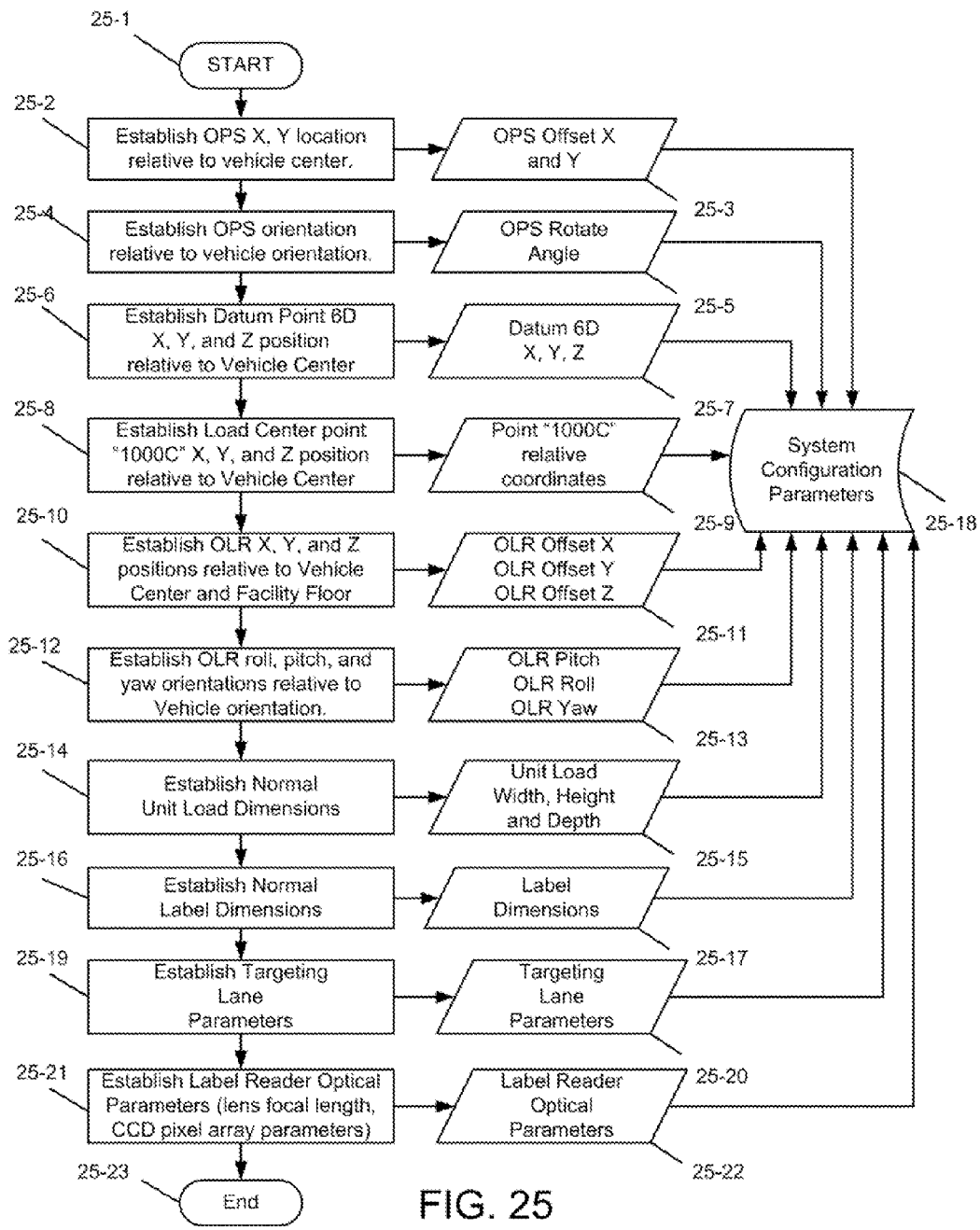
FIG. 25 is a flow diagram for establishment of exemplary system configuration parameters.

Referring to FIG. 25, the overall process begins 25-1 with the establishment of variables, called configuration parameters that are used by the mobile computer system 25 on each conveying vehicle 6. Configuration parameters 25-18 are determined at the time of system installation on the conveying vehicle 6. The parameters are stored in memory of mobile computer 25. The configuration parameters may differ from vehicle to vehicle, depending on the style of vehicle, its dimensions and load handling devices. For example, counterbalanced forklifts, reach trucks, turret trucks, and order picking trucks and different models within these types of trucks will likely have different configuration parameters. The configuration parameters may also contain multiple entries depending on classes or types of loads being handled, where each load class or load type has a unique form factor or dimensions. In this situation, a facility may handle loads of several pallet sizes or multiple stack configurations such as side-by-side pallets.

There are several key points on each vehicle; the vehicle center 6C, the load center, i.e., fork center 1000C, and the load datum, 6D (see e.g., FIG. 4). Dimensions between the vehicle center 6C and the other points are typically measured in convenient units such as inches or centimeters. Once the position/orientation sensor 7 is installed, its position offset 7X and 7Y relative to the vehicle center 6C are recorded in step 25-2 as data 25-3 in a System Configuration Parameter file 25-18. The position/orientation sensor 7 rotation angle relative to the X-axis of the conveying vehicle (see e.g., FIG. 5) is established in step 25-4 and stored 25-5 in System Configuration Parameter file 25-18. The position and rotation sensor is typically installed at a rotation angle 7R1 (zero degrees), 7R2 (90 degrees), 7R3 (180 degrees), 7R4 (270 degrees) from the X-axis, or centerline, 6X of the conveying vehicle. This is shown in FIG. 5.

The load datum 6D is a point which defines the static offset of the load handling mechanism (forks, clamps, slipsheet, etc.) relative to the center of the vehicle. It is measured relative to vehicle center point 6C in step 25-6 and stored 25-7. This point marks the closest position to the vehicle center 6C, and to the floor, that a load can be held when acquired. The dynamic location of the load datum 6D is determined constantly by applying the sensor measurements 17X, 17Y, 17Z, 17θ which define the mechanical motion of the load handling mechanism relative to the vehicle center 6C (such as shown in FIGS. 4C, 4D, 4E). The third point, load center 1000C, marks the approximate center of a typical unit load 1000 after acquisition by a vehicle 6. The load location is measured in step 25-8 and stored 25-9.

Each label reader 14, 15 (see e.g., FIG. 6) generally faces the direction of motion of the vehicle's load handling mechanism to view loads as they are acquired. Depending on the size of the label reader sensor 14, 15, the type of load handling mechanism, and other vehicle-specific variables, label readers may be mounted permanently to the vehicle frame, or they may be mounted to the movable load handling mechanism 11 (carriage equipment/lift mechanism) such as the load backrest or forks (see e.g., FIG. 7). In most cases, the label reader(s) 14, 15 are mounted on the movable load handling mechanism 11 and thus move with the load handling mechanism 11 and remain constant in position and orientation relative to the load handling mechanism 11 and load datum 6D. The X, Y, and Z positions of each label reader 14, 15 relative to its reference point, either vehicle center 6C or load datum 6D, are measured and recorded in step 25-10 and stored 25-11 in the System Configuration Parameter file 25-18. Each label reader may be aimed in a direction most suitable for detecting labels. Three axes of rotation are possible: yaw, roll, and pitch. FIGS. 7 and 8 illustrate the rotation axes relative to the conveying vehicle 6. As with label reader's X, Y, and Z positions, the orientation of each label reader is measured 25-12 after installation, and the yaw, roll, and pitch angles 25-13 are recorded in the System Configuration Parameter file 25-18.

The establishment of typical unit load dimensions 25-15 is done in step 25-14. As an example, a food distribution facility may store palletized cartons of food product that are transported on industry-standard 40-inch by 48-inch pallets. Regardless of the unit load height, the X, Y center of the load will be the same for any load using the standard pallet. As shown in FIG. 4, load center 1000C, which lies approximately half a fork length forward of point 6D, establishes the center of the load 1000 at the time the load is fully engaged by the forks. A time-of-flight load detection sensor can also be used to determine the exact load center at time of deposition.

The next step in the configuration is the establishment of label size 25-17. This is done in step 25-16. This dimension is shown as dimension J-L in FIG. 9B for matrix barcode labels, and as dimension D in FIG. 9D. It is a standard practice to use labels of a single size for a given facility. In the case where labels or their barcodes vary from item to item, a look-up table is stored in the Controller 105 or the host system in order to correlate label identification with label size. Similarly, the Unit Load dimensions may be stored in a look-up table in the Controller 105.

Parameters 600X1, 600X2, 600Y1, 600Y2, 600Z1, 600Z2, are established 25-19 and stored 25-20 as data for use in projecting the Targeting Lane. Parameters 600X1, 600X2, 600Y1, 600Y2, 600Z1, 600Z2 may be defined differently depending on whether the Label Map or the Load Map is being used. Optical imaging parameters that relate image pixels to units of measure are configured 25-21 and stored 25-22. The process ends at step 25-23.

FIG. 26 shows the process steps that occur for the formation of the Label Map and Load Map within mobile computer 25. Raw position and orientation data 26-1 generated by the position/orientation sensor 7 is sent to the mobile computer in step 26-2. This typically occurs several times per second. Raw position and orientation data are transformed in step 26-3 into facility coordinates to establish the vehicle position and orientation (vehicle heading) 26-4 using configuration parameters retrieved from the System Configuration Parameter file 25-18. The vehicle's location and orientation are transmitted wirelessly to the system controller 26-5.

The lift height sensor 17Z (see e.g., FIG. 2) provides an indication of lift height above the floor, and its data is accepted by the computer in step 26-10 and transformed into facility units, typically inches or centimeters 26-11. The load handling mechanism height above floor (distance 14Z) is made available as data 26-12.

Figure 35:
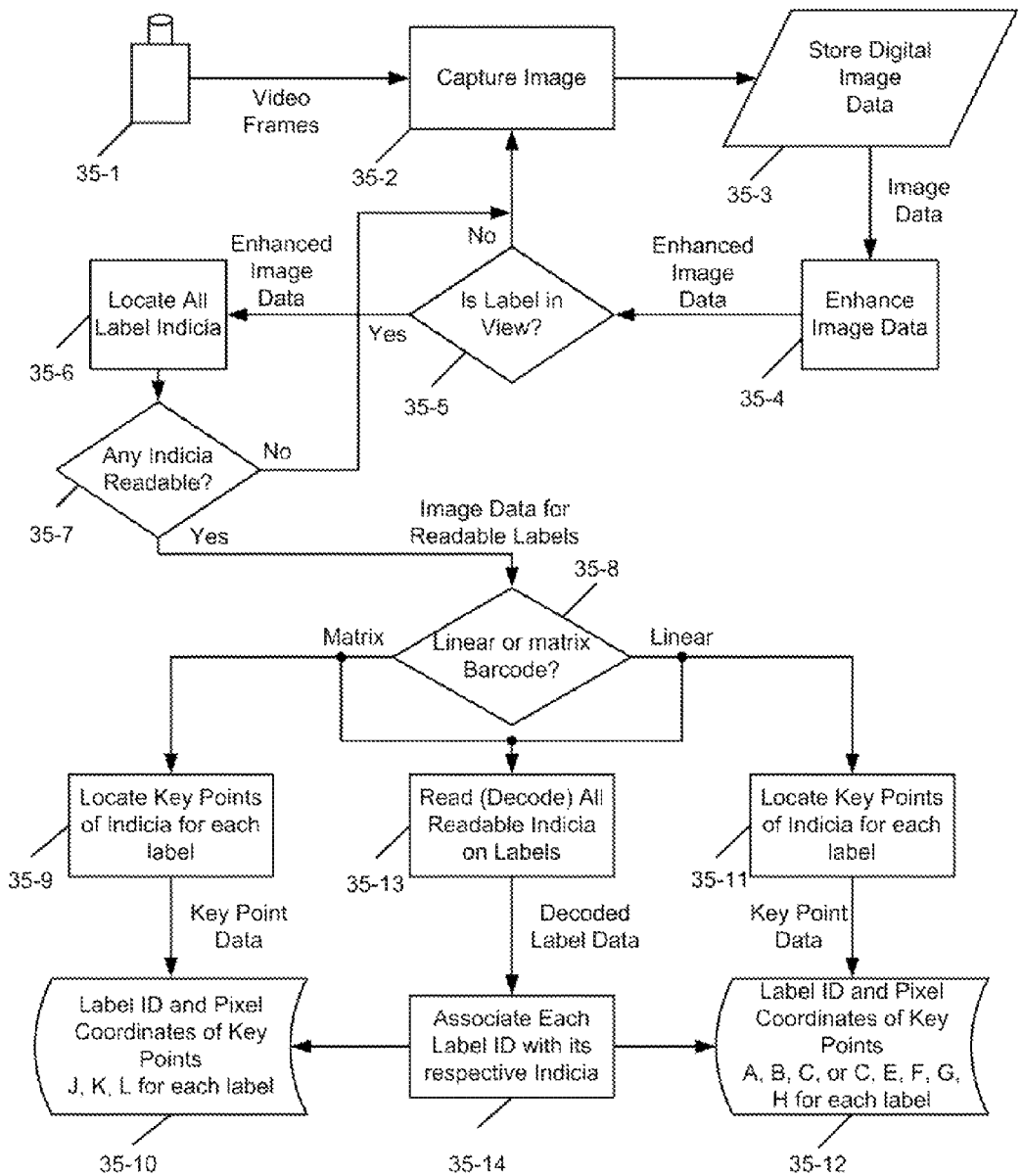
FIG. 35 is a flow diagram showing the location and decoding of labels within the label reader's field of view.

Label reader data is received by the mobile computer 26-6 and transformed into label ID's and label positions in the vehicle coordinate system 26-7, again using configuration parameters from file 25-18. FIG. 7 shows the vehicle coordinate reference system 6X, 6Y, and 6Z relative to the load datum 6D and the vehicle center 6C (best seen in FIGS. 4 and 6). The details of this process are shown in FIG. 35 and will be described below. Label positions in vehicle coordinates are transformed into facility coordinates 26-8, and the label position and ID are available in 26-9.

The load detection sensor 18 (see e.g., FIG. 2) provides an indication that a load 1000 is being acquired or deposited. The load detection sensor 18 may generate a digital signal (Load/No Load) or an analog signal indicating the distance between the sensor 18 and the load 1000. The preferred embodiment uses an analog load detection sensor 18 that constantly measures the distance between the sensor 18 and the load 1000. A load is determined to be on board when that distance is less than a predetermined value, typically a few centimeters or inches. In either case, the relative position of the load 1000 to the vehicle (load datum 6D) must be defined to detect these events, and the parameters are established at the system start. Load ON and Load OFF events therefore become digital, regardless of the sensor type.

Load detection sensor data is received 26-13 and tested 26-14 to determine whether the signal indicates a Load ON event. If a Load ON is indicated (26-14, Yes), a message is transmitted 26-15 to the controller 105 that a Load ON event has occurred 26-21. The message also contains the Load ID.

If a Load ON event is not detected, (26-14, No) a test is made 26-16 to determine whether the load detection signal indicates a Load OFF event. If a Load OFF event is not detected (26-16, No), control is returned 26-20 to the process START. If a Load OFF event has occurred (26-16, Yes), the vehicle position and orientation 26-4 are used to calculate the load position and orientation 26-17, which are available along with load ID 26-18. A Load OFF event 26-22, Load ID, and Load Position and Orientation message is transmitted 26-19 to the Controller 105 and control is returned 26-20 to the process START.

Figure 27:
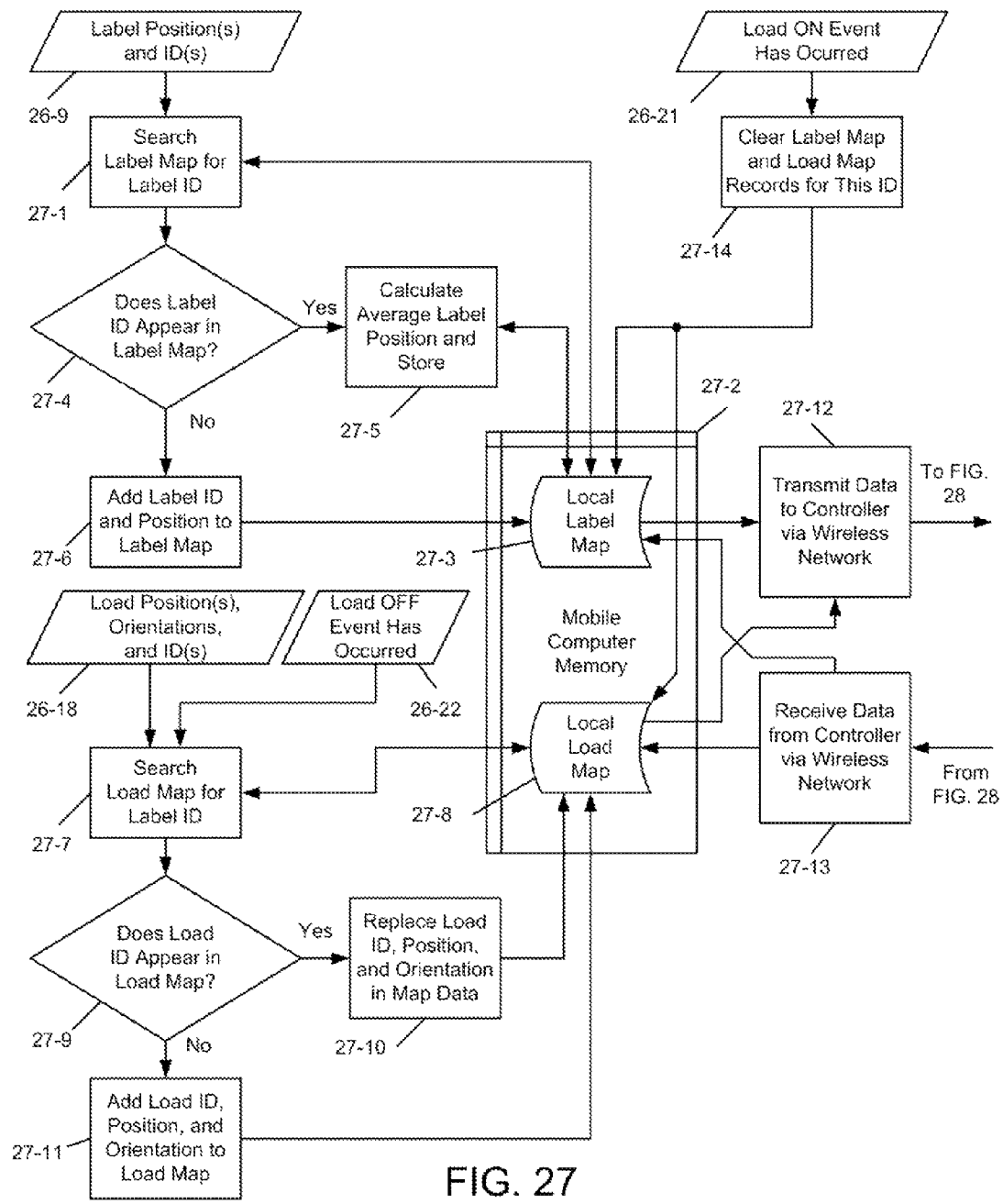
FIG. 27 is a flow diagram of functions in an exemplary mobile computer showing the addition of a label ID and position to the Local Label Map, the averaging of the position for labels already in the Label Map; and the addition of a unit load ID, position and orientation to the Local Load Map, and updating of position and orientation for unit loads already in the Local Load Map; and the exchange of data with the controller.

A Local Label Map 27-3 is created in FIG. 27 using label position and ID data 26-9 (FIG. 26). The Label Map is a database containing all label position and ID data accumulated by the mobile computer 25 on vehicle 6 plus any label position and ID data downloaded from the system controller 105. The Local Label Map is updated each time a label is decoded and the label's position is determined. This can occur many times each second, especially as a vehicle approaches a load.

As each label is read and label position and ID data 26-9 are received by the mobile computer 25, the Local Label Map 27-3 is interrogated 27-1 to determine if that particular label ID already exists within the Local Label Map. If not (27-4, No) the label ID and position in facility coordinates are entered into the Label Map database 27-3, which is within the memory 27-2 of the mobile computer 25 (FIGS. 1, 2, 3). If a label ID is present in the Local Label Map database (27-4, Yes), then the new position is averaged 27-5 with other position data already in the Local Label Map to improve the positional accuracy for that label. In so doing, the Local Label Map database can accept a large number of label position entries, and each entry causes the averaged position for that label to become more accurate. The example of FIG. 29 will illustrate the averaging process. When a load is moved (triggered by a Load ON event 26-21) the Local Label Map 27-3 and Local Load Map 27-8 are cleared of data 27-14 for this particular Load ID. The label reading and averaging process continues again after a Load OFF event.

In a similar fashion, a Local Load Map 27-8 is created containing all entries of load ID, position, and orientation. When a Load OFF event occurs 26-22, the Load Map 27-8 is interrogated 27-7 to determine if the load with that particular ID (gained from reading and decoding the label) exists within the Local Load Map database. If not (27-9, No) then the load ID, position, and orientation data are added 27-11 to the Local Load Map database 27-8. If data does exist within the Local Load Map database for that particular load ID (27-9, Yes), then the Load Map entry for that item (Load ID, Position, Orientation) is replaced 27-10. The load position and orientation data for an identified load 1000 are therefore updated with each occurrence of a Load OFF event.

The above process continues with the reading and decoding of each load label indicia. The mobile computer 25 on each conveying vehicle 6 therefore accumulates a large amount of data for label positions and load positions as it travels within the facility acquiring and depositing loads 1000. Since other conveying vehicles are performing similar functions, there is benefit to sharing the data, and this takes place simultaneously with the above process. A wireless network device 10 (FIG. 1) receives data 27-12 from the Local Label Map 27-3 and Local Load Map 27-8, and transmits it to the system controller 105 (FIG. 1). As described in FIG. 28, the controller 105 contains a Global Label Map and a Global Load Map that can be queried via the wireless network device 10 by vehicles to augment their Local Label and Load Maps. The process of transmitting Local Label Map data and Local Load Map data to the controller, and receiving Global Label Map data and Global Load Map data from the controller provides synchronism between mobile computer data and Controller computer data, so that Label Map and Load Map information can be shared by multiple vehicles.

Figure 28:
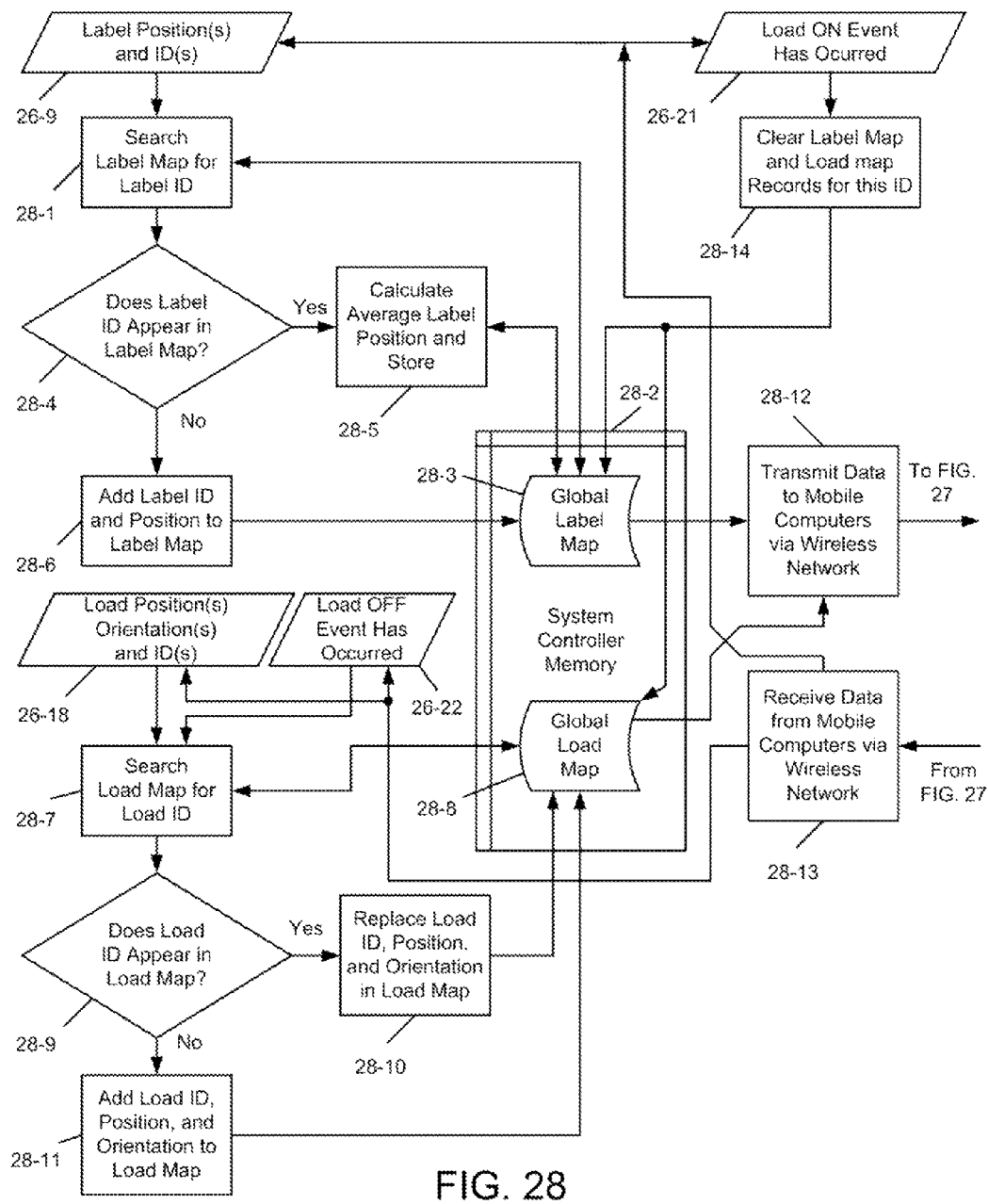
FIG. 28 is a flow diagram of functions in an exemplary controller showing the addition of a label ID and position to the Global Label Map, the averaging of the position for labels already in the Global Label Map; and the addition of a unit load ID, position and orientation to the Global Load Map, and updating of position and orientation for unit loads already in the Global Load Map; and the exchange of data with the mobile computer(s)

A similar process occurs on the Controller computer 105, as detailed in FIG. 28. Global Label Map 28-3 and Global Load Map 28-8 are created as databases in the memory 28-2 of the Controller 105. Label position and ID data 26-9 and load position and ID data 26-18 and Load OFF event data 26-22 are received 28-13 from each mobile computer 25 via the wireless network 10. As each data transmission arrives, label positions and ID's are used to search 28-1 the Label Map 28-3 to determine if that particular label ID already exists within the Label Map 28-4. If not (28-4, No) the label ID and position in facility coordinates are entered 28-6 into the Global Label Map 28-3. If a label ID is present in the Global Label Map (28-4, Yes), then the new entry is averaged 28-5 with other position entries to improve the positional accuracy for that label.

Global Load Map 28-8 contains all entries of load ID, position, and orientation gathered from all conveying vehicles. The Global Load Map 28-8 is searched 28-7 to determine if the Load ID 26-18 already exists within the Global Load Map database 28-9. If not (28-9, No) then the data is added 28-11 to the Global Load Map database 28-8. If a Load ID does exist within the Global Load Map database for that particular load ID (28-9, Yes), then the Global Load Map entry for the item having that Load ID is replaced 28-10. The Global Label Map and Global Load Map are cleared 28-14 each time a Load ON event 26-21 occurs. The load ID and position data in the Global Load Map are therefore updated with each occurrence of a Load OFF event for each vehicle 6 in the fleet.

Figure 29:
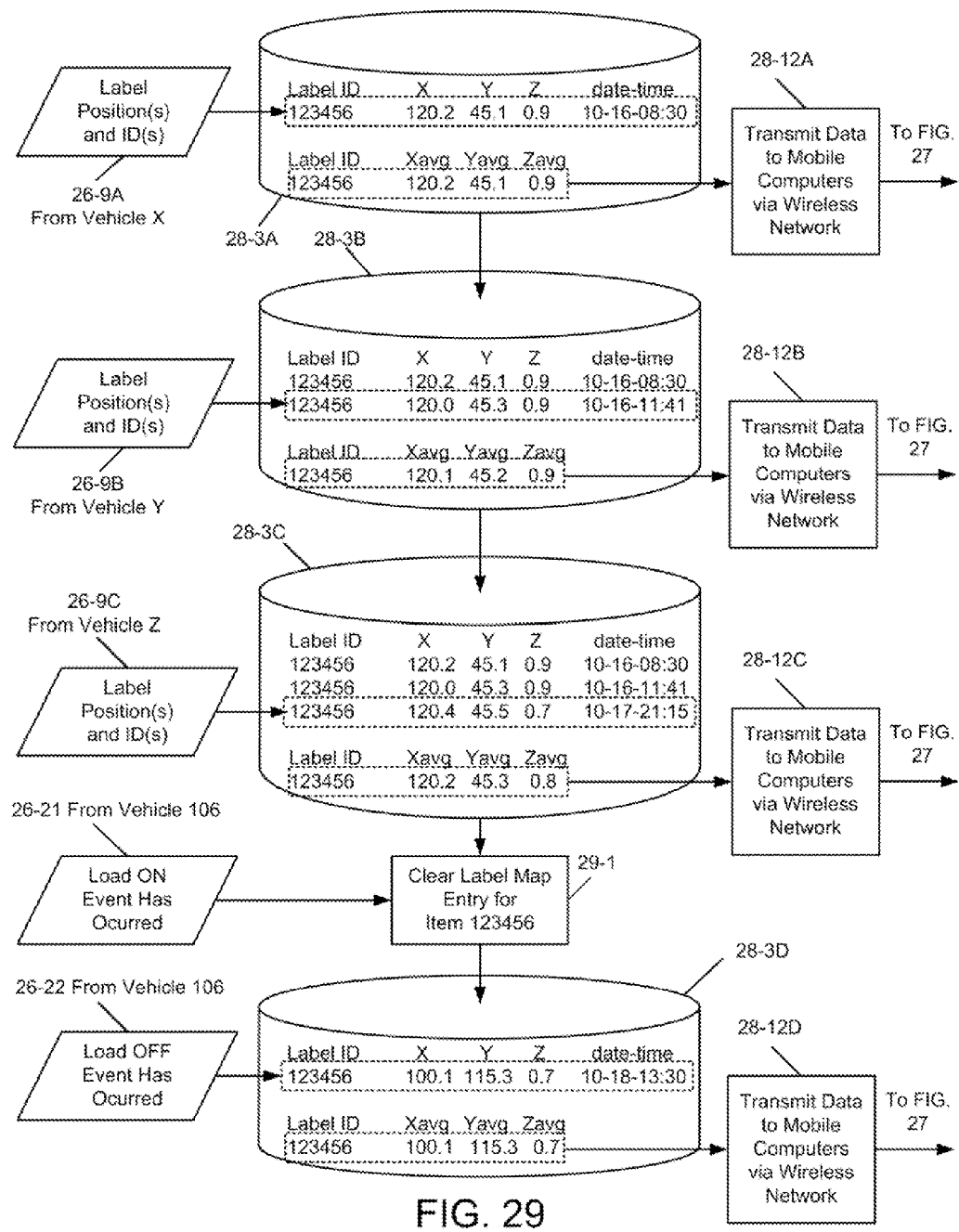
FIG. 29 shows the label ID and position data stored in an exemplary Label Map database in the mobile computer when the label has been seen by a first, a second and a third vehicle, and when a unit load having that label has been acquired by a fourth vehicle and moved to and deposited at a transfer position.

FIG. 29 illustrates the populating of data into the Global Label Map. Label Positions (locations in facility coordinates) and ID's 26-9 arrive via the wireless network as described above. Each record is stored in the Label Map database in X, Y, and Z coordinates and each record is time stamped by the Controller 105. The example shows a Label Position and ID 26-9A received from Vehicle X at time 10-16-08:30 (October 16th at 8:30 am). The label ID is 123456, and its coordinates are X 120.2 feet east, Y 45.1 feet north, and an elevation of Z 0.9 feet above the floor. This is shown pictorially in FIG. 31 as the position of item 1000B in storage location B8. The Global Label Map 28-3A in the Controller (FIG. 29) stores the identical data record as the Average, as there were no previous occurrences of Label ID 123456 in the Label Map. The data are then transmitted 28-12A (FIG. 29) through the network to all vehicles.

Vehicle Y sends a position and ID 26-9B for the same item (Label ID 123456) to the Controller at 11:41 the same day, and the data becomes a second record in the Global Label Map 28-3B. This data is averaged with the previous record to yield an average position for this label at X 120.1 feet east, Y 45.2 feet north, and an elevation of Z 0.9 feet above the floor. The averaged data is then available to be transmitted 28-12B to all vehicles.

Vehicle Z sends the position 26-9C of the same item on 10-17 at 21:15, creating a third entry in the Global Label Map database 28-3C for Label ID 123456. The average is again calculated, stored 28-3C, and transmitted 28-12C to all vehicles.

In the example, vehicle 106 is dispatched (typically by the host system, facility manager or vehicle operator) to remove a load identified by Label ID 123456 from its storage location and place it in a new position. As the vehicle approaches, label reads are accumulated and stored within the Label Map. The Targeting Lane is used to target and discriminate the Load with Label ID 123456. At Load ON event 26-21, all position data for Label ID 123456 is cleared 29-1 from the Label Map in memory. Vehicle 106 has now acquired the item for conveyance and proceeds to move the item to a new location. As it deposits the item a Load OFF event 26-22 occurs, adding a new location for the Load ID 123456 to the Load Map 28-8C at location X 100.3 feet east, Y 115.7 feet north, and elevation Z 0.0 feet. As the vehicle 106 backs away, new label reads might add 28-3D new Label ID 123456 positions to the Label Map. This takes place at 13:30 on October 18, and is shown on FIG. 31 as Time t2. The new label position data is available to be transmitted 28-12D to all vehicles.

FIG. 30 shows data flowing into and out from the Global Load Map in the Controller 105. Load position data 26-18A arrives via the wireless network from an unidentified vehicle on October 18$^{th}$ at 13:30, leaving the load center at position X 120.2 feet east, Y 45.3 feet north, an elevation of Z 0.0 feet, and orientation of θ 181 degrees in bulk storage area B8. These data are recorded in the Load Map 28-8A. As shown on FIG. 29, vehicle 106 is dispatched to acquire the load identified by Label ID 123456 and relocate it. At the Load OFF event for vehicle 106, the item's new position 26-18B is X 100.3 feet east, Y 115.7 feet north, elevation Z 0.0, and orientation of θ 88 degrees. This takes place at 16:55 on October 21 and the data are stored in Load Map 28-8B.

The next move is performed by vehicle 107, which is dispatched to acquire the load identified by Label ID 123456 and deposit it in rack B10, position 8. At load OFF event, vehicle 107 sends data 26-18C to the Controller Load Map 28-8C that the item has been deposited at location X 318.3 feet east, Y 62.9 feet north, elevation Z 0.0, and orientation θ 271 degrees. This move is done at 17:10 hours on October 21.

Each time the Global Load Map in the Controller is updated, new data are available to each mobile computer 25 on each vehicle in the fleet. Each vehicle would typically request data for the vicinity of its current location and its current destination. This is shown in FIG. 30 blocks 28-12E, 28-12F, and 28-12G.

The purpose of creating Label Maps and Load Maps becomes clear when a vehicle is about to acquire a load. A virtual volume of space called the Targeting Lane 600 (best seen in FIG. 11) is defined in three dimensions in front of the load datum point 6D of a vehicle 6. The Targeting Lane is typically of a rectangular cuboid shape, whose size is defined by parameters 600X1, 600X2, 600Y1, 600Y2, 600Z1, 600Z2 in the System Configuration Parameters file 25-18. The Targeting Lane 600 defines a volume to encompass one or more loads 1000 of the typical (nominal) size. The Targeting Lane dimensions are set under software control and can be modified by the system operator to accommodate loads of different dimensions.

Targeting Lane boundaries are typically set to encompass in the Y and Z ordinates the outside dimensions of the loads being conveyed. For example, if single item loads are being conveyed as in FIGS. 18, 19, and 20, the Targeting Lane boundaries would be set to encompass the typical Y (item width) and Z (item height) dimensions of those items. The Targeting Lane X dimension is always set to be larger than the typical depth of conveyed items so that items can be detected at a distance. In the situation where multiple unit loads (multiple items), are to be conveyed, the Targeting Lane can be created wider (increased Y dimension as in FIGS. 23 and 24) for side-by-side loads, or increased in the Z dimension (FIGS. 21 and 22) for vertically stacked items. Identities of labels or loads that fall within the Targeting Lane are identified to the driver via the driver interface 26 (FIG. 2) as potential loads or "targets". Labels that may lie within the field of view of one or more label readers are not identified to the driver as targets. Thus, the Targeting Lane discriminates between unit loads that may lie to the left, right, above or below the nearest load, from potential loads in the vicinity of the load(s) being acquired. Once a load is determined to be within the Targeting Lane a Target Cube is defined using the label position as the face of the Target Cube or the load position as the center of the Target Cube. A depth is assigned to the cube by configuration parameters which may be based on the class or type of the load. Any loads that fall beyond the depth of the Target Cube are not included as targets, thereby excluding label or load identities within the Map which fall within the Targeting Lane but lie behind the target load.

The Targeting Lane and Target Cube may be configured differently for the Label Map and Load Map based on the relative positions of labels versus load centers.

A system may use Label Maps or Load Maps, a combination of both or a mathematical union of both. For example, a system may use a Load Map without a Label Map in this case when the Load Map is populated as loads arrive at the facility and are initially identified by any means and the data are then added to the Global Load Map in the Controller. Load identification may be done at the time of load arrival by an operator who enters information by keyboard, voice, barcode scanner, or any other data entry means. The conveying vehicle then acquires the load, whose identification is already known, and conveys it to a storage location, which records an entry in the Local (and/or Global) Load Map. The next time a vehicle approaches this particular load, the load can be automatically included as a target due to its identification, location, and orientation data existing within the Load Map.

Example

Figure 31:
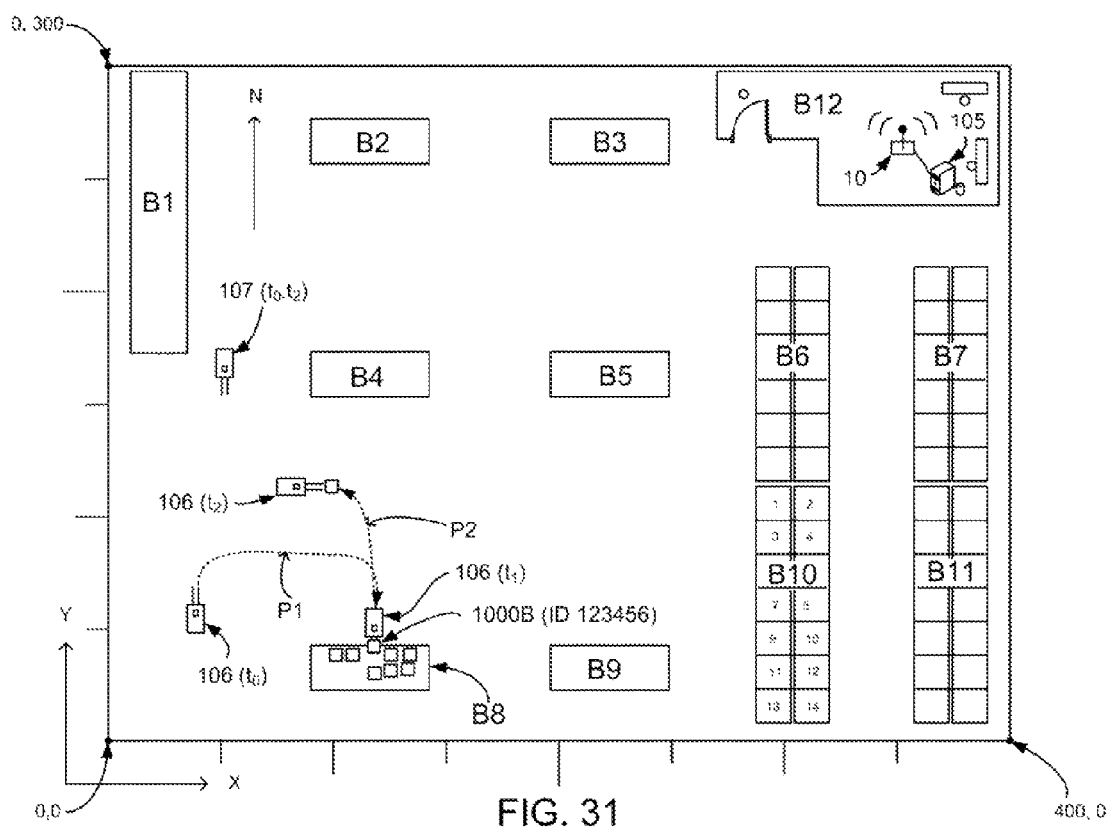
FIG. 31 is a map of a facility showing the exemplary movement of a unit load from a first storage location by the fourth vehicle to a transfer location in an aisle.
Figure 32:
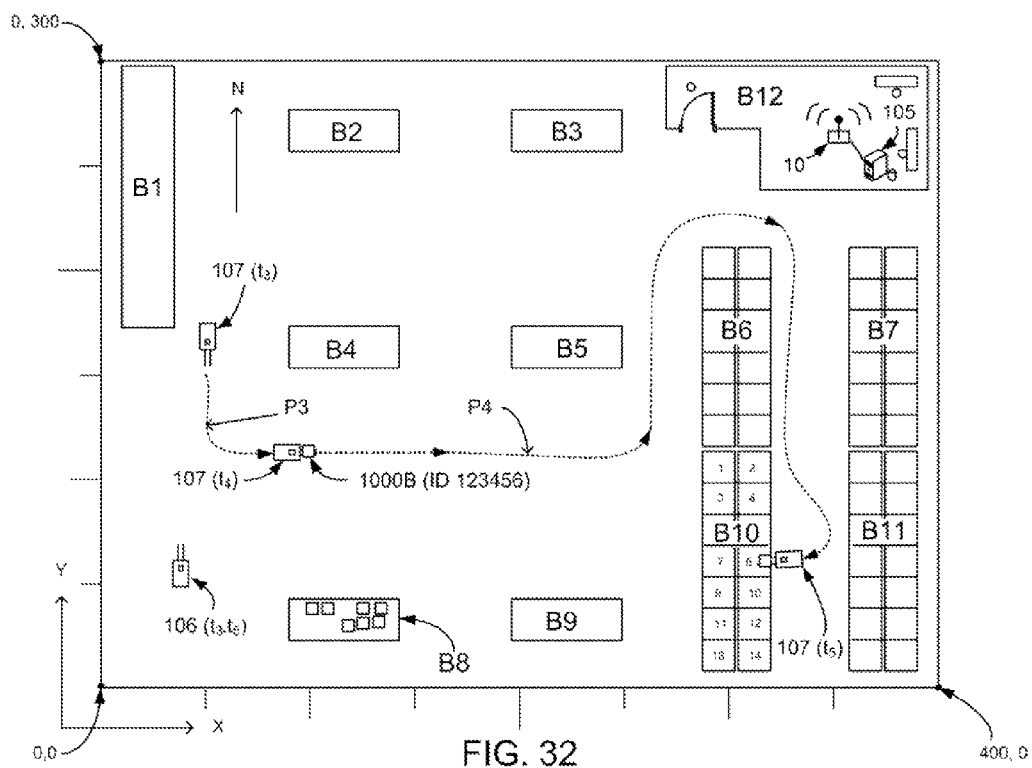
FIG. 32 is a map of a facility showing the exemplary movement of the unit load from the transfer location by the fifth vehicle to a second storage location.

FIGS. 29 and 30 show examples of the Label Map and Load Map for the Example illustrated in FIGS. 31 and 32. FIGS. 31 and 32 illustrate a map of a warehouse during the transfer of a load from a first storage location to a second storage location using two conveying vehicles 106, 107. Two manned vehicles 106 and 107 are shown. A plurality of obstructions B1 through B11 (which may be storage racks or building structure) and an office area B12 are shown.

Preparatory to commencing warehouse operations a map of the coordinate space (i.e., the warehouse) is created to determine allowable travel routes for vehicles, locations of obstacles within the coordinate space, and practical names for storage locations. The map of the coordinate space is stored within the memory in the controller (computer 105 in the office area). One suitable way for creation of the map of the coordinate space is described in U.S. patent application Ser. No. 12/807,325.

In this example the system has knowledge that vehicle 106 is initially at position 106(t0) and that vehicle 107 is at position 107(t0). The vehicle operator receives a request through the operator interface unit 26, perhaps from a warehouse management software system or from a warehouse manager, to move a load 1000B from bulk storage area B8 to position 8 on Rack B10. Initially load 1000B, having a label ID 123456, is at coordinate position X 120.2, Y 45.3, Z 0.8, and rotational orientation θ 181 degrees. The operator of vehicle 106 starts the vehicle moving along path P1 indicated by the dashed line. Typically, one second (or less) later, the position/orientation sensor 7 on vehicle 106 determines a new position and rotational orientation of the vehicle 106. The sequence of position and rotational orientation determination is repeated until the vehicle 106 arrives 106(t1) at the load to be moved (load 1000B in bulk storage area B8 at 180 degrees). As the vehicle moves, a Targeting Lane 600 is defined in computer memory (as though it were projected in front of the vehicle) in front of the load datum point of vehicle 106 (as illustrated in FIG. 11). As the operator maneuvers the vehicle 106 toward the desired load 1000B the label reader 14 of vehicle 106 continuously reads the labels in view and the label positions and identities are mapped into the Local Label Map. As the operator maneuvers the vehicle 106 closer to the desired load 1000B the Targeting Lane will align so that load 1000B is identified to be within the Targeting Lane. When the label 30B (label ID 123456, shown in FIG. 16) on the load of interest 1000B has been identified as within the Targeting Lane, a Target Cube 604 (FIG. 18) is created to discriminate the load 1000B. As the vehicle operator engages the load with the lift mechanism to acquire the load 1000B, the load detection device 18 indicates a Load ON event. The operator raises the lift mechanism 11 and backs away from rack B8 along path P2. Once the load has been acquired the sequence of vehicle position and rotational orientation determination is repeated until the vehicle 106 arrives at the transfer location (X 100.3, Y 115.7, Z 0.0, θ 88 degrees) at 106(t2). The vehicle 106 lowers the lift mechanism 11 and deposits the load 1000B. As the vehicle 106 backs away a Load OFF event is generated by the load detection device 18. At Load OFF (date-time 10-21-16:55 in FIG. 30) the Global Load Map 28-8B is updated, indicating the current position and orientation of the load 1000B. After depositing the load 1000B, the operator maneuvers vehicle 106 back to a parking position 106(t3-t5) (see FIG. 32).

As shown in FIG. 32, the vehicle 107 is dispatched to acquire load 1000B and deposit the load at the destination position 8 of rack B10. The operator of vehicle 107(t3) starts the vehicle moving along path P3 indicated by the dashed line. Typically, one second (or less) later, the position/orientation sensor 7 on vehicle 107 determines a new position and rotational orientation of the vehicle 107. The sequence of position and rotational orientation determination is repeated until the vehicle 107 arrives 107(t4) at load 1000B in the aisle between B4 and B8 (X 100.3, Y 115.7, Z 0.0, θ 88 degrees). As the vehicle 107 moves a Targeting Lane 600 is projected in front of the vehicle 107 (as illustrated in FIGS. 17, 17A). As the operator maneuvers the vehicle 107 toward the desired load 1000B the label reader 14 continuously reads the labels in view, discriminating those labels in the Targeting Lane 600. When the label 30B (label ID 123456) on the load of interest 1000B has been detected a Target Cube 604 (FIG. 17D) is created to discriminate the load 1000B. As the vehicle operator approaches to pick up the load 1000B the load detection device 18 indicates a Load ON condition. The operator raises the lift mechanism 11 and transports the load along path P4. Once the load is picked up the sequence of position and rotational orientation determination is repeated until the vehicle 107 arrives at the destination location (X 318.3, Y 62.9, Z 0.0, θ 271 degrees) at 107(t5). The vehicle 107 lowers the lift mechanism 11 and deposits the load 1000B. As the vehicle 106 backs away a Load OFF condition is generated by the load detection device 18. At Load OFF (date-time 10-21-17:10 in FIG. 30) the Load Map is updated 28-8C, indicating the current position and orientation of the load 1000B.

As vehicles 6, 7 move about the facility, the Targeting Lane 600 "moves" (i.e., is continuously recalculated) with each vehicle. The Label Map and Load Map are periodically interrogated to determine if either database has entries with position coordinates that fall within the boundaries of the Targeting Lane. This may occur at a rate of several times per second, depending on vehicle speed and system capability. When a label record is detected in the Label Map, or a load record is detected in the Load Map that lies within the Targeting Lane, the label ID's and/or the load IDs are recognized as potential loads for this vehicle.

A Target Cube, such as 604 in FIG. 17D, is created upon the detection of a potential load. Other examples of Target Cubes are shown in FIGS. 17F, 20, 22, and 24. The Target Cube utilizes the Y and Z dimensions of the Targeting Lane 600, but defines a reduced X dimension based on the proximity of the nearest load. This is done to remove unit loads from the list of potential loads to be acquired, e.g., those loads that may lie behind the nearest load.

Figure 33:
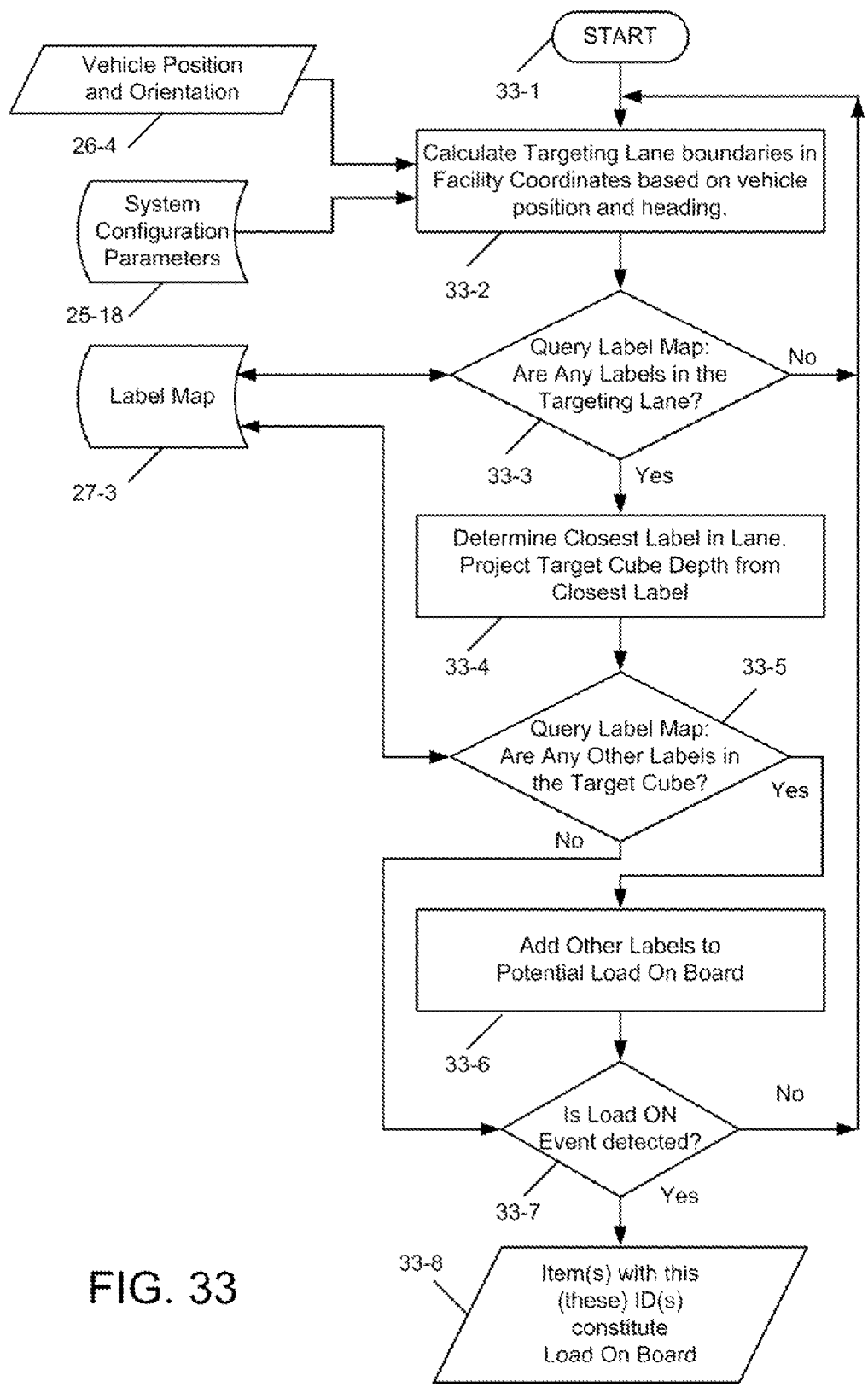
FIG. 33 is a flow diagram showing one embodiment for the determination if any label is in the Targeting Lane as the conveying vehicle approaches and acquires a load.

FIG. 33 details the process whereby items are chosen by the system to be part of the Load On Board. The process starts 33-1 when vehicle position and orientation 26-4, and configuration parameters 25-18 are used 33-2 to calculate the boundaries of the Targeting Lane 600 in three dimensions. The Label Map 27-3 is queried 33-3 to test whether any labels lie within the Targeting Lane 600 (FIGS. 17A-17C, 17E). If not (33-3, No), the cycle repeats. If one or more labels lie within the Targeting Lane (33-3, Yes), then a calculation 33-4 determines which label lies closest to the conveying vehicle 6. Using the position of the closest label, a Target Cube (e.g., 604, FIG. 17D) is projected and the Label Map database is again queried 33-5 to test whether other labels are present within the Target Cube. The Target Cube has an effect of defining a reduced depth dimension (load handling mechanism motion axis) in order to discriminate out unit loads that may lie behind the closest load and cannot be physically acquired by the conveying vehicle's load handling mechanism. If other labels are present in the Target Cube (33-5, Yes), they are included 33-6 in the potential load along with the item with the closest label. If no other labels are present in the Target Cube (33-5, No), the process jumps to step 33-7, leaving just one item as the potential load. A test of Load ON Event occurs 33-7. If a Load ON Event has not occurred (33-7, No), the process repeats, but if a Load ON Event (33-7, Yes) has occurred (FIG. 17F), those items constituting the potential load are determined to be the current Load On Board 33-8.

Figure 34:
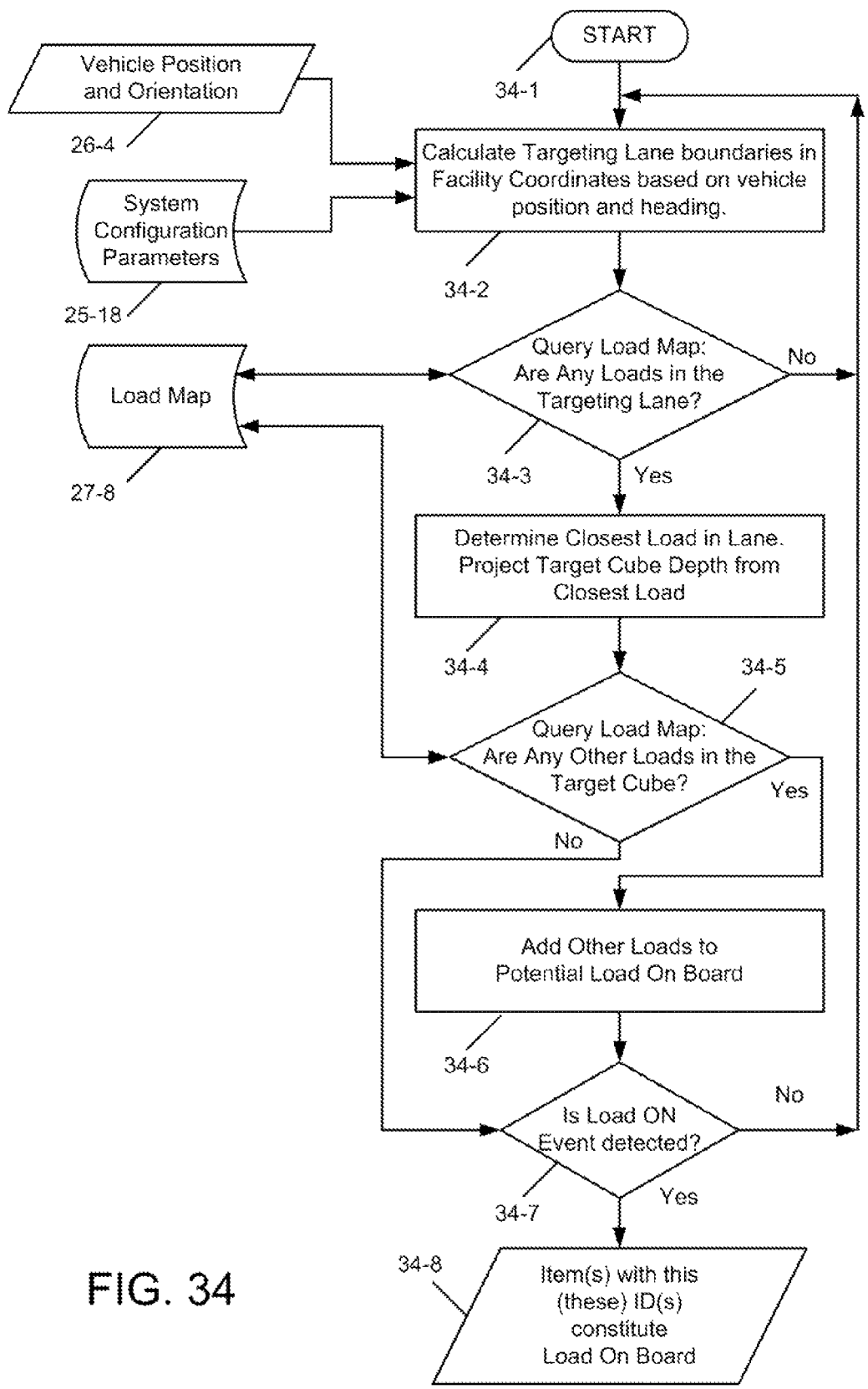
FIG. 34 is a flow diagram showing one embodiment for the determination if any load is in the Targeting Lane as the conveying vehicle approaches and acquires that load.

A similar process occurs for the Load Map in FIG. 34, except that the Load Map database is interrogated instead of the Label Map Database. Since the Load Map indicates load centers, and not load faces having labels, this process allows a vehicle to approach a load from the front, side, or back and still detect that it lies within the Targeting Lane. This capability is particularly valuable for the transport of items in bulk storage, where a load may have any position and any orientation.

In FIG. 34, vehicle position and orientation 26-4, and configuration parameters 25-18 are again used 34-2 to calculate the boundaries of the Targeting Lane in three dimensions. A process begins 34-1 whereby the Load Map 27-8 is queried 34-3 to test whether any load centers exist within the Targeting Lane 600. If not (34-3, No), then the cycle repeats. If loads do coincide within the Targeting Lane 600 (34-3, Yes), then a calculation determines 34-4 which load lies closest to the vehicle. The Target Cube is created as described above. Step 34-5 retests the Load Map to determine whether other loads are present in the Target Cube. If other loads are present in the Target Cube (34-5, Yes), they are included 34-6 as a potential load along with the closest load. If no other loads are present in the Target Cube (34-5, No) the process jumps to step 34-7, leaving just one item as the potential load. A test of Load ON Event occurs 34-7. If a Load ON Event has not occurred (34-7, No), the process repeats, but if a Load ON Event (34-7, Yes) has occurred, those items constituting the potential load are determined to be the current Load On Board 34-8.

The process by which labels are located and decoded is show in FIG. 35. The label reader sensor 35-1 is a machine vision camera (14 or 15 in FIGS. 6 and 7) programmed to locate and decode labels instead of position markers. Images are captured 35-2 and stored in memory 35-3. Image data is enhanced 35-4 digitally to improve brightness, contrast, and other image properties that can affect readability. A test is made 35-5 of the enhanced image data to determine if a label is within the field of view. If no labels can be found in the image (35-5, No), the image capture cycle repeats. This cycle can occur at repetition rates as rapidly or as slowly as necessary to accomplish reliable label reading; typically three to five images per second. If a label is found in the image (35-5, Yes), indicia are located 35-6 and each indicia is tested for readability 35-7. Image data for those labels that bear readable indicia (35-7, Yes) are tested 35-8 to determine whether they are composed of linear or matrix barcodes, which are processed differently from one another. If no indicia are readable (35-7, No) a new image is captured. If matrix barcodes are found (35-8, Matrix), key points J, K, and L of each matrix symbol are located 35-9 in pixel coordinates, and the key point coordinates are stored as data 35-10. If linear barcodes are found (35-8, Linear), then key points A, B, and C are located 35-11 for each barcode, and the key point data 35-12 is stored. In each case, label barcodes are decoded 35-13 to determine Label ID that is associated with the key point data 35-14.

Figure 36A:
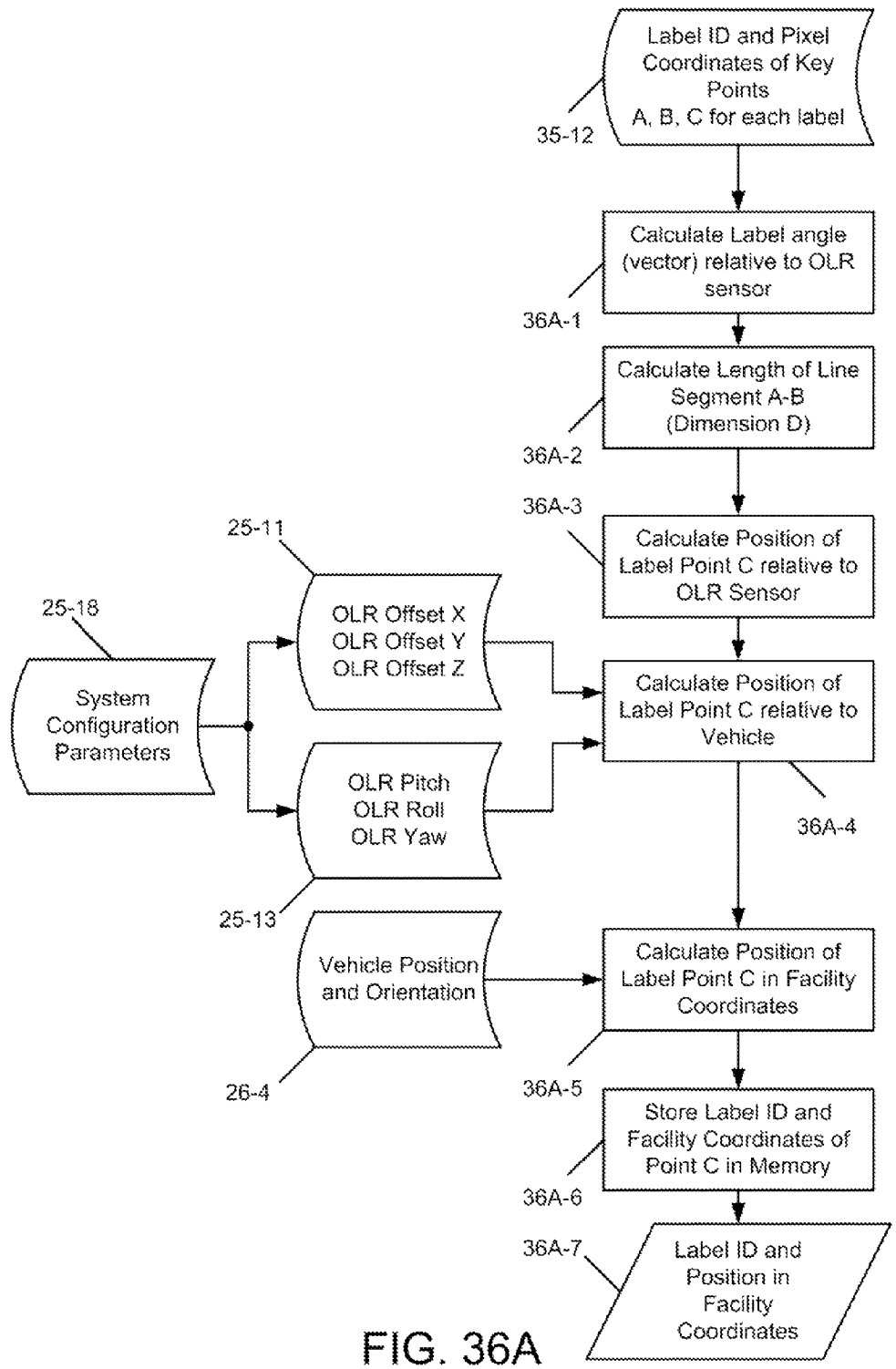
FIG. 36A is a flow diagram showing exemplary steps of determining the position of a label containing a linear barcode by the transformation of the one-dimensional barcode label data relative to the conveying vehicle into the facility coordinates.
Figure 36B:
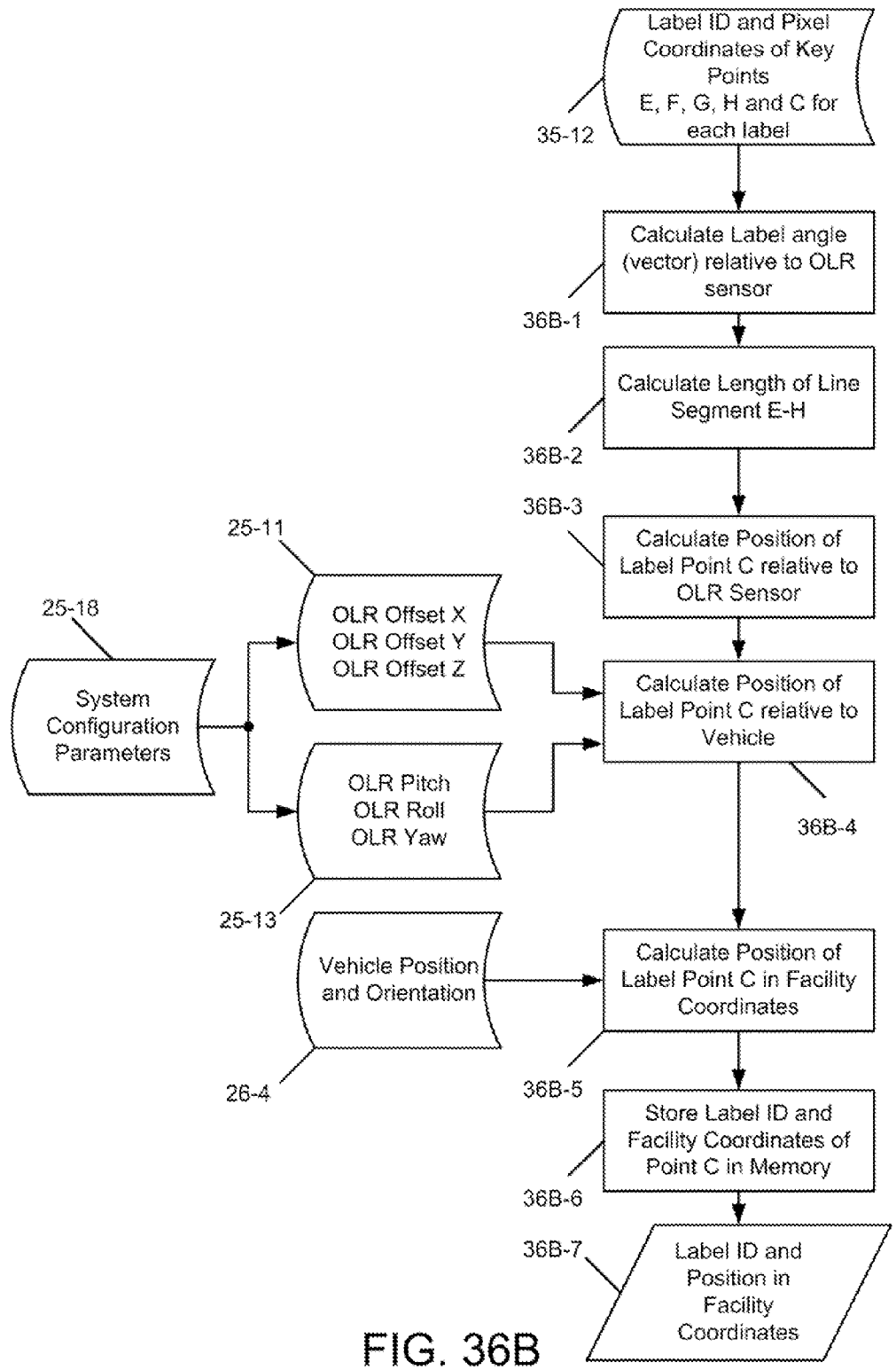
FIG. 36B is a flow diagram showing exemplary steps of determining the position of a label containing an alternative linear barcode by the transformation of the one-dimensional barcode label data relative to the conveying vehicle into the facility coordinates.

FIGS. 36A and 36B show the transformation of linear label barcode key point data into facility coordinates for each label detected. In FIG. 36A, key points A, B, and C (35-12) are illustrated in FIG. 9D. The angle of a vector between the center of the label reader 14 and the center of the label, point C (FIG. 9D) is calculated 36A-1. The length of line segment A-B (dimension D in FIG. 9D) is calculated in step 36A-2, and the length in pixels is used to calculate the position of point C (36A-3) relative to the label reader sensor 14. Since the label dimensions are known and the pixel length of line segment A-B (dimension D in FIG. 9D) has been determined, a calculation is made to determine the length of the vector. Step 36A-4 uses label reader offset values 25-11, and label reader pitch, roll, and yaw values 25-13 (illustrated in FIG. 8) to then calculate the position of point C on the label relative to the load datum 6D. The label reader offsets and the load handler position sensor data are then used to translate the label position relative to the vehicle center 6C. Vehicle position and orientation data 26-4 are then used to transform the label's position relative to the vehicle coordinates to the label's position in facility coordinates 36A-5. The Label ID and the label's facility coordinate position 26-9 are stored 36A-6 in the mobile computer 25 memory and are available as data 36A-7.

In FIG. 36B, key points E, F, G, and H (35-12) are used to make the calculation. The angle of a vector between the center of the label reader 14 and the center of the label, point C is calculated 36B-1. The length of line segment E-H is calculated in step 36B-2, and the length in pixels is used to calculate the position of point C 36B-3 relative to the label reader sensor 14. Since the label dimensions are known and the pixel length of line segment A-B (dimension D in FIG. 9D) has been determined, a calculation is made to determine the length of the vector. Step 36B-4 uses label reader offset values 25-11, and label reader pitch, roll, and yaw values 25-13 to then calculate the position of point C on the label relative to the load datum 6D. The label reader offsets and the load handler position sensor data are then used to translate the label position relative to the vehicle center 6C. Vehicle position and orientation data 26-4 are then used to transform the label's position relative to the vehicle coordinates to the label's position in facility coordinates 36B-5. The Label ID and the label's facility coordinate position 26-9 are stored 36B-6 in the mobile computer 25 memory and are available as data 36B-7.

Figure 37:
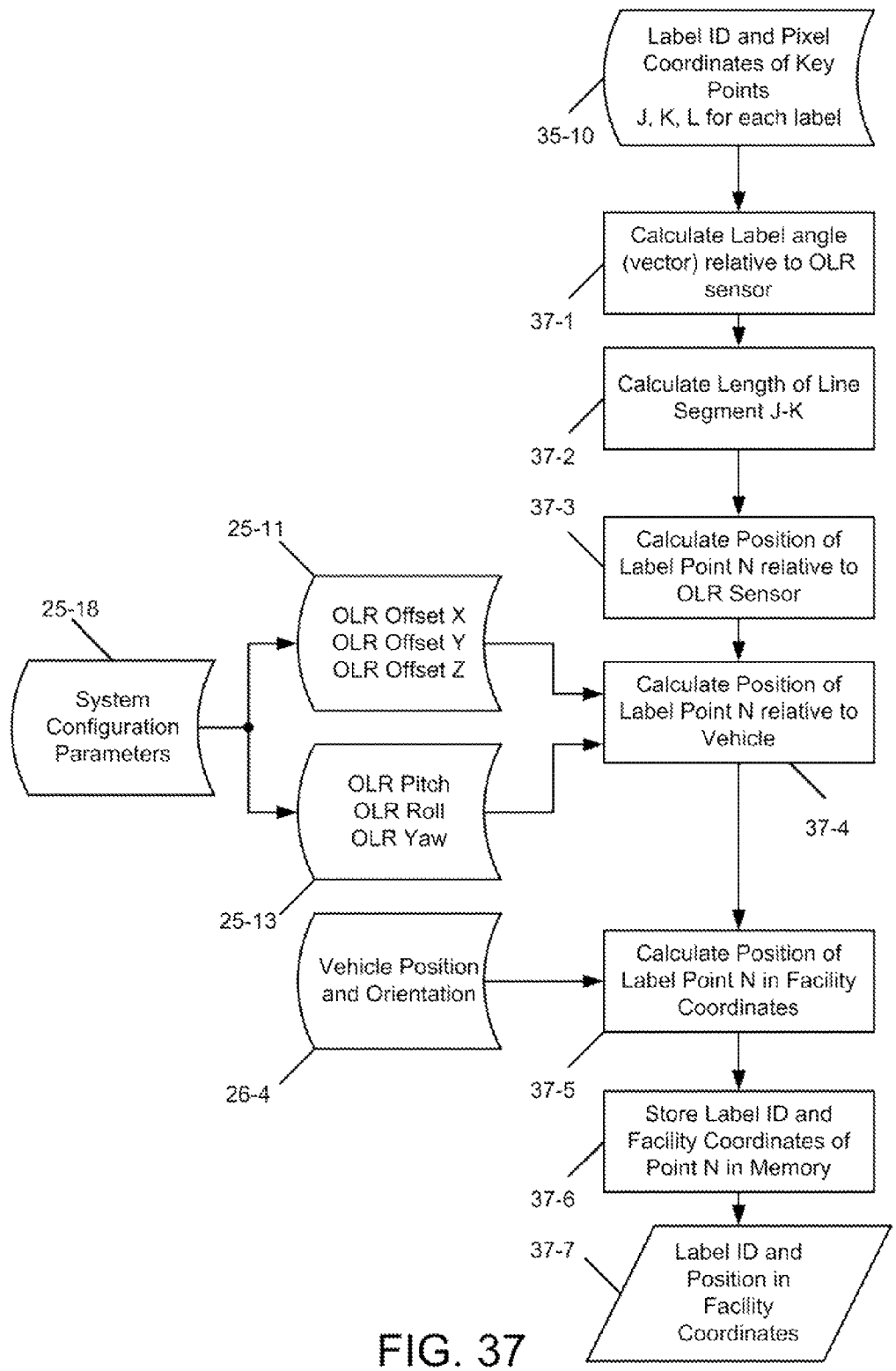
FIG. 37 is a flow diagram showing exemplary steps of determining the position of a label containing a two-dimensional matrix barcode by the transformation of two-dimensional barcode label data relative to the conveying vehicle into the facility coordinates.

A similar process is applied in FIG. 37 for two-dimensional matrix barcode labels whose key points are J, K, and L, as shown in FIG. 9B. The process proceeds as described above, beginning with the key points 35-10 being processed 37-1 to calculate the vector angle between the label reader sensor 14 and the center of the matrix barcode symbol, point N (midpoint of line J-K in FIG. 9B). The length of line segment J-K is calculated 37-2 in pixels. The position of point N in the label is calculated 37-3 relative to the label reader sensor 14. The system configuration parameters 25-18: specifically the label reader offset X, Y, Z 25-11 (see FIGS. 6 and 7) and the label reader pitch, roll, and yaw 25-13 (see FIG. 8) to calculate 37-4 the position of label point N relative to the load datum 6D. The label reader offsets and the load handler position sensor data are then used to translate the label position relative to the vehicle center 6C. Vehicle position and orientation 26-4 allows the transformation 37-5 of label position from vehicle coordinates to facility coordinates. These data 37-7 are stored in memory in step 37-6.

Through the processes shown in FIGS. 35, 36, and 37, each label detected by the label reader sensor 14 whose identity is decoded and position determined 26-9 results in an entry into the Local Label Map database 27-3 in the Mobile computer 25 memory.

Those skilled in the art, having benefit of the teachings of the present invention as set forth herein, may effect modifications thereto. Such modifications are to be construed as lying within the contemplation of the present invention, as defined by the appended claims.

What is claimed is:

1. A method for identifying and locating assets with one or more optical label readers, each label reader being mounted on a corresponding conveying vehicle at a known position and orientation relative to a center and a directional axis of the vehicle, each conveying vehicle having an optical image acquisition system mounted thereon for sensing position and rotational orientation within a facility having an array of position markers, each asset having a machine-readable encoded indicia of a predetermined size thereon, the method comprising the steps of:

a) repeatedly determining the position of the center of the vehicle and the rotational orientation of the directional axis of the vehicle;
   b) acquiring images with the one or more label readers as each conveying vehicle moves about the facility;
   c) processing each image to determine if that image comprises a label having readable indicia;
   d) if the indicia is not readable, repeating steps b) and c);

e) if the indicia is readable:
   1) decoding the indicia to identify the asset;
   2) determining a center of the indicia on the label; and
   3) determining a location of the label center relative to the label reader based upon the position and the size of the indicia within the image;
f) determining the position of the label within the facility using the location of the indicia relative to the label reader, the position and rotational orientation of the label reader relative to the center of the vehicle and the directional axis of the vehicle and the position of the center of the vehicle and directional axis of the vehicle within the facility; and
g) storing the identity and the position of each readable label within the facility in a database, called a Label Map, in a memory in a computer.

2. The method of claim 1, further comprising:
h) if a label identity is already in the Label Map, averaging the newly determined position with the position(s) already in the Label Map and storing the averaged position in the Label Map.

3. The method of claim 1, the conveying vehicle comprising a load handling mechanism having a load datum and a directional axis and a load detecting device, the method further comprising the steps of:
h) defining parameters for a Targeting Lane and a Target Cube along the directional axis of the load handling mechanism in reference to the load datum of the conveying vehicle and relative to the center point of the vehicle:
   1) a Targeting Lane width to the left of the load handling directional axis;
   2) a Targeting Lane width to the right of the load handling directional axis;
   3) a Targeting Lane height from the load datum on the load handling mechanism;
   4) a Targeting Lane depth along the load handling directional axis;
   5) a Target Cube depth along the load handling directional axis;
i) projecting the Targeting Lane and the Target Cube into a virtual space which has been defined within the Label Map;
j) defining the Targeting Lane in front of the load datum of the vehicle within the virtual space based on the current location of the load datum within the facility;
k) searching the Label Map for assets lying within the Targeting Lane;
l) determining from the Label Map if any assets are in the Targeting Lane;
m) if no assets are in the Targeting Lane, repeating steps i)-l);
n) if any assets are in the Targeting Lane:
   1) determining the label of the closest asset in the Targeting Lane;
   2) establishing a Target Cube depth from the position of the closest asset's label;
o) determining from the Label Map if any additional labels are within the Target Cube;
p) if any additional labels are in the Target Cube, adding the assets with the additional labels to the potential loads, otherwise go to step q);
q) determining if the load detecting device has detected a "Load ON" event;
r) if a "Load ON" event has not occurred, repeating steps i)-q);
s) if a "Load ON" event has occurred, then determining labels from the Label Map and the associated assets to be part of a "Load On Board".

4. The method of claim 1, the conveying vehicle comprising a load handling mechanism having a load detecting device on a moveable portion thereof for detecting an asset at a predetermined close distance, further determining the position and directional orientation of each asset, comprising the steps of:
h) approaching an asset in the facility with a conveying vehicle until the load detecting device detects the asset;
i) acquiring the asset with the load handling mechanism on the conveying vehicle, thus establishing a position of the asset on the load handling mechanism;
j) transporting the asset and depositing the asset at a destination location;
k) using the position of the asset on the load handling mechanism, the relative position of the load handling mechanism to the conveying vehicle, and the position of the center of the vehicle and orientation of the directional axis of the vehicle, determining the position and the orientation of the asset within the facility when the asset is deposited;
l) storing the identity, the position and directional orientation of each asset within the facility in a database, called a Load Map, in a memory in the computer.

5. The method of claim 4, wherein, prior to step h), average sizes of assets in the facility are defined.

6. The method of claim 4, the load handling mechanism having a load datum and a directional axis, further comprising a method for locating an asset in a facility using the Load Map, comprising the steps of:
m) defining parameters for a Targeting Lane and a Target Cube along the directional axis of the load handling mechanism in reference to the load datum of the conveying vehicle and relative to the center point of the vehicle, the Targeting Lane and the Target Cube being projected into a virtual space which has been defined within the Load Map by:
   1) a Targeting Lane width to the left of the load handling directional axis;
   2) a Targeting Lane width to the right of the load handling directional axis;
   3) a Targeting Lane height from the load datum on the load handling mechanism;
   4) a Targeting Lane depth along the load handling directional axis;
   5) a Target Cube depth along the load handling directional axis;
n) defining the Targeting Lane in front of the load datum of the vehicle within the virtual space based on the current location of the load datum within the facility;
o) searching the Load Map for assets lying within the Targeting Lane;
p) determining from the Load Map if any assets are in the Targeting Lane;
q) if no assets are in the Targeting Lane, repeating steps n)-p);
r) if any assets are in the Targeting Lane:
   1) determining the closest asset in the Targeting Lane;
   2) establishing a Target Cube depth from closest asset's position;
s) determining from the Load Map if any additional assets are within the Target Cube;
t) if any additional assets are in the Target Cube, adding the assets to the potential loads, otherwise go to step u);

u) determining if the load detecting device has detected a "Load ON" event;

v) if a "Load ON" event has not occurred, repeating steps n)-u);

w) if a "Load ON" event has occurred, then determining the potential loads from the Load Map to be part of a "Load On Board".

7. The method of claim 4, further comprising:

m) transmitting the identity, the position and the orientation of the deposited asset to a system controller over a wireless network; and n) storing the identity, the position and the orientation of the deposited asset in a database, called a Global Load Map in a memory in a computer.

8. The method of claim 4, the load handling mechanism having a load datum and a directional axis, further comprising a method for identifying an asset that has no readable label in a facility using the Load Map, comprising the steps of:

m) defining parameters for a Targeting Lane and a Target Cube along the directional axis of the load handling mechanism in reference to the load datum of the conveying vehicle and relative to the center point of the vehicle the Targeting Lane and the Target Cube being projected into a virtual space which has been defined by the Load Map by:
1) a Targeting Lane width to the left of the load handling directional axis;
2) a Targeting Lane width to the right of the load handling directional axis;
3) a Targeting Lane height from the load datum on the load handling mechanism;
4) a Targeting Lane depth along the load handling directional axis;
5) a Target Cube depth along the load handling directional axis;

n) defining the Targeting Lane in front of the load datum of the vehicle within the virtual space based on the current location of the load datum within the facility;

o) determining from the Load Map if any assets are in the Targeting Lane;

p) if no assets are in the Targeting Lane, repeating steps n)-o); and q) if any assets are in the Targeting Lane, determining the closest item in the Targeting Lane, thereby identifying the asset that has no readable label.

9. The method of claim 1, the conveying vehicle having a load detecting device on a moveable portion of a load handling mechanism for detecting an asset at a predetermined close distance, further determining the position and directional orientation of each asset, comprising the steps of:

h) approaching the asset identified in step e) 1) with the conveying vehicle until the load detecting device detects the asset;

i) acquiring the asset with the load handling mechanism on the conveying vehicle, thus establishing a position of the asset on the load handling mechanism;

j) using the position of the asset on the load handling mechanism, the position of the center of the vehicle and the orientation of the directional axis of the vehicle, determining the position and the orientation of the asset within the facility;

k) storing the identity, the position and directional orientation of the asset within the facility in a database, called a Local Load Map, in a memory in a computer.

10. The method of claim 9 wherein, prior to step h), average sizes of assets in the facility are defined.

11. A method of creating a Global Label Map database, for identifying and locating assets within a facility having an array of position markers, each asset having a machine-readable coded indicia of a predetermined size thereon, in a system having:

i) a central system controller comprising a computer having a memory and a wireless communications unit;

ii) a mobile subsystem on a conveying vehicle, the subsystem comprising:
1) a mobile computer having a memory;
2) a wireless communications unit for communicating over a wireless network with the central system controller;
3) a position/orientation sensor device mounted on the conveying vehicle at a known position and orientation relative to a center of the vehicle and a directional axis of the vehicle; and
4) one or more label readers each mounted on the conveying vehicle at a known position and orientation relative to a center of the vehicle and a directional axis of the vehicle;

the method comprising the steps of:

a) repeatedly determining the position of the center of the vehicle and the orientation of the directional axis of the vehicle with the position/orientation sensor device;

b) acquiring images with the label readers as the conveying vehicle moves about the facility;

c) processing each image to determine if that image contains a label having readable indicia;

d) if the indicia is not readable, repeating steps b) and c);

e) if the indicia is readable:
1) decoding the indicia to identify the asset;
2) determining the center of the indicia on the label; and
3) determining the location of the label center relative to the label reader based upon the position and the size of the indicia within the image;

f) determining the position of the label within the facility using the location of the indicia relative to the label reader and the position of the center of the vehicle and the orientation of the directional axis of the vehicle;

g) storing the identity and the position of each readable label in a database, called a Local Label Map, in the memory in the mobile computer;

h) transmitting the identity and the position of each label in the Local Label Map in each mobile computer to the central system controller over the wireless network; and i) compiling the identity and the position of each label in all the Local Label Maps from each mobile computer in a database, called a Global Label Map, in the memory of the central computer.

12. The method of claim 11, further comprising:

j) if a label is already in the Global Label Map, averaging the newly determined position with the positions already in the Global Label Map and storing the averaged position in the Global Label Map.

13. The method of claim 11, further comprising:

j) transmitting the identity and the position of each label in the Global Label Map to each mobile computer over the wireless network to create a copy of the Global Label Map.

14. The method of claim 13, further comprising a method of transporting an asset in a facility from a first location to a second location upon receiving the identification of the asset to be transported and the destination for the asset, comprising the steps of:

k) determining the position of the asset from a copy of the Global Label Map in the memory of the mobile computer;
l) defining a Targeting Lane in front of the conveying vehicle and determining if any labels are in the Targeting Lane;
m) if no labels are in the Targeting Lane, repeating steps k) and l);
n) if any labels are in the Targeting Lane:
   1) determining the closest label in the Targeting Lane;
   2) projecting a Target Cube depth from the closest label position;
o) checking label positions in the copy of the Global Label Map to determine if any labels are within the Target Cube;
p) if any labels are in the Target Cube, verifying the identity of the label of the asset to be transported;
q) determining if the load detecting device has detected a "Load ON" event;
r) if a "Load ON" event has not occurred, repeating steps n)-q);
s) if a "Load ON" event has occurred, then determining the label(s) and the associated asset(s) to be part of a "Load On Board";
t) acquiring the asset(s);
u) clearing the record(s) for the label(s) for the associated asset(s) in the Local Label Map;
v) clearing the record(s) for the asset(s) in a Local Load Map in the memory of the mobile computer;
w) transporting the asset(s) to a second destination location;
x) depositing the asset(s) at the second location;
y) determining the position and the orientation of the asset(s) within the facility when the load detecting device detects the asset(s) has been deposited at "Load Off" event by using the location of the asset(s) relative to the conveying vehicle and the position of the center of the vehicle and orientation of the directional axis of the vehicle; and
z) storing the identity, the position and the orientation of the deposited asset(s) in the Local Load Map in the memory in the mobile computer.

15. The method of claim 14, further comprising:
aa) transmitting the identity, the position and the orientation of the deposited asset to the system controller over the wireless network;
ab) storing the identity, the position and the orientation of the deposited asset in the Global Load Map in the memory of the central system controller;
ac) acquiring images with the one or more label readers as the conveying vehicle moves away from the deposited asset;
ad) processing each image to determine if that image comprises a label having readable indicia;
ae) if the indicia is not readable, repeating steps ac) and ad);
af) if the indicia is readable:
   1) decoding the indicia to identify the asset;
   2) determining a center of the indicia on the label; and
   3) determining a location of the label center relative to the label reader based upon the position and the size of the indicia within the image;
ag) determining the position of the label within the facility using the location of the indicia relative to the label reader, the position and rotational orientation of the label reader relative to the center of the vehicle and the directional axis of the vehicle and the position of the center of the vehicle and directional axis of the vehicle within the facility;
ah) storing the identity and the position of each readable label within the facility in the Local Label Map in the memory of the mobile computer;
ai) transmitting the identity, the position and the orientation of the label of the deposited asset in the Local Label Map to the system controller over the wireless network; and
aj) storing the identity, the position and the orientation of the label of the deposited asset in the Global Label Map in the memory of the central system controller.

16. The method of claim 15, wherein the mobile computer on the vehicle updates the Local Load Map and the Local Label Map by downloading data from the Global Load Map and the Global Label Map in the central system controller via the wireless network.

17. The method of claim 13, further comprising a method of transporting a first asset in a facility from a first location to a second destination location already occupied by a second asset upon receiving the identification of the first asset to be transported and the destination for the first asset, and tracking the identity and location and rotational orientation of the second asset displaced during the deposition of the first asset, comprising the steps of:
k) determining the position of the first asset from a copy of the Global Label Map in the memory of the mobile computer;
l) defining a Targeting Lane in front of the conveying vehicle and determining if any labels are in the Targeting Lane;
m) if no labels are in the Targeting Lane, repeating steps k) and l);
n) if any labels are in the Targeting Lane:
   1) determining the closest label in Targeting Lane;
   2) projecting a Target Cube depth from the closest label position;
o) checking label positions in the copy of the Global Label Map to determine if any labels are within the Target Cube;
p) if any labels are in the Target Cube, verifying the identity of the label of the first asset to be transported;
q) determining if the load detecting device has detected a "Load ON" event;
r) if a "Load ON" event has not occurred, repeating steps n)-q);
s) if a "Load ON" event has occurred, then determining the label and the associated asset to be part of a "Load On Board";
t) acquiring the asset;
u) clearing the record for the label for the associated asset in the Local Label Map;
v) clearing the record for the asset in a Local Load Map in the memory of the mobile computer;
w) receiving the destination location for the first asset from a central system controller and determining, from the copy of the Global Label Map in the memory of the mobile computer, that a second asset already occupies the destination location;
x) transporting the first asset to the second destination location;
y) contacting the second asset with the first asset and determining the location and direction of travel of the conveying vehicle at contact;
z) pushing the second asset to a displaced location when the first asset is being deposited in the second destination storage location;

aa) depositing the first asset at the second location;

ab) determining the position and the orientation of the assets within the facility when the load detecting device detects that the first asset has been deposited by using the location of the first asset relative to the conveying vehicle and the position of the center of the vehicle and orientation of the directional axis of the vehicle;

ac) upon deposition of the first asset, when a "Load Off" event occurs, updating the locations and rotational orientations of the second asset and the first asset in the Local Label Map and Local Load Map in the memory in the mobile computer, the distance of displacement of the second asset being determined by the difference in position of the conveying vehicle at the contact of the first asset with the second asset and the position of the conveying vehicle at occurrence of the "Load Off" event and the direction of the displacement being determined by the direction of travel of the conveying vehicle at contact;

ad) storing the identity, the position and the orientation of the deposited asset and the displaced asset in the Local Load Map in the memory in the mobile computer;

ae) transmitting the identity, the position and the orientation of the deposited first asset and the displaced second asset to the central system controller over the wireless network; and af) storing the identity, the position and the orientation of the deposited first asset and the displaced second asset in the Global Load Map database.

18. The method of claim 17, wherein in step y), contact between the second asset and the first asset is determined from the copy of the Global Label Map and the Targeting Lane and Target Cube.

19. A method for identifying and locating assets with one or more optical label readers, each label reader being mounted on a corresponding conveying vehicle at a known position and orientation relative to a center and a directional axis of the vehicle, each conveying vehicle having an optical image acquisition system mounted thereon for sensing position and rotational orientation within a facility having an array of position markers, each asset having a machine-readable encoded indicia of a predetermined size in a predetermined position thereon, the method comprising the steps of:

a) identifying each asset in the facility;

b) creating a configuration table containing parameters necessary to identify the asset and to locate the asset relative to the conveying vehicle;

c) determining the current conveying vehicle position and orientation;

d) acquiring images with a label reader on the conveying vehicle;

e) determining if each image contains a readable label;

f) if the label is not readable, repeating steps d) and e);

g) if the label is readable, decoding the identity of the label and calculating the three-dimensional coordinates of the label relative to the conveying vehicle;

h) using the current conveying vehicle position and orientation, transforming the coordinates of the label to facility coordinates;

i) creating a Label Map database and adding the identity and position of each decoded label to the Label Map;

j) if the identified label is already in the Label Map, adding that label position to the Label Map and calculating an average position of that label based upon all stored positions of that label.

* * * * *